US009998797B2

(12) United States Patent
Maruyama et al.

(10) Patent No.: US 9,998,797 B2
(45) Date of Patent: Jun. 12, 2018

(54) COMMENT-PROVIDED VIDEO GENERATING APPARATUS AND COMMENT-PROVIDED VIDEO GENERATING METHOD

(71) Applicant: Panasonic Intellectual Property Management Co., Ltd., Osaka (JP)

(72) Inventors: Ayako Maruyama, Osaka (JP); Kunio Nobori, Osaka (JP); Koichi Hotta, Hyogo (JP); Mikiya Nakata, Nara (JP); Hidetsugu Maekawa, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days. days.

(21) Appl. No.: 15/485,351

(22) Filed: Apr. 12, 2017

(65) Prior Publication Data
US 2017/0223422 A1 Aug. 3, 2017

Related U.S. Application Data

(60) Division of application No. 14/227,379, filed on Mar. 27, 2014, now Pat. No. 9,674,582, which is a
(Continued)

(30) Foreign Application Priority Data

Jul. 20, 2012 (JP) ................................ 2012-161532

(51) Int. Cl.
*H04N 21/472* (2011.01)
*H04N 21/488* (2011.01)
(Continued)

(52) U.S. Cl.
CPC ..... *H04N 21/4882* (2013.01); *G06F 17/3082* (2013.01); *G06K 9/00671* (2013.01);
(Continued)

(58) Field of Classification Search
CPC ........... H04N 13/007; H04N 21/47205; H04N 21/472; H04N 21/4882; G06K 9/00671
See application file for complete search history.

(56) References Cited

U.S. PATENT DOCUMENTS

2003/0146915 A1* 8/2003 Brook .................... G11B 27/11
345/473
2005/0123267 A1 6/2005 Tsumagari et al.
(Continued)

FOREIGN PATENT DOCUMENTS

JP 2001-351125 12/2001
JP 2004-128614 4/2004
(Continued)

OTHER PUBLICATIONS

International Search Report dated Aug. 13, 2013 in corresponding International Application No. PCT/JP2013/004150.
(Continued)

*Primary Examiner* — Robert J Hance
(74) *Attorney, Agent, or Firm* — Wenderoth, Lind & Ponack, L.L.P.

(57) ABSTRACT

A comment-provided video generating apparatus includes: a display priority calculating unit which calculates a display priority for each of the comments and subject regions to which the comments are provided, based on comment information indicating comments to be superimposed and displayed on a video and display positions of the comments, and user information, by calculating a higher display priority for one of the comments and the subject regions specified by user information; a comment superimposing method determining unit which determines, as a method for superimposing the comments onto a video, an order of displaying the comments and the subject regions such that a comment or a subject region having a higher display priority is displayed at a position frontward than the others, according to the
(Continued)

display priority; and an image composing unit which superimposes the comments on the video, according to the comment superimposing method.

16 Claims, 35 Drawing Sheets

Related U.S. Application Data continuation of application No. PCT/JP2013/004150, filed on Jul. 4, 2013.

(51) Int. Cl.
*G06K 9/00* (2006.01)
*H04N 13/00* (2018.01)
*H04N 21/435* (2011.01)
*H04N 21/4788* (2011.01)
*H04N 21/2743* (2011.01)
*H04N 21/44* (2011.01)
*H04N 21/81* (2011.01)
*H04N 21/845* (2011.01)
*G06T 11/60* (2006.01)
*G06F 17/30* (2006.01)
*G11B 27/031* (2006.01)

(52) U.S. Cl.
CPC ............ *G06T 11/60* (2013.01); *G11B 27/031* (2013.01); *H04N 13/007* (2013.01); *H04N 21/2743* (2013.01); *H04N 21/435* (2013.01); *H04N 21/44008* (2013.01); *H04N 21/472* (2013.01); *H04N 21/4788* (2013.01); *H04N 21/47205* (2013.01); *H04N 21/488* (2013.01); *H04N 21/8133* (2013.01); *H04N 21/8456* (2013.01)

(56) References Cited

U.S. PATENT DOCUMENTS

| | | | |
|---|---|---|---|
| 2006/0212291 A1* | 9/2006 | Matsuo | G10L 21/028 704/231 |
| 2007/0113180 A1* | 5/2007 | Danninger | G06F 3/0481 715/705 |
| 2010/0188707 A1* | 7/2010 | Gassman | G03B 15/00 358/1.18 |
| 2011/0181774 A1 | 7/2011 | Masuda | |
| 2012/0056898 A1* | 3/2012 | Tsurumi | G06T 11/60 345/633 |
| 2012/0269393 A1 | 10/2012 | Komoto et al. | |

FOREIGN PATENT DOCUMENTS

| | | |
|---|---|---|
| JP | 2005-151147 | 6/2005 |
| JP | 2005-204124 | 7/2005 |
| JP | 2008-148071 | 6/2008 |
| JP | 2009-81592 | 4/2009 |
| JP | 2010-53293 | 3/2010 |
| JP | 2011-61528 | 3/2011 |
| JP | 2012-58838 | 3/2012 |
| JP | 4994525 | 8/2012 |
| WO | 2010/116820 | 10/2010 |
| WO | 2011/102447 | 8/2011 |
| WO | 2012/101723 | 8/2012 |

OTHER PUBLICATIONS

Takashi Matsuyama et al., "the 3rd chapter Camera Calibration", Computer Vision: technical review and perspective, New Technology Communications Co., Ltd., Jun. 15, 1998, pp. 37-53.

* cited by examiner

FIG. 5A

Comment information storage server

Comment information

| Video name | Video time | Comment | Comment provision date and time | User | Comment coordinates | Comment shape | Comment color | Comment index... |
|---|---|---|---|---|---|---|---|---|
| anime1 | 00:00:00 | "Started!" | 12.3.5.12:55:00 | userA | 50,50 | normal1 | #000000 | 0a ... |
| anime1 | 00:00:00 | "I Love it." | 12.5.5.15:00:00 | userB | 150,150 | normal1 | #00FF00 | 1a ... |
| anime1 | 00:05:00 | "www" | 12.3.1.12:00:00 | userC | 300,200 | cloud | #666666 | 2a ... |
| ... | | | | | | | | |
| hockey1 | 00:01:23 | "Stick it out!" | 12.1.1.08:00:00 | userD | 200,200 | cloud | #000000 | 0h ... |
| ... | | | | | | | | |

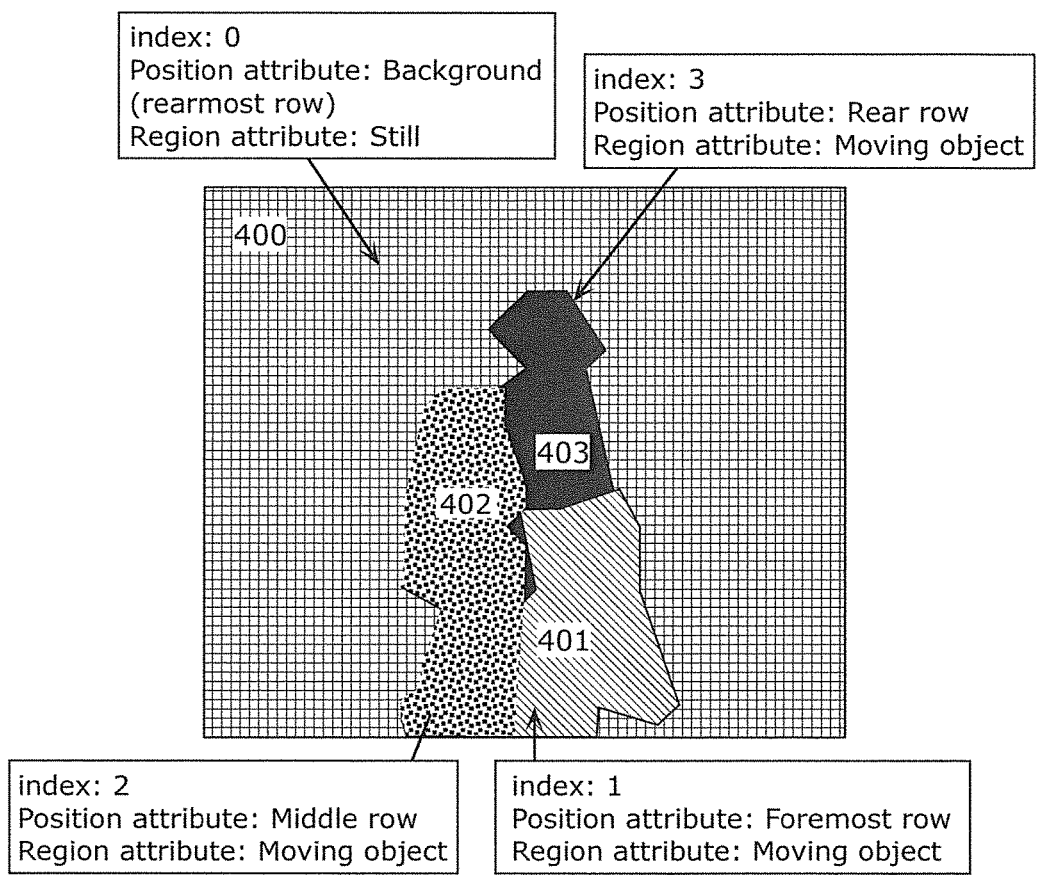

| Comment information storage server | | | | | | | | |
|---|---|---|---|---|---|---|---|---|
| Comment information | | | | | | | | |
| Video name | Display time | Comment | Provision time | User | Base coordinates | Comment shape | Comment index | ... |
| music_prfm | 00:00:18 | "Started" | 12.3.5. 12:55:00 | userA | 200, 50 | normal1 | 0 | ... |
| music_prfm | 00:00:19 | "I love it" | 12.5.5. 15:00:00 | userB | 150, 150 | normal1 | 1 | ... |
| music_prfm | 00:00:20 | "www" | 12.3.1. 12:00:00 | userC | 200, 200 | normal1 | 2 | ... |
| ... | | | | | | | | ... |

FIG. 17A
FIG. 17B
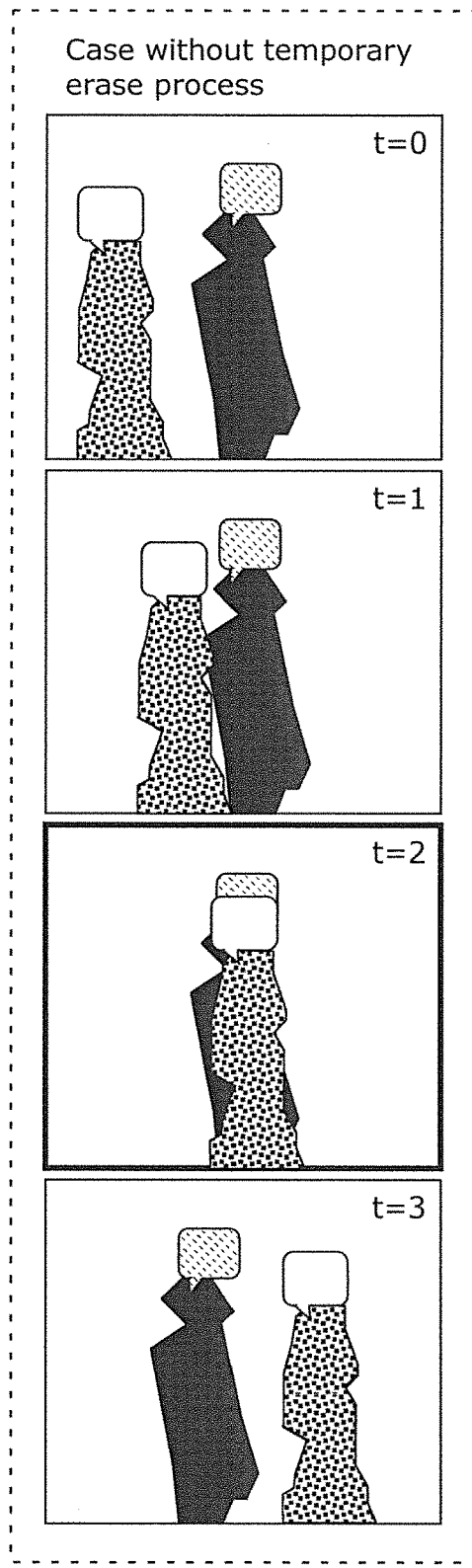
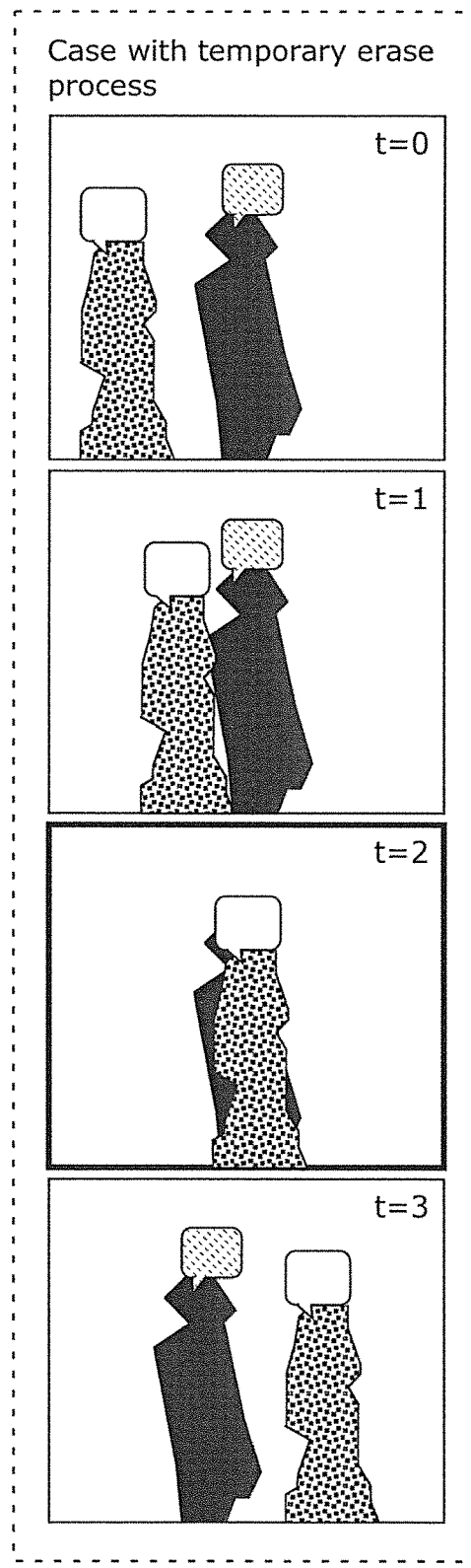

FIG. 19

| | | Subject region | |
|---|---|---|---|
| | | × | ○ |
| Presence or absence of user selection | × | (A)<br>(a) Subject and background regions:<br>　Rearmost positions<br><br>(b) Comment region:<br>　- Early in video time<br>　- Early in submission time<br>　- Associated subject region is frontward<br>　(Depth relationship)<br>　Moved to more backward position with decrease in ⋯. | (B)<br>(a) Selected subject region:<br>　Foremost position<br><br>(b) Others:<br>　Same standards with those in (A) |
| | ○ | (C)<br>(a) Selected comment region:<br>　Foremost position<br><br>((a') Subject region associated with selected comment region:<br>　May be at next frontward position<br><br>(b) Others:<br>　Same standards with those in (A) | (D)<br>(a) Selected comment region:<br>　Foremost position<br>(b) Selected subject region:<br>　Next frontward position<br>((a') Subject region associated with selected comment region:<br>　May be at position frontward next to (b)<br>((b') Subject region associated with selected comment region:<br>　May be at position frontward next to (b) and (a')<br>(c) Others:<br>　Same standards with those in (A) |

FIG. 23
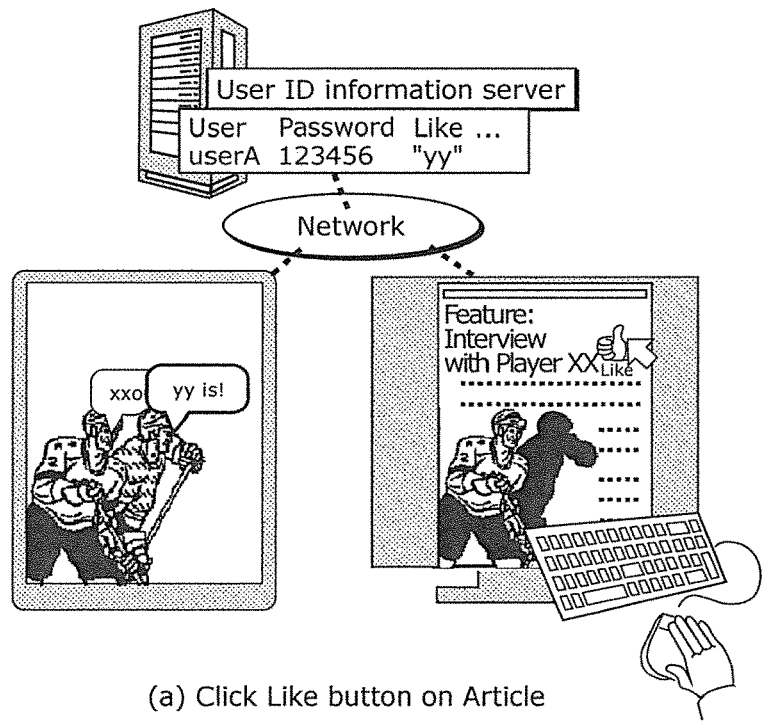
(a) Click Like button on Article
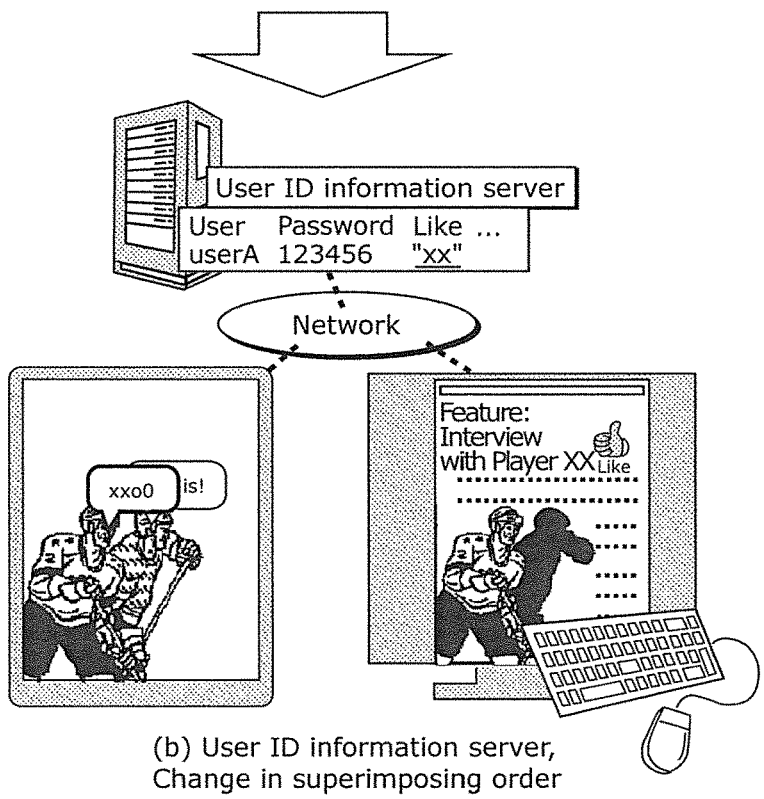
(b) User ID information server,
Change in superimposing order FIG. 24
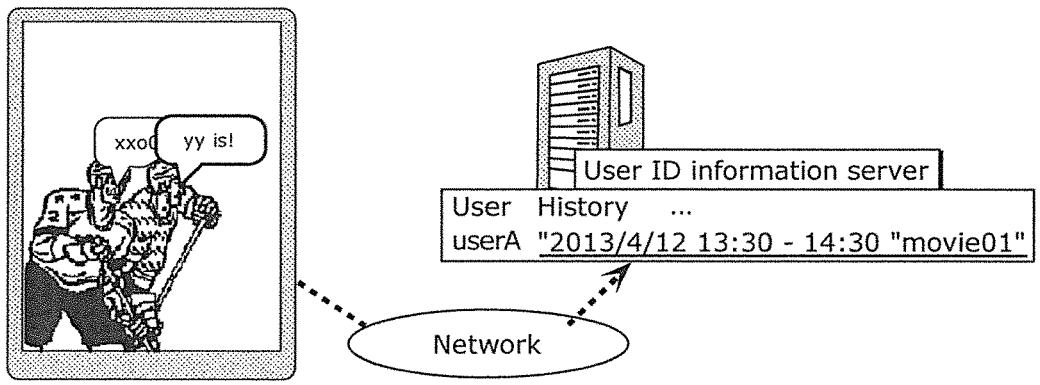
(a) First viewing of comment-provided video "movie01"
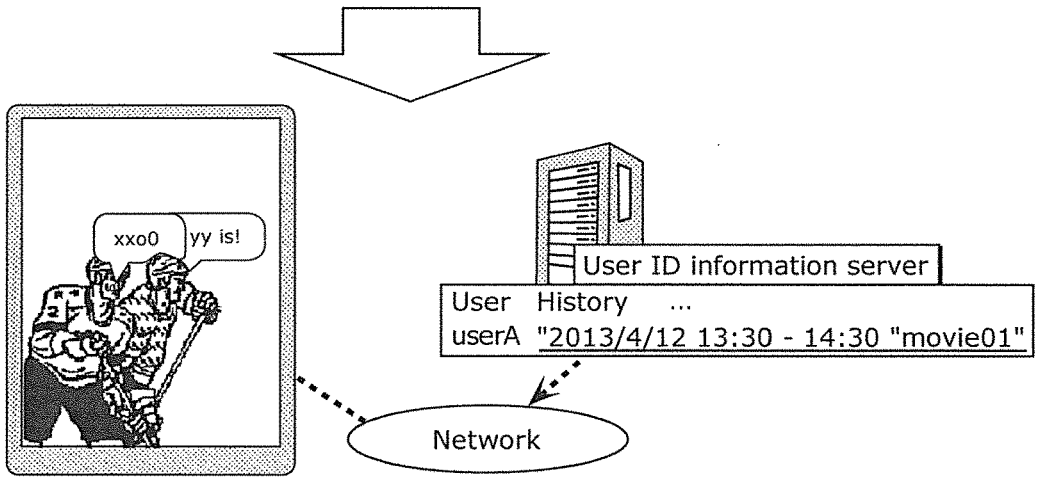
(b) Second viewing of comment-provided video "movie01"
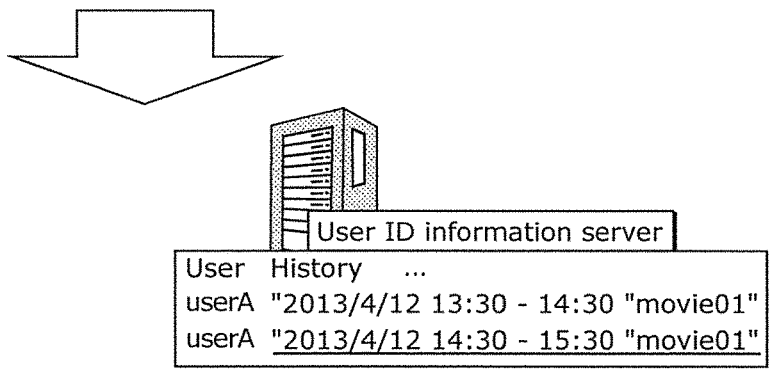
(c) Second viewing of comment-provided video "movie01"

(a) Select icon "Comment provision"

(b) Call keyboard by swipe (a) Display subjects and comments as viewed (b) Display subjects at foremost positions by superimposition (c) Display subject and specified comment at foremost positions by superimposition User instruction

COMMENT-PROVIDED VIDEO GENERATING APPARATUS AND COMMENT-PROVIDED VIDEO GENERATING METHOD

FIELD

One or more exemplary embodiments disclosed herein relate generally to a comment-provided video generating apparatus and a comment-provided video generating method for generating a comment-provided video including a comment related to a subject.

BACKGROUND

Recent advancement in network and diffusion of mobile terminals have made it easy and common for users to enjoy communicating video content or still image content with partners at remote places. For example, there is a service for enabling users to write sentences indicating their tastes, ideas, or the like at any time points on the time axis of an already provided content item. Such communication using the content item is expected to be on the increase with development of display devices and communication techniques.

In order to realize such communication, Patent Literature 1 shows a technique for superimposing a comment region including a comment onto a video and distributing the video through the Internet.

CITATION LIST

Patent Literature

[PTL 1]
Japanese Unexamined Patent Application Publication No. 2008-148071
[PTL 2]
Japanese Unexamined Patent Application Publication No. 2011-61528
[PTL 3]
Japanese Unexamined Patent Application Publication No. 2004-128614
[PTL 4]
International Patent Application Publication No. 2010/116820
[PTL 5]
Japanese Unexamined Patent Application Publication No. 2009-81592
[PTL 6]
Japanese Patent Publication No. 4994525

Non Patent Literature

[NPL 1]
Konpyuta Bijon—Gijutsu Hyoron to Shorai Tembo (Computer Vision—Technical Review and Foresight), edited by Takashi Matsuyama et. al., Dai 3 Sho "Kamera Kyariburasion" (Chapter 3 "Camera Calibration", published in 1998, by Shin Gijutsu Komunikasionzu (current name: Advanced Communication Media co.), ISBN: 4915851176

SUMMARY

Technical Problem

However, according to a conventional comment superimposing method, in the case where comment regions are overlapped with each other in a content, a comment that a user wants to read may be occluded by a comment region of another comment, or a comment region may occlude a subject that the user wants to see in the content, resulting in a decrease in visibility of the comment or the subject that the user wants to read or see without occlusion.

One non-limiting and exemplary embodiment provides a comment-provided video generating apparatus and a comment-provided video generating method for generating a video (comment-provided video) in which a comment or a subject which is important to a user is displayed with an increased visibility in a userfriendly manner.

Solution to Problem

In one general aspect, the techniques disclosed here feature a comment-provided video generating apparatus including: a data obtaining unit configured to obtain a video from a video server, and obtain, from a comment information storage server, comment information including (i) comments regarding the video, and (ii) display time and display positions of comment regions including the comments in the video; an input receiving unit configured to receive, as a user input, user information including a specified time and a specified position in the video; a display priority calculating unit configured to calculate a display priority for each of the comment regions and subject regions to which the comments are provided, based on the user information and association information indicating associations between the comments and the subject regions, by calculating higher display priorities for one of the comment regions and the subject regions which corresponds to the specified time and the specified position included in the user information, and for either (i) one of the subject regions which is provided with a comment included in the comment region which corresponds to the specified time and the specified position included in the user information, or (ii) one of the comment regions which includes a comment provided to the subject region which corresponds to the specified time and the specified position included in the user information, than the other display priority for each of the other subject regions and the other comment regions; a comment superimposing method determining unit configured to determine a superimposing method for superimposing a comment region or a subject region which has a higher display priority at a position more frontward than a position of a comment region or a subject region which has a lower display priority according to the display priority calculated by the display priority calculating unit when the comment regions and the subject regions are displayed in the video on an image display unit; an image composing unit configured to generate a comment-provided video by composing the comment regions in the video, according to the superimposing method determined by the comment superimposing method determining unit; and an image output unit configured to output the comment-provided video generated by the image composing unit, wherein the image output unit is configured to output, onto the image display unit, the comment-provided video in which either (i) a first pair of the one of the subject regions and a corresponding one of the comment regions which includes a comment provided to the subject region or (ii) a second pair of the one of the comment regions and a corresponding one of the subject regions to which a comment included in the comment region is provided is superimposed and displayed on the other subject regions and the corresponding comment regions including comments provided to the other subject regions, the subject region in the first pair and the comment region in the second pair corresponding to a user-selected region located at the specified position indicated by the user information.

General and specific aspect(s) disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiment will be apparent from the Specification and Drawings. The benefits and/or advantages may be individually obtained by the exemplary non-limiting embodiment and features of the Specification and Drawings, which need not all be provided in order to obtain one or more of such benefits and/or advantages.

Advantageous Effects

According to one or more exemplary embodiments or features disclosed herein make it possible to generate a video in which a comment region including a comment is superimposed with an increased visibility.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 5A is a diagram showing an example of data to be stored in a comment information storage server.

FIG. 10A is a diagram schematically showing subject region information obtained by a data obtaining unit.

FIG. 10B is a diagram showing an example of a data structure of the subject region information.

FIG. 17A is a diagram showing a display example of the video including the frames in which both of the comment regions are displayed.

FIG. 17B is a diagram showing a display example of the video including the frames in one of which one of the comment regions is temporarily erased or made into a non-display state when the other comment region is displayed.

FIG. 19 is a diagram for explaining relationships between user specifications and display priorities.

FIG. 23 is a diagram showing a change in a superimposition order of comment regions and subject regions, made together with an activity of a user on the Internet.

FIG. 24 is a diagram showing a superimposition order of comment regions and subject regions and a viewing history of a video, both of which are updated each time the video is viewed.

Figure 1:
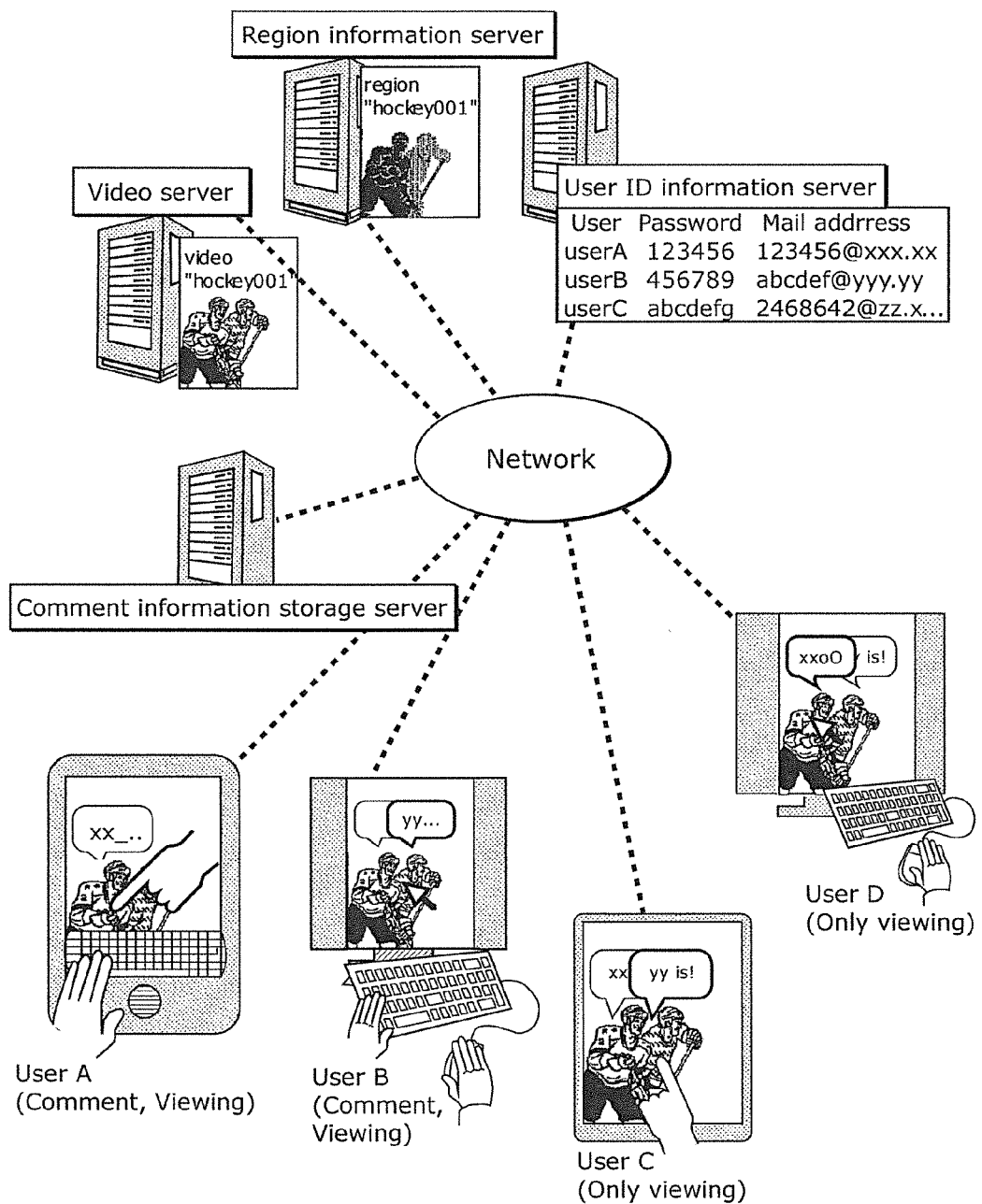
FIG. 1 is a diagram showing an example of a structure of a video distributing system in Embodiment 1.

DESCRIPTION OF EMBODIMENTS (Underlying Knowledge Forming Basis of the Present Disclosure)

In relation to conventional comment superimposing methods disclosed in the Background section, the inventors have found the problems below.

Patent Literature 1 discloses a system including a video server and a comment distribution server in which comments written by users through networks are stored firstly, and then are superimposed on videos and distributed. Each comment newly written in a video by a user when the video is distributed and reproduced is managed in the comment distribution server in a form according to a video time axis in addition to a real time point at which the comment is provided by the user. The comment written in the video is, for example, distributed along the video time axis irrespective of user comment time (a time point at which the user provided the comment) in the future distribution. In many cases of video distribution services assumed in Patent Literature 1, several comments are provided to a particular scene in the same frame of a video, and comment regions including the comments are dominant in a part of the particular scene. In order to prevent such an overlap between comment regions, some schemes have been disclosed which include to adjust speeds of comment regions moving in a video on a display screen and to adjust the display position of an old comment if a new comment is to be provided at the display position of the old comment.

Patent Literature 2 shows a system for allowing users to submit manuscript comments, while Patent Literature 1 handles character information as comments. The system in Patent Literature 2 is designed for use in the case where a plurality of comment regions each including a manuscript comment in a target video are in contact with each other or a partial video region in a target video overlaps a manuscript region. In such a case, the system selects and displays an image effect representing an overlap between the comments or the comment and the partial video region based on a user instruction. Here, the partial video region is a region discriminated based on brightness, color, contrast, and so on.

On the other hand, Patent Literature 3 discloses a chat system capable of composing and displaying character data in balloons in a video. The chat system in Patent Literature 3 determines a method for displaying each of balloons which appears in a video during a chat at a display position other than positions of previously provided balloons and user face images arranged and composed at predefined positions on a background image in the video.

In addition, there has been proposed an approach for adding character information to videos without use of the Internet.

Patent Literature 4 shows a video recorder which displays supplemental data to captured videos. Patent Literature 4 proposes an approach for, for example, displaying supplemental data using characters and a balloon, and changing the display position of the balloon according to a motion of an object in the video.

In addition, Patent Literature 5 shows an approach for inputting character information and illustration information to content items held personally using mobile terminals. Patent Literature 5 proposes a function for providing a visual effect of causing the character information and illustration information to track an object in an object frame manually specified by a user, using a motion vector defined by the Moving Picture Experts Group (MPEG) in the frame.

In view of the conventionally proposed approaches for inserting comments into videos as described above, one or more embodiments disclosed here have been conceived particularly focusing on the fact that most of videos distributed by content providers and content items held personally (hereinafter referred to as "actual image content items") includes a plurality of objects (subjects) per scene. Conventionally, in the case of communication through comments on such an actual image content item, it is difficult to generate a comment-provided video in which a comment or a subject important to a user is not occluded, especially when a plurality of comment regions and a plurality of objects are present therein at the same time.

Patent Literature 1 discloses the approach for preventing an overlap between comment regions, but does not solve the problem that the video in which the comment regions are superimposed is very difficult to see. The approach in Patent Literature 1 is for displaying the comment regions without considering the positions of the objects in the video. Thus, in a particular case where one of the objects in the video is an object that the user wants to see without occlusion, the visibility of the object inevitably decreases.

The system in Patent Literature 2 regards, to be the object, the partial video region having a motion relatively different from the motion of the background in the video, and determines that the object affects one or more of the comment regions. However, Patent Literature 2 does not specifically disclose an approach for generating the partial video region in the case where a plurality of objects are present. In this case, the visibility of the object may be maintained when one of the comment regions and one of the objects becomes in contact with each other and the comment region "adheres to" the outer periphery of the object. However, since the relationships with the other objects are not considered, the visibility of the other objects inevitably decreases.

The approach disclosed in Patent Literature 3 is for arranging a plurality of balloons for a plurality of objects representing chat members, on the premise that these objects are composed at predetermined positions. Thus, this approach cannot be used for actual image content items.

Patent Literatures 4 and 5 disclose display of balloons which track objects or balloons with consideration of motions of the objects, but do not at all disclose a method for displaying balloons (comment regions) with consideration of region information of a plurality of objects.

In one general aspect, the techniques disclosed here feature a comment-provided video generating apparatus including: a data obtaining unit configured to obtain a video from a video server, and obtain, from a comment information storage server, comment information including (i) comments regarding the video, and (ii) display time and display positions of comment regions including the comments in the video; an input receiving unit configured to receive, as a user input, user information including a specified time and a specified position in the video; a display priority calculating unit configured to calculate a display priority for each of the comment regions and subject regions to which the comments are provided, based on the user information and association information indicating associations between the comments and the subject regions, by calculating a highest display priority for one of the comment regions and the subject regions which corresponds to the specified time and the specified position included in the user information, and calculating a next highest display priority for either (i) one of the subject regions which is provided with a comment included in the comment region which corresponds to the specified time and the specified position included in the user information, or (ii) one of the comment regions which includes a comment provided to the subject region which corresponds to the specified time and the specified position included in the user information; a comment superimposing method determining unit configured to determine a superimposing method for superimposing a comment region or a subject region which has a higher display priority at a position more frontward than a position of a comment region or a subject region which has a lower display priority according to the display priority calculated by the display priority calculating unit when the comment regions and the subject regions are displayed in the video on an image display unit; an image composing unit configured to generate a comment-provided video by composing the comment regions in the video, according to the superimposing method determined by the comment superimposing method determining unit; and an image output unit configured to output the comment-provided video generated by the image composing unit, wherein the image output unit is configured to output, onto the image display unit, the comment-provided video in which either (i) a first pair of the one of the subject regions and a corresponding one of the comment regions which includes a comment provided to the subject region or (ii) a second pair of the one of the comment regions and a corresponding one of the subject regions to which a comment included in the comment region is provided is superimposed and displayed on the other subject regions and the corresponding comment regions including comments provided to the other subject regions, the subject region in the first pair and the comment region in the second pair corresponding to a user-selected region located at the specified position indicated by the user information.

With this structure, it is possible to calculate the higher display priority for the one of the comment regions and subject regions which corresponds to the specified time and the specified position (coordinates) included in the user information and specified by the user who is browsing the video, compared to the display priorities for the other regions, and based on the calculated display priority, to generate the comment-provided video by superimposing and composing the comment regions of the comments in the video (video data). Here, it is possible to realize the user-friendly display while maintaining the visibility of the comment or subject region which is important to the user by superimposing and displaying some of the comment regions on particular ones of the subject regions and comment regions and not superimposing and displaying any one of the comment regions on the comment or subject region which is important to the user and thus is specified by the input from the user (in the latter case, the non-specified regions may be displayed behind the specified comment or subject region). In this way, it is possible to generate the comment-provided video in which the comment or subject that the user wants to see without occlusion has an increased visibility among the other comment and subject regions superimposed and displayed therein.

In addition, information indicating associations between the comment regions and the subject regions is stored in advance, and thus it is possible to generate the comment-provided video in which one of the subject region and the comment region which corresponds to the user-specified (user-input) time or position (coordinates) in the video included in the user information (user input) is superimposed at the position more frontward than the position of the other regions when displayed therein.

For example, among the comment regions other than (i) the comment region corresponding to the specified time and the specified position included in the user information or (ii) the comment region including the comment provided to the subject region corresponding to the specified time and the specified position, the comment superimposing method determining unit may be further configured to determine, based on depth relationship between the subject regions in a frame of the video, a superimposing method for superimposing a comment region including a comment provided to a subject region located frontward on the other subject regions and the corresponding comment regions located backward, and when the comment regions other than (i) the comment region corresponding to the specified time and the specified position or (ii) the comment region including the comment provided to the subject region corresponding to the specified time and the specified position may be displayed in the video on the image display unit, the comment region including the comment provided to the subject region located frontward is superimposed on the other subject regions and the corresponding comment regions located, based on the depth relationship between the subject regions.

With this structure, it is possible to provide the comment-provided video in which the depth relationships between the subject regions other than the subject region specified by the user are reflected in the depth relationships between the corresponding comment regions.

In addition, the display priority calculating unit may be configured to calculate a higher display priority for a comment region including a comment which is provided later in either the display time included in the comment information or in real submission time of the comments, the comment superimposing method determining unit may be further configured to determine, based on the display priority, a superimposing method for superimposing the comment region including the comment provided later in either the display time included in the comment information or in the real submission time of the comments at a more frontward position in the video on the image display unit, and the comment region including the comment provided later in either the display time included in the comment information or in the real submission time of the comments may be superimposed and displayed at the more frontward position in the video on the image display unit.

With this structure, it is possible to provide the comment-provided video in which the comment region provided later in either the display time or the submission time among the comment regions other than the user-specified one is superimposed and displayed at the more frontward position.

In addition, the above-described comment-provided video generating apparatus may further include a user information obtaining unit configured to obtain the user information from a user ID information server, wherein, when user ID information in the user ID information server is updated while the user is viewing the video, the display priority calculating unit may be further configured to calculate a new display priority for each of the comment regions and the subject regions, based on the updated user ID information.

With this structure, it is possible to provide the comment-provided video in which a change in the user's tastes is reflected without any direct user specification on the video.

In addition, the comment superimposing method determining unit may be further configured to: calculate, for each of pixels in an overlap area between two regions which are either (i) one of the subject regions and one of the comment regions or (ii) two of the comment regions, a transparency of the pixel to be displayed semi-transparent, based on a display priority ratio of the display priorities calculated for the two regions including the pixels by the display priority calculating unit; and determine a superimposing method for displaying more opaquely one of the two regions which is superimposed at the position more frontward than the position of the other one of the two regions according to the calculated transparency.

With this structure, it is possible to provide a display effect of displaying transparent both the pixels in one of the comment regions and either the pixels in another one of the comment regions or in one of the subject regions.

In addition, the comment superimposing method determining unit may be further configured to determine, based on information describing an occlusion relationship between subject regions among the subject regions, a superimposing method for displaying comment regions including comments corresponding to the subject regions in the occlusion relationship by temporally stopping the comment regions at positions before a start of an occlusion period in which the subject regions are in the occlusion relationship, and causing the comment regions to re-start tracking the subject regions after the occlusion period, and in the comment-provided video displayed on the image display unit, the comment regions including the comments corresponding to the subject regions in the occlusion relationship may be temporally stopped at the positions before the start of the occlusion period in which the subject regions are in the occlusion relationship, and may be caused to re-start tracking the subject regions after the occlusion period.

With this structure, it is possible to provide the comment-provided video in which both of the comment regions of the comments which are provided to the subject regions in the occlusion relationship and which the user wants to see are displayed in the userfriendly manner without occlusion.

In addition, the comment superimposing method determining unit may be further configured to determine, based on information describing an occlusion relationship between subject regions among the subject regions, a superimposing method for displaying comment regions including comments provided to the subject regions in the occlusion relationship by integrating the comment regions which are balloons at positions before a start of an occlusion period in which the subject regions are in the occlusion relationship into a comment region which is a balloon, dividing the comment region which is the balloon into separate comment regions which are balloons after the occlusion period, and causing the comment regions to track the subject regions, and in the comment-provided video displayed on the image display unit, the comment regions which are the balloons at the positions before the start of the occlusion period in which the subject regions are in the occlusion relationship may be integrated into the comment region which is the balloon, the comment region which is the balloon may be divided into the separate comment regions which are the balloons after the occlusion period, and the comment regions may be caused to track the subject regions.

With this structure, it is possible to provide the comment-provided video in which the subject regions in the temporary occlusion relationship and the comments provided thereto are emphasized and displayed in the userfriendly manner.

In addition, the comment superimposing method determining unit may be further configured to determine, based on information describing an occlusion relationship between subject regions among the subject regions, a superimposing method for displaying only a comment region corresponding to an occluding subject region closer to a location of a camera used to capture the video among comment regions including comments provided to the subject regions in the occlusion relationship during an occlusion period in which the subject regions are in the occlusion relationship, and displaying all of the comment regions including comments provided to the subject regions after the occlusion period, and in the comment-provided video displayed on the image display unit, only the comment region corresponding to the occluding subject region closer to the location of the camera used to capture the video among the comment regions including the comments provided to the subject regions in the occlusion relationship may be displayed during the occlusion period in which the subject regions are in the occlusion relationship, and all of the comment regions including the comments provided to the subject regions may be displayed after the occlusion period.

With this structure, it is possible to provide the comment-provided video in which relationships between the subjects in real scenes are emphasized and displayed in the user-friendly manner.

In addition, the comment superimposing method determining unit may be configured to determine a superimposing method and a transparency for superimposing the comment regions by displaying one of the comment regions which includes the comment provided to the occluding subject region semi-transparent, and all of the comment regions non-semi-transparent after the occlusion period, and in the comment-provided video displayed on the image display unit, the comment region including the comment provided to the occluding subject region may be displayed semi-transparent, and all of the comment regions may be displayed non-semi-transparent after the occlusion period.

With this structure, it is possible to display the comment-provided video in which the subject regions in the temporary occlusion relationship and the comments provided thereto are emphasized and displayed in the userfriendly manner.

In addition, the comment superimposing method determining unit may be configured to further determine a superimposing method for displaying only a comment region which is displayed at a foremost position in each of frames of the video in a case of normal reproduction among the comment regions in the frame, during a period in which a viewing method which is other than the normal reproduction and includes fast forward, preview, rewind, and skip is performed on the comment-provided video, and in the comment-provided video displayed on the image display unit, only the comment region which is displayed at the foremost position in each of the frames of the comment-provided video in the case of the normal reproduction among the comment regions in the frame may be displayed, during the period in which the viewing method which is other than the normal reproduction and includes fast forward, preview, rewind, and skip may be performed on the comment-provided video.

With this structure, by displaying only such important comments when the user needs to understand information in a frame in a short time duration in the case of fast forward, rewind, or the like, it is possible to provide the comment-provided video which reflects the user's tastes and thus can be read and understood by the user in such short time duration.

In addition, the user information obtaining unit may be further configured to obtain viewing history of the user stored externally or in the user ID information server, when the comment-provided video which has been viewed by a user may be viewed by the user, the display priority calculating unit may be further configured to provide a comment region or a subject region displayed at a foremost position when viewed last time by the user with a lowest display priority, and thus, in the comment-provided video displayed on the image display unit, the comment region displayed at the foremost position when viewed last time by the user may be displayed at a rearmost position.

With this structure, the depth relationships between the comment regions are updated each time the user watches the video. Thus, it is possible to provide the same user with the video having the same content presented in a different superimposition and display manner each time the user watches the video.

In addition, the display priority calculating unit may calculate, for each of the plurality of comments, association information indicating an association between the comment and the subject region to which the comment is provided, based on the display position of the comment indicated by the comment information, and, based on the calculated association information, calculate the display priority of each of the comment regions and the subject regions by calculating a highest display priority for one of the comment regions and the subject regions which corresponds to the specified time and the specified position included in the user information, and a next highest display priority for either (i) one of the subject regions which is provided with a comment corresponding to the specified time and the specified position included in the user information, or (ii) one of the comment regions which includes a comment provided to the subject region which corresponds to the specified time and the specified position included in the user information.

With this structure, since the association information between the comment region and the subject region is calculated, even when no such association information is obtained in advance, it is possible to generate the comment-provided video in which one of the subject region and the comment region which corresponds to the user-specified (user-input) time or position (coordinates) in the video included in the user information (user input) is superimposed at the position more frontward than the position of the other regions when displayed therein.

In addition, the comment information may further include, for each of the plurality of comments, information indicating a display position and a display shape of a balloon in which the comment is displayed. Based on the information indicating the display position and the display shape of the balloon, the display priority calculating unit may calculate, for each comment, association information indicating the subject region to which the comment is provided, and based on the calculated association information, may calculate by calculating a highest display priority for one of the comment regions and the subject regions which corresponds to the specified time and the specified position included in the user information, and a next highest display priority for either (i) one of the subject regions which is provided with a comment corresponding to the specified time and the specified position included in the user information, or (ii) one of the comment regions which includes a comment provided to the subject region which corresponds to the specified time and the specified position included in the user information.

With this structure, when the subject region is specified by the user, it is possible to provide the comment-provided video in which the specified subject region and the comment region of the comment provided to the subject region are superimposed on the other subject regions and comment regions when displayed therein.

In addition, in the case where the comment regions (comments) corresponding to the specified time and the specified position included in the user information exists, the display priority calculating unit may further calculate the display priority of each of the comment regions and the subject regions by calculating, for each of the comment regions other than the comment region, a display priority lower than the display priorities for all of the subject regions.

In the opposite case where no such comment region corresponding to the specified time and the specified position included in the user information exists, the display priority calculating unit may further calculate the display priority for each of the comment regions and the subject regions by calculating, for all of the comment regions, display priorities lower than the display priorities for all of the subject regions.

With this structure, it is possible to superimpose and display the subjects on the comment regions other than the comment region specified by the user.

In addition, in the case where the subject region corresponding to the specified time and the specified position included in the user information exists, the display priority calculating unit may further calculate the display priority for each of the comment regions and the subject regions by calculating, for the subject regions other than the subject region, display priorities lower than the display priorities for all of the comment regions. In the opposite case where no such comment corresponding to the specified time and the specified position included in the user information exists, the display priority calculating unit may further calculate the display priority for each of the comment regions and the subject regions by calculating, for all of the subject regions, display priorities lower than the display priorities for all of the comment regions.

With this structure, it is possible to provide the comment-provided video in which the subject region specified by the user and another one of the subject regions can be displayed with one of the comments interposed therebetween.

Alternatively, the display priority calculating unit may calculate a higher display priority for each of the plurality of comments including the specified comment corresponding to the specified time and the specified position included in the user information and other comments provided by a provider of the specified comment, compared to the other comments provided by other users.

With this structure, it is possible to superimpose and display the comments provided by the provider of the comment specified by the user at the position more frontward than the positions of the other comments without requiring the user to specify the comments of the provider on the display screen one by one.

In addition, the comment-provided video generating apparatus may include a subject region information generating unit which generates subject region information indicating subject regions generated in a frame of the video by dividing the frame.

In general, a video is not provided in advance any information regarding subject regions included therein. However, with this structure, even when subject regions are unknown, it is possible to detect the subject region information by the division, and utilizes the detected subject region information.

In addition, when the user adds a new comment to the video, it is also good to estimate one of the subject regions and the comment regions which is highly likely to be provided with the comment by the user, and modify display of the video by superimposing and displaying the estimated region at a frontward position. The comment-provided video generating apparatus having this structure can, as the input supporting apparatus supports, provide the comment-provided video in which the region that is highly likely to be provided with the comment by the user can be easily specified by the user.

In one general aspect, the techniques disclosed here feature a comment-provided video generating apparatus according to an aspect includes: a subject region information generating unit configured to: obtain a video captured by a camera from the mobile terminal including the camera used to capture an image of a user positioned in front of the camera, a display which is provided at a position that allows the user to visually recognize the display, a Global Positioning System (GPS), and a compass; and generate subject region information indicating a plurality of subject regions in a frame of the obtained video based on content of the video, the subject regions being generated in the frame by dividing the frame; a data obtaining unit configured to obtain comment information including (i) GPS information of other mobile terminals located in a predetermined range from the user and (ii) a plurality of comments associated one to one to the other mobile terminals; an input receiving unit configured to receive, as a user input, user information including a specified position in the video; a comment position estimating unit configured to calculate positions of the other mobile terminals in the video, based on the GPS information of the mobile terminal of the user and the other mobile terminals and information of the compass of the mobile terminal, and associate one to one subject regions presenting subjects who are users of the other mobile terminals and the comments included in the comment information obtained by the data obtaining unit, based on the calculated positions of the other mobile terminals; a display priority calculating unit configured to calculate, based on the comment information and the user information, a display priority for each of the comment regions which are superimposed and displayed in the video and the subject regions in the video by calculating, for a comment region including a comment corresponding to a subject region located at a display position specified by the user information among the comment regions, a display priority which is higher than the other display priority for each of the other subject regions and the other comment regions; a comment superimposing method determining unit configured to determine, as a superimposing method for displaying the plurality of comment regions in the video, one of first and second methods according the display priority calculated by the display priority calculating unit: the first method being for determining a display order for displaying the comment regions and the subject regions in the video on an image display unit by superimposing a comment region or a subject region which has a higher display priority on a comment region or a subject region which has a lower display priority according to the display priority calculated by the display priority calculating unit; and the second method being for determining a transparency for displaying a comment region or a subject region which has a higher transparency more opaquely according to the display priority; an image composing unit configured to superimpose the comment regions in the video, according to the comment superimposing method determined by the comment superimposing method determining unit; and an image output unit configured to output the comment-provided video in which the comment regions are superimposed by the image composing unit.

With this structure, it is possible to generate and display a comment-provided video in which a comment region corresponding to a user-specified subject region is not occluded by another comment region when a comment corresponding to a subject in a video captured by the user is displayed as in the case of using an Augmented Reality (AR) technique.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, exemplary non-limiting embodiments are described in detail with reference to the accompanying Drawings. The exemplary embodiment described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

FIG. 1 shows a simple example of a configuration of a video distributing system according to this embodiment. As in Patent Literature 1, the video distributing system includes a video server, a comment information storage server, a user ID information server, and a region information server. Each server may be managed on the same personal computer (PC) or on different PCs.

Users A to D shown in FIG. 1 browse a video distributed to their terminals (such as smart phones, PCs, and tablet PCs) through networks. In this example, the users A and B provide comments to the video via keyboards, software keyboards, or the like of their terminals. Each comment is character information, and is provided to the video, in association with a user-specified temporal position (corresponding to a specified time or a specified frame number) and a spatial position (coordinates) in the video. The term "video" used in the following descriptions refers to as video or video data.

Each of the comments provided by the users is stored into the comment information storage server at any time, in association with an image to which the comment is provided and various kinds of information such as a user ID of the user, a time point and a set of coordinates of the comment (in the video), and real time at which the comment is submitted. In the case where, other users C and D view the video after the users A and B provide the comments onto the video, the comments of the users A and B are distributed from the comment information storage server together with other comments associated with the video. In addition, the comments are composed on the video, based on the information (video time that is time elapsed in the video, coordinates, etc.) associated with the comments. In this way, the video on which the comments are superimposed is displayed is provided. How the comments are displayed in the above processes are closely related to real time (comment submission time) at which the comments are submitted and comment display time in the video.

Figure 2A:
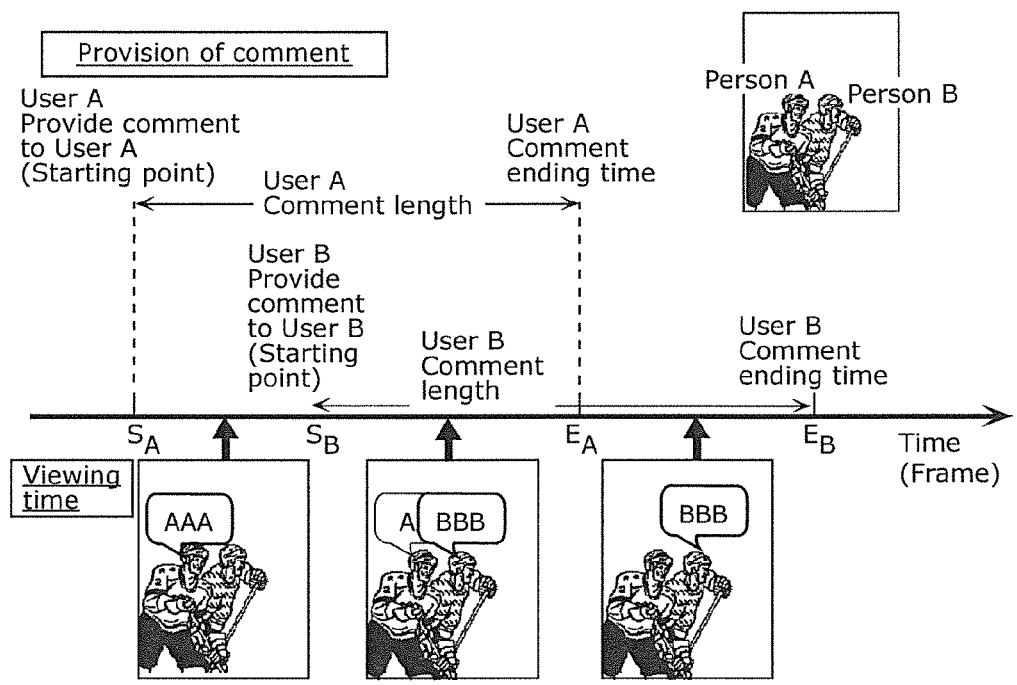
FIG. 2A is a diagram showing a time flow of provision of comments to a video.

FIG. 2A shows relationships between the comments to be displayed in a video and time in the video. Taking the example in which the users A and B provide the comments to the video, a flow of providing and displaying comments is described in detail below. Each comment may have a length specified by the user, or a predetermined length (for example, 2 seconds, or the like). Here, "second" is used below as a unit time, but the second may be replaced with the number of frames.

As shown in FIG. 2A, the comment of the user A is displayed from SA second to EA second in the video time, and the comment of the user B is displayed from SB second to EB second in the video time. Accordingly, when the video is viewed, only the comment of the user A is displayed from SA second to SB second, both of the comments of the users A and B are displayed from SB second to EA second, and only the comment of the user B is displayed from EA second to EB second.

Figure 2B:
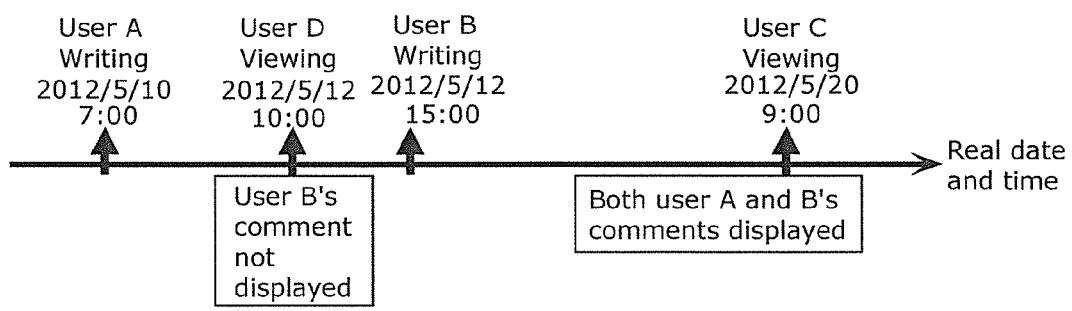
FIG. 2B is a diagram showing relationships between dates and time in the flow and the comments to be displayed.

In addition, FIG. 2B shows relationships between dates and time in a real time flow and comments to be displayed in the video. The user D who views the video between the comment provision (writing) by the user A and the comment provision (writing) by the user B can view only the comment of the user A. On the other hand, the user C who views the video after the comment provision by the users A and B can view both of the comments of the users A and B.

In many cases, a comment region including a comment provided later in the video time or the real time is generally superimposed and composed on a comment region including a comment provided before the later-provided comment, so as to increase the visibility of the later-provided comment.

Figure 3:
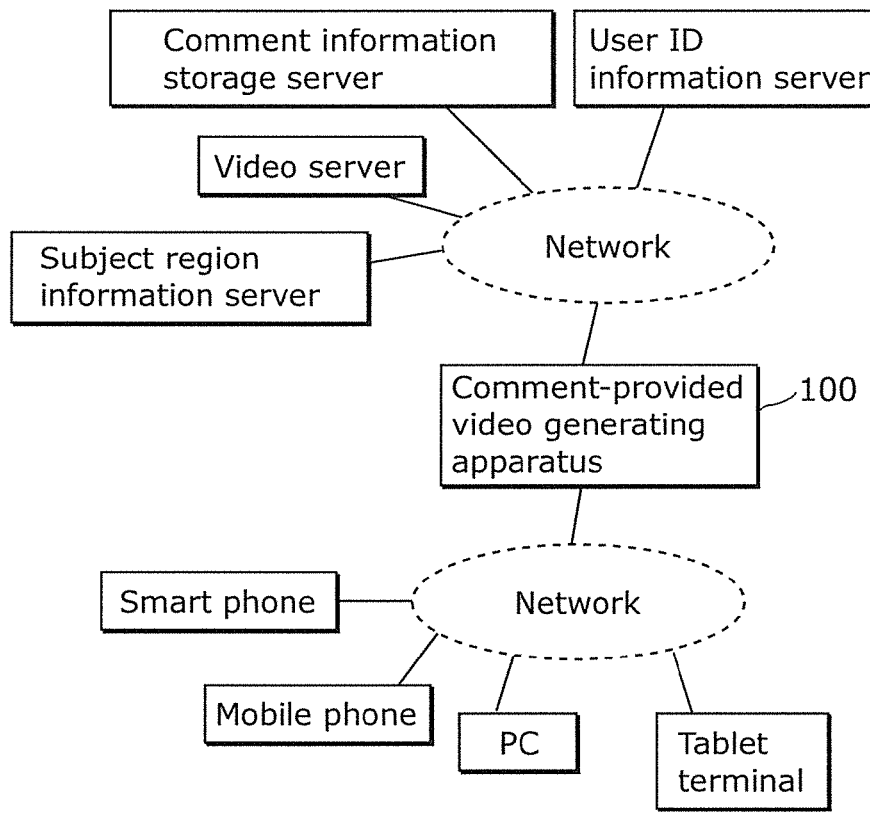
FIG. 3 is a diagram showing an entire configuration of the video distributing system including a comment-provided video generating apparatus.

FIG. 3 is a diagram showing a simple configuration of a video distributing system including the comment-provided video generating apparatus. The comment-provided video generating apparatus 100 distributes a comment-provided video to terminals of individuals through networks. In addition, the comment-provided video generating apparatus 100 obtains comments to be provided, information of users who input the comments, etc. from the servers and terminals through networks.

Figure 4:
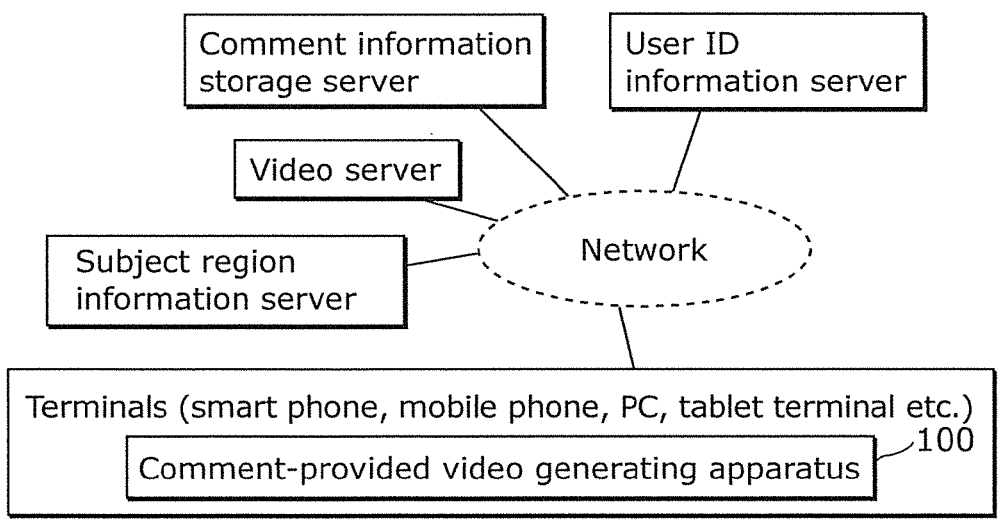
FIG. 4 is a diagram showing another entire configuration of the video distributing system including the comment-provided video generating apparatus.
Figure 5B:
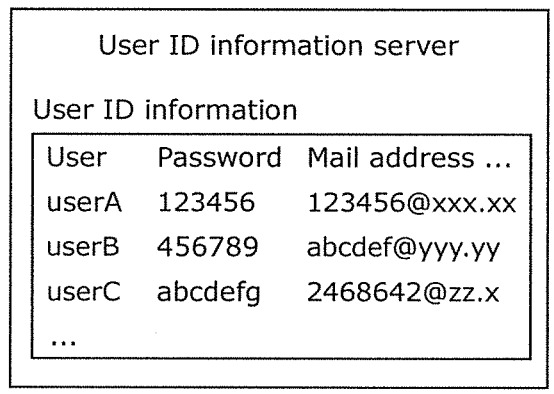
FIG. 5B is a diagram showing an example of data to be stored in a user ID information server.
Figure 5C:
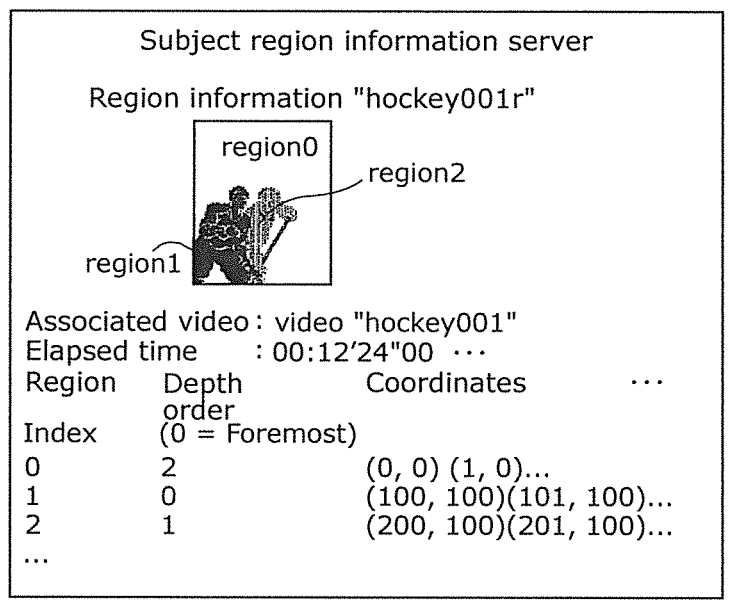
FIG. 5C is a diagram showing an example of data to be stored in a subject region information server.
Figure 5D:
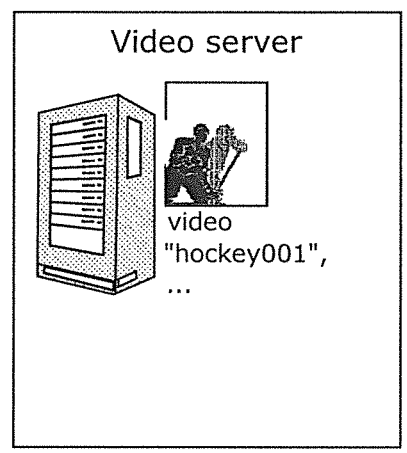
FIG. 5D is a diagram showing an example of data to be stored in a video server.

Functions of the comment-provided video generating apparatus 100 may be included in each of the terminals of the individuals. FIG. 4 shows such an example. In this structure, the comment-provided video generating apparatus 100 obtains information from each server via a network, and performs processes in the terminal, and displays a comment-provided video using the terminal.

FIG. 5A to 5D show examples of data items to be stored in a comment information storage server, a user ID information server, a subject region information server, and a video server, respectively. Each server stores information used for associating each comment and a corresponding video and subject region. In this embodiment, these information items are used to determine a comment superimposing method. The information and comment superimposing method are described in detail later.

Figure 6:
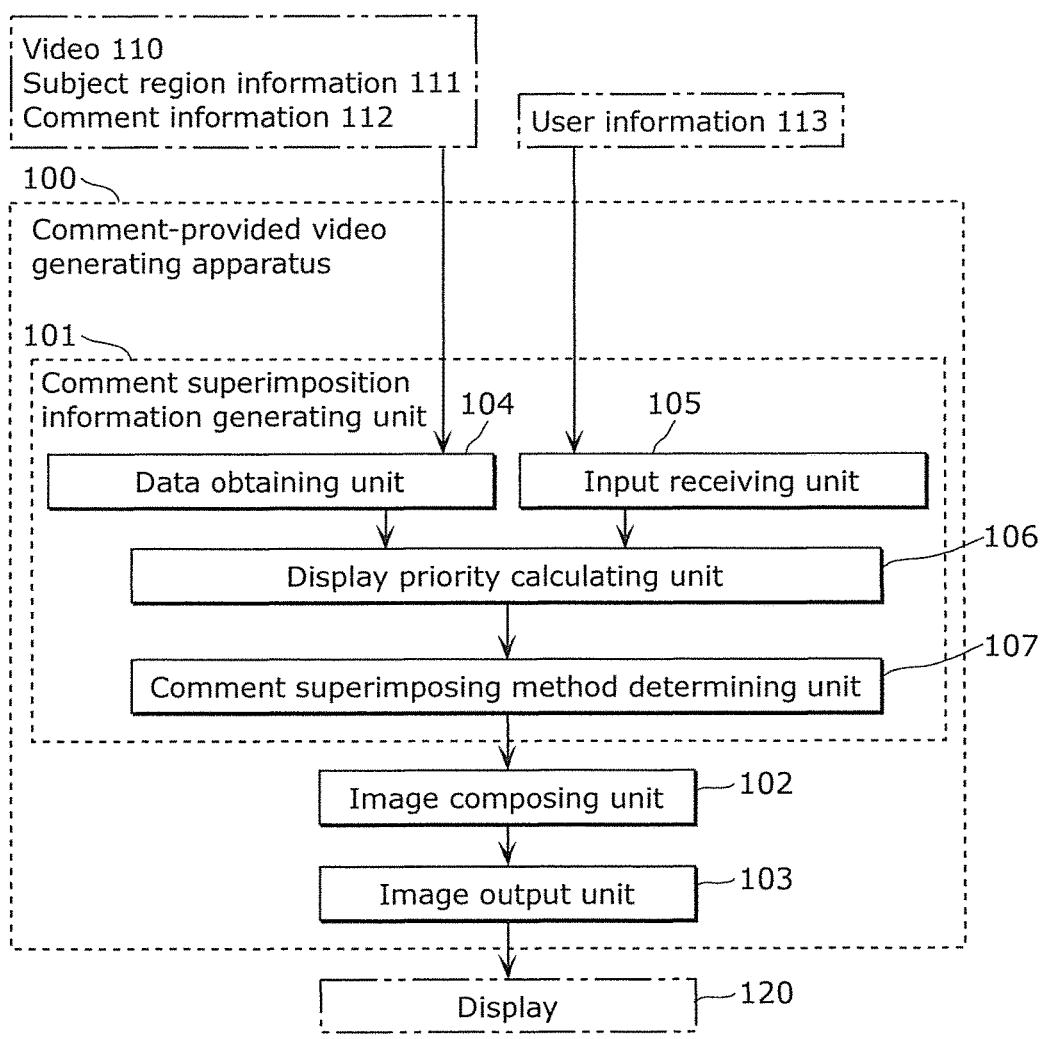
FIG. 6 is a block diagram showing a structure of the comment-provided video generating apparatus according to Embodiment 1.

FIG. 6 shows a structure of the comment-provided video generating apparatus 100 in Embodiment 1. The comment-provided video generating apparatus 100 includes a comment superimposition information generating unit 101, an image composing unit 102, and an image output unit 103. The comment-provided video generating apparatus 100 generates a comment-provided video based on a video 110, subject region information 111, comment information 112, and user information 113, and outputs them onto a display 120 (which is an image display unit). The display 120 displays the comment-provided video output from the comment-provided video generating apparatus 100. The video 110, the subject region information 111, and the comment information 112 are stored in the video server, the comment information storage server, and the subject region information server, respectively. The comment superimposition information generating unit 101 obtains these information items through communication paths such as networks. The comment information 112 stored in the comment information storage server is sequentially updated each time a user provides a comment, and the details change as time elapses.

The comment superimposition information generating unit 101 determines how each comment is to be displayed at a point of video time, based on the video 110, the subject region information 111, the comment information 112, and the user information 113. The image composing unit 102 generates a comment-provided video by composing the comment onto the video, based on the comment display method determined by the comment superimposition information generating unit 101. The image output unit 103 outputs, onto the display 120, the comment-provided video generated through the composition by the image composing unit 102.

The comment superimposition information generating unit 101 includes a data obtaining unit 104, an input receiving unit 105, a display priority calculating unit 106, and a comment superimposing method determining unit 107.

The data obtaining unit 104 obtains, from the servers, the video 110, the subject region information 111, and the comment information 112. The data obtaining unit 104 may be an interface for reading the video 110 stored in the video server directly or via a communication path.

Here, the subject region information 111 includes region information showing a result of dividing the subjects in a video into subject regions, and information indicating depth relationships between the subject regions. In addition, the comment information 112 includes comment region information such as a comment (character information) provided to the video 110, video time, comment coordinates, real time (comment provision dates and time in FIG. 5A) at which the comment is provided, and a comment shape of the comment.

The input receiving unit 105 receives user information 113 including a time point and coordinates specified by a user input from a terminal of a user who is browsing a video. The input receiving unit 105 may be an interface for reading time and coordinates specified in the video 110 by a user input using, for example, a mouse or a touch onto a touch panel of the terminal, as information included in the user information 113, directly or through a communication path.

The display priority calculating unit 106 calculates display priorities for comments and subjects in the video 110, based on the information obtained from the data obtaining unit 104 and the input receiving unit 105. The display priority calculating unit 106 generates a comment-provided video in which the comment region or the subject region corresponding to the specified time and coordinates included in the user information 113 received by the input receiving unit 105 is not occluded by another comment region. For this reason, the display priority calculating unit 106 calculates, for the user-selected region corresponding to the specified time and the specified coordinates, a display priority higher than the display priorities for the other regions, based on the subject region information 111, the comment information 112, and the user information 113 obtained by the data obtaining unit 104. In addition, the display priority calculating unit 106 determines, in advance, a rule for providing a higher display priority to a comment region of an earlier one of comments which may be displayed at the same time, and calculates display priorities for all of the comment regions and subject regions based on the predetermined rule.

The comment superimposing method determining unit 107 determines a method for superimposing the comment regions in the video 110, based on the display priorities calculated by the display priority calculating unit 106. The comment superimposing method determining unit 107 determines the method for superimposing the subject regions and comment regions in the video 110, based on the display priorities calculated by the display priority calculating unit 106. In particular, the comment superimposing method determining unit 107 superimposes a region (a comment region or a subject region) having a higher display priority on the other regions each having a lower display priority, thereby preventing the region having the higher display priority from being occluded by any of the other regions.

The image composing unit 102 composes one of the subject regions and one of the comment regions on the comment-provided video 110, based on the comment superimposing method determined by the comment superimposing method determining unit 107. The image output unit 103 outputs, onto the display 120 etc., the comment-provided video after the composition by the image composing unit 102.

In this DESCRIPTION, "region extraction" is a concept including both an extraction technique for extracting an image region in which a given object exists and a division technique for dividing a picture or a region into regions irrespective of the kind of the object. The extraction technique and the division technique are largely common to each other, and thus these techniques are not distinguished from each other in this DESCRIPTION.

Figure 7A:
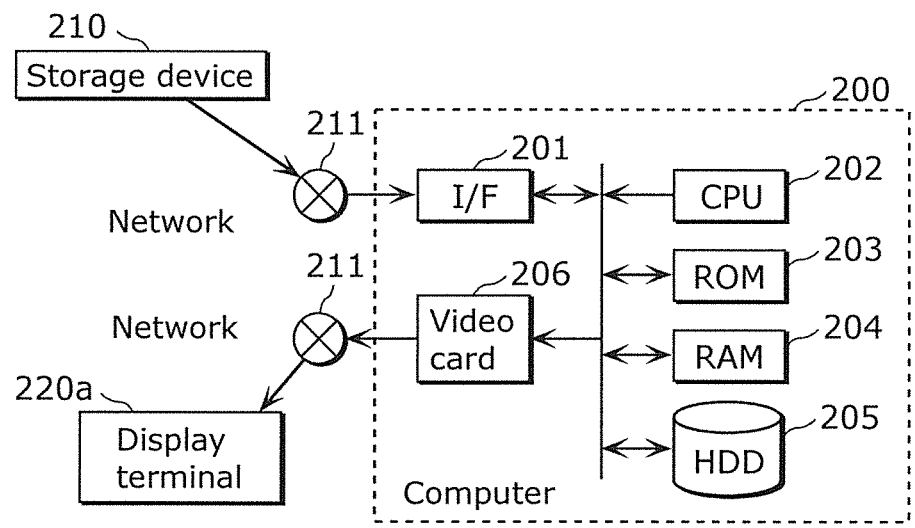
FIG. 7A is a diagram showing a hardware structure of the comment-provided video generating apparatus configured with a computer.
Figure 7B:
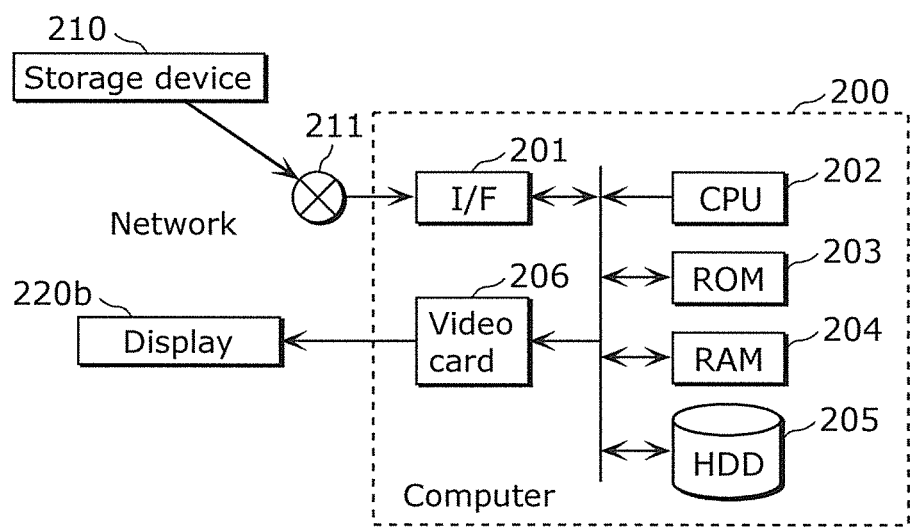
FIG. 7B is a diagram showing the hardware structure of the comment-provided video generating apparatus configured with the computer.

Each of the structural elements (the comment superimposition information generating unit 101, the image composing unit 102, and the image output unit 103) of the comment-provided video generating apparatus 100 may be realized as software such as a computer-executable program, or may be realized as hardware such as an electric circuit and an integrated circuit. Each of FIG. 7A and 7B is a diagram showing a hardware structure of the comment-provided video generating apparatus 100 in this embodiment, which is configured with a computer. FIG. 7A shows structural elements for realizing the comment-provided video generating apparatus 100 in the video distributing system in FIG. 3, and FIG. 7B shows structural elements for realizing the comment-provided video generating apparatus 100 in the video distributing system in FIG. 4. These two examples are different only in the output paths to the display, and thus are collectively described below. The storage device 210 stores the video 110, the subject region information 111, and the comment information 112, and outputs these items to an interface (I/F) 201. The computer 200 obtains the video 110, the subject region information 111, and the comment information 112, and generates a comment-provided video by performing the above-described processes for generating the comment-provided video using the obtained video 110, the subject region information 111, and the comment information 112.

A display terminal 220a or a display 220b obtains and displays a picture generated by the computer 200. The computer 200 includes an interface (I/F) 201, a CPU 202, a ROM 203, a RAM 204, an HDD 205, and a video card 206. A program causing the computer 200 to function is stored in the ROM 203 or the HDD 205 in advance. The program is read out from the ROM 203 or the HDD 205 by the CPU 202 which is a processor and expanded. The CPU 202 executes each of instruction codes in the program expanded in the RAM 204. The I/F 201 is used when a user input made through the storage device 210 according to the execution of the program is taken to the RAM 204. Through the I/F 201, the video 110, the subject region information 111, and the comment information 112 are taken to the RAM 204 according to the execution of the program. The video card 206 outputs the comment-provided video generated according to the execution of the program. Then, the display 120 displays the comment-provided video.

The computer program is not limited to the ROM 203 or the HDD 205 which is a semiconductor, and may be stored in a CD-ROM or the like. In addition, the computer program may be transmitted through a wired or wireless network 211, broadcasting, or the like, and then be taken to the RAM 204 of the computer.

Figure 8:
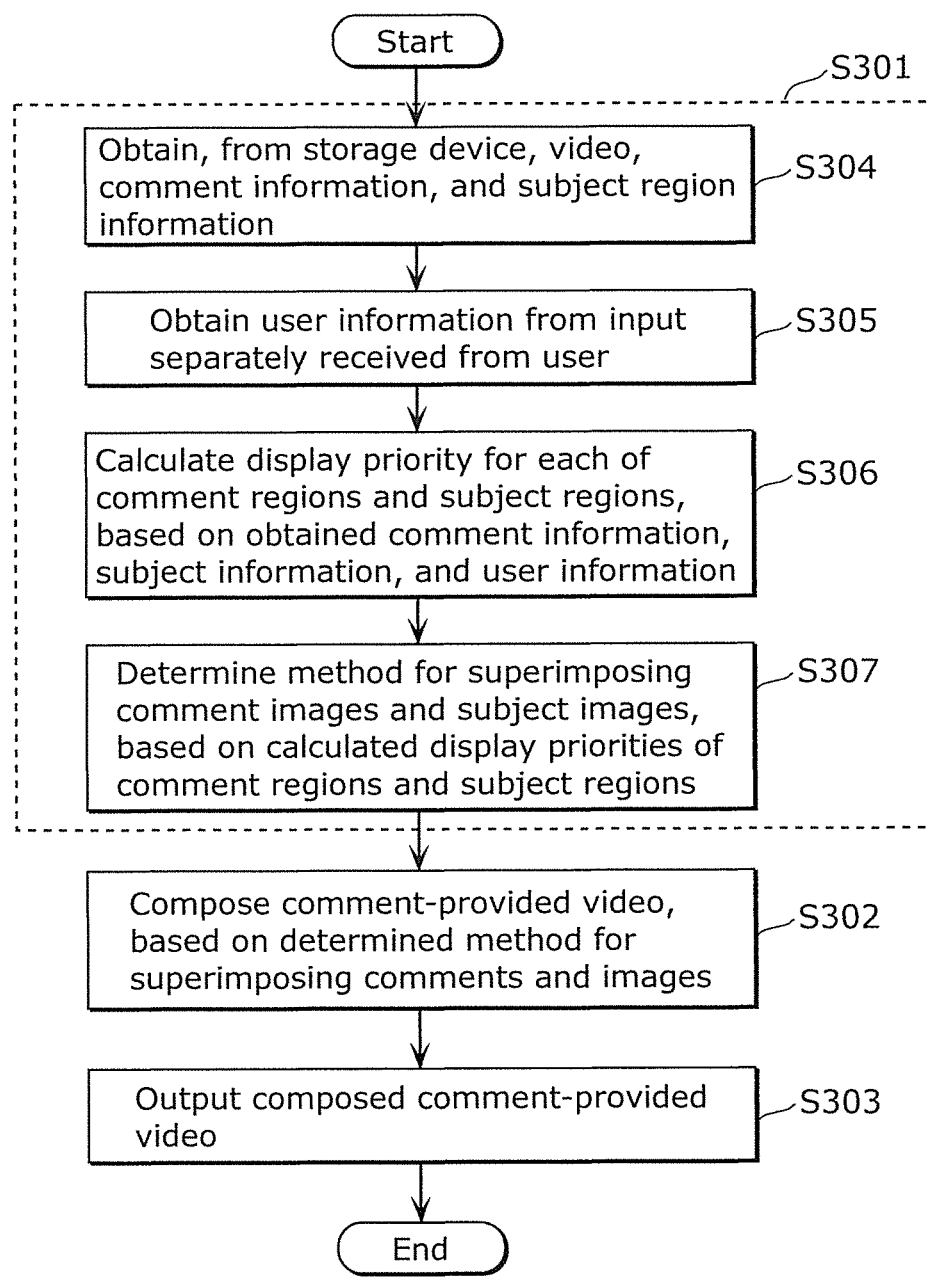
FIG. 8 is a flowchart showing a procedure of operations performed by the comment-provided video generating apparatus.

With reference to FIG. 8, operations performed by the comment-provided video generating apparatus 100 according to this embodiment are described below. FIG. 8 is a flowchart of operations performed by the comment-provided video generating apparatus 100 according to this embodiment.

In FIG. 8, seven Steps S301 to S307 correspond respectively to processing units 101 to 107 in FIG. 6. More specifically, the comment superimposition information generating unit 101 executes Step S301 that is a comment superimposition information generating step, the image composing unit 102 executes Step S302 that is an image composing step, and the image output unit executes Step S303 that is an image output step. In addition, the comment superimposition information generating step S301 includes four steps of Step S304 that is a data obtaining step, Step S305 that is an input receiving step, Step S306 that is a display priority calculating step, and Step 307 that is a comment superimposing method determining step. The data obtaining unit 104 executes operations in the data obtaining step S304, the input receiving unit 105 executes the input receiving step S305, the display priority calculating unit 106 executes the display priority calculating step S306, and the comment superimposing method determining unit 107 executes the comment superimposing method determining step S307.

First, the comment superimposition information generating unit 101 executes the comment superimposition information generating step S301. The comment superimposition information generating unit 101 includes the data obtaining unit 104, the input receiving unit 105, the display priority calculating unit 106, and the comment superimposing method determining unit 107. The comment superimposition information generating step S301 corresponding to the units includes the four steps of the data obtaining step S304, the input receiving step S305, the display priority calculating step S306, and the comment superimposing method determining unit S307.

In the data obtaining step S304, the data obtaining unit 104 obtains the video 110, the subject region information 111, and the comment information 112 from the storage device.

Figure 9A:
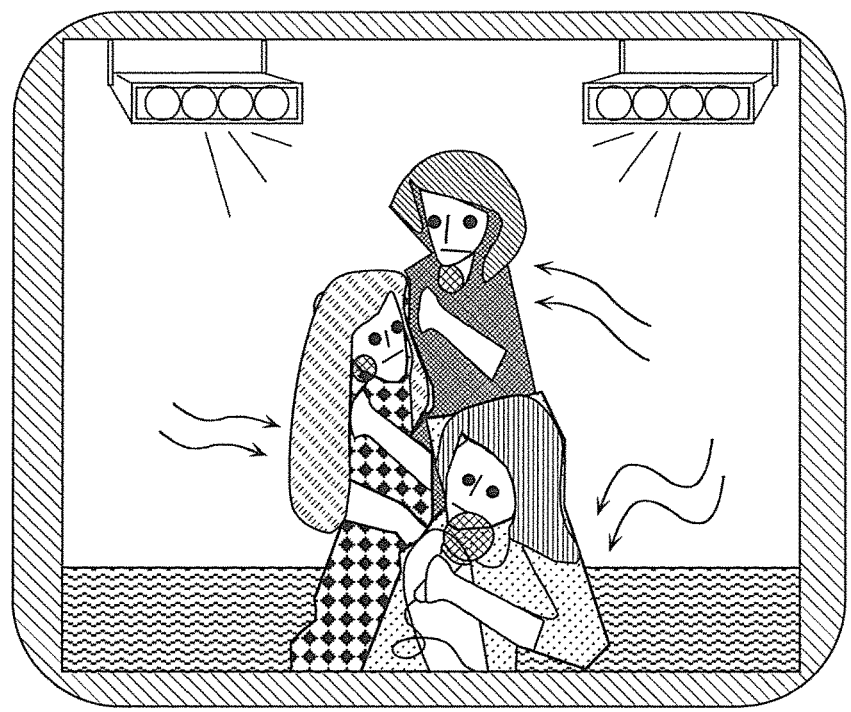
FIG. 9A is a diagram showing an example of a video.
Figure 9B:
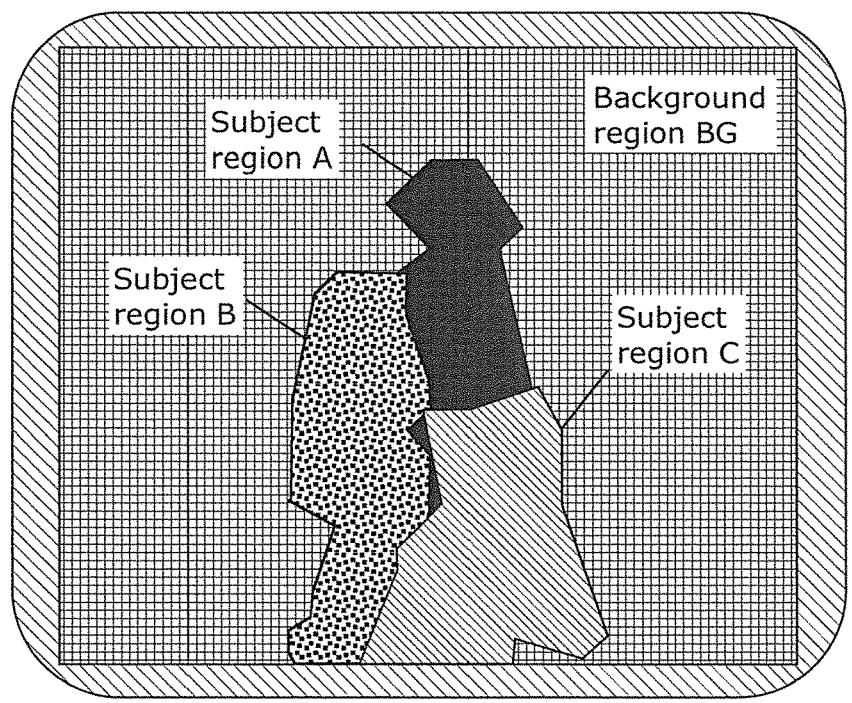
FIG. 9B is a diagram showing examples of subject regions in the video.

In this embodiment, the video 110 obtained by the data obtaining unit 104 is assumed to be a broadcast video or a video captured using a home video recorder. The video 110 is stored in the video server as described above. The data obtaining unit 104 obtains the video 110 through a wired or wireless network or broadcasting. FIG. 9A shows a frame in the video 110. FIG. 9A shows an exemplary case where the video 110 is a music-related video content, but the video 110 may be of any other kind. To simplify explanation and illustration, FIG. 9B is used to schematically show the frame in the video 110, in the form of an image in which subject regions are shown as subject region information.

In addition, FIG. 10A is a schematic diagram showing the subject region information 111 obtained by the data obtaining unit 104, and FIG. 10B is a diagram showing a data structure of the subject region information 111. The subject region information 111 includes region information showing a result of dividing the subjects in a video into regions as described above, and also includes depth relationships between the subject regions. For example, as shown in FIG. 10A, it is assumed that a background subject region 400 and different human subject regions 401 to 403 are obtained as region data corresponding to the video 110. In FIG. 10A, examples of "region information" items corresponding to the respective regions are shown in rectangles with arrows respectively pointing the regions. As shown in the example table in FIG. 10B, the subject region information specifically includes the information items below.

(1) index: Subject region number index (2) position attribute: information indicating depth relationships between subjects in the same frame (In the example in this embodiment, a smaller value is provided for a region closer to a camera.)

(3) coordinates: coordinate values of a pixel belonging to each index

Figures 11A, 11B:
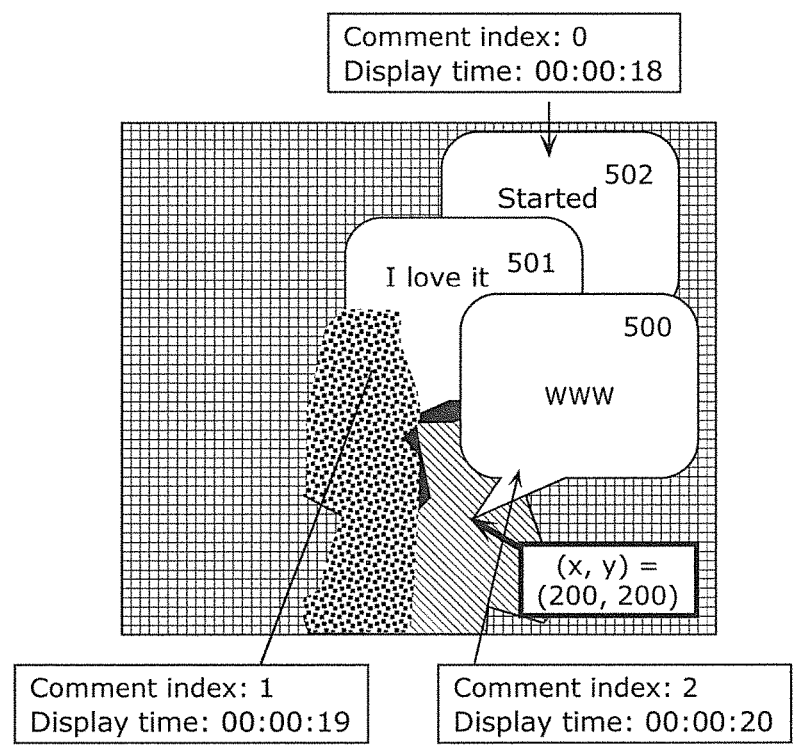
FIG. 11A is a diagram schematically showing comment regions in comment information obtained by the data obtaining unit.
FIG. 11B is a diagram showing an example of a data structure of comment information.

In addition, FIG. 11A is a schematic diagram showing a comment region in the comment information 112 obtained by the data obtaining unit 104, and FIG. 11B is a diagram showing an example of a data structure of the comment information 112. FIG. 11A shows an example in which the comment regions 500 to 502 are displayed in the video 110, based on the comment information. The comment information 112 specifically includes the following kinds of information for each video as shown in FIG. 11B.

Video name (the name of the video 110 as a target of comment provision)

Display time (comment display starting time in the video)

Comment (comment character string)

Submission time (real date and time of comment submission)

User (ID of a user who made the comment)

Base coordinates (coordinates of a base position of each comment region)

Comment shape (information of the shape of each comment region)

Comment index (comment region number index)

In the example of FIGS. 11A and 11B, a record having a comment index "2" in the comment information 112 shows that the comment region 500 is displayed at a base point represented by base coordinates ((x, y)=(200, 200)). In addition, the comment shape (normal1) of the record determines the shape and size of the comment region 500. In this way, it is possible to know which one of the regions in the frame in the video 110 is occluded by the comment region. Here, it is also good to modify the shape or the font size of the comment according to the number of characters in the comment.

Figure 12:
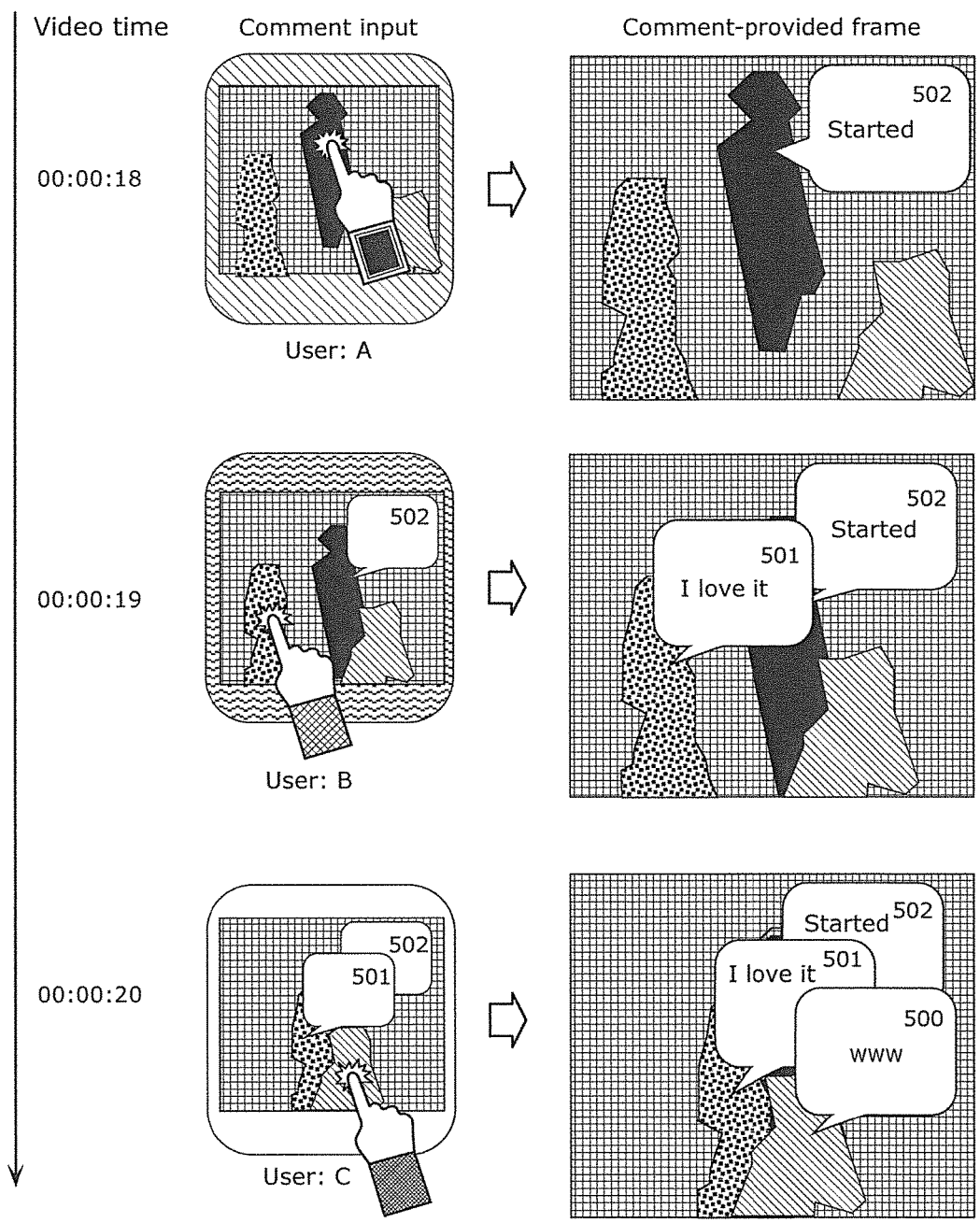
FIG. 12 is a diagram showing how comments are input by different users along time.

In this embodiment, it is assumed that a display time length of the comment is determined, in advance, to be 00:00:05 (second). The comment region 500 whose display time is 00:00:20 is displayed from 00:00:20 to 00:00:25 in video time of the video 110. At the video time 00:00:20, the comment region 501 and the comment region 502 are still displayed, and thus three comments in total are displayed. FIG. 12 shows an example where different users A, B, and C input comments. As video time advances, the comment region 502 for displaying the comment input by the user A, the comment region 501 for displaying the comment input by the user B, the comment region 500 for displaying the comment input by the user C are superimposed and displayed on a previously presented one of the comment regions in the listed order.

It is to be noted that the subject regions are known. For this reason, for example, a rectangle region is calculated which is for enclosing a comment provided at a given display time. In addition, a relative position is calculated which is of the base coordinates on the rectangle region at the given display time. Furthermore, also in the case of each of frames after the frame at the given display time, rectangle regions each for enclosing a comment are calculated, and, for each rectangle region, base coordinates at the display time which remain located at the relatively same position in the rectangle are calculated. Through this process, it is also good to provide a comment-provided video in which the provided comment can be seen tracking the subject region to which the comment was provided.

Alternatively, it is also good to store, in advance, comment information including different display time lengths for the respective comments, and display these comments for the display time lengths. When a plurality of comment regions are displayed in either case, display of one or more of the subject regions 401 to 403 is hampered, resulting in a decrease in the visibility as shown in FIG. 11A.

With reference to FIG. 8 again, in Step S305, the input receiving unit 105 receives user information 113 that the user inputs, when viewing a video, to select a region to be specified in the video using a mouse, a user interface (UI) for receiving input on a touch panel. The user information 113 includes coordinates (specified coordinates) specified by the user input and time (specified time) at which the input was made. For example, in the case of using a touch panel, the user information 113 may be input by means of the user making an action such as tapping (using a finger), at a given time, a point on the display screen corresponding to the subject region to be specified, drawing a circle enclosing the subject region to be specified, and flicking the subject region to be specified.

The input receiving unit 105 may be an interface for reading the specified time or the specified coordinates included in the user information 113 directly or through a communication path, in response to the user operation using a mouse or a touch on a touch panel on which the video 110 is displayed. Here, the number of user inputs does not need to be only once. For example, a plurality of object can be selected by touching different regions. In addition, for userfriendliness in the case of selecting all of the objects in a given display screen or a video, an icon "Select all objects in display screen" or an icon "Select all objects in video" may be separately provided on a video display screen.

Figure 13:
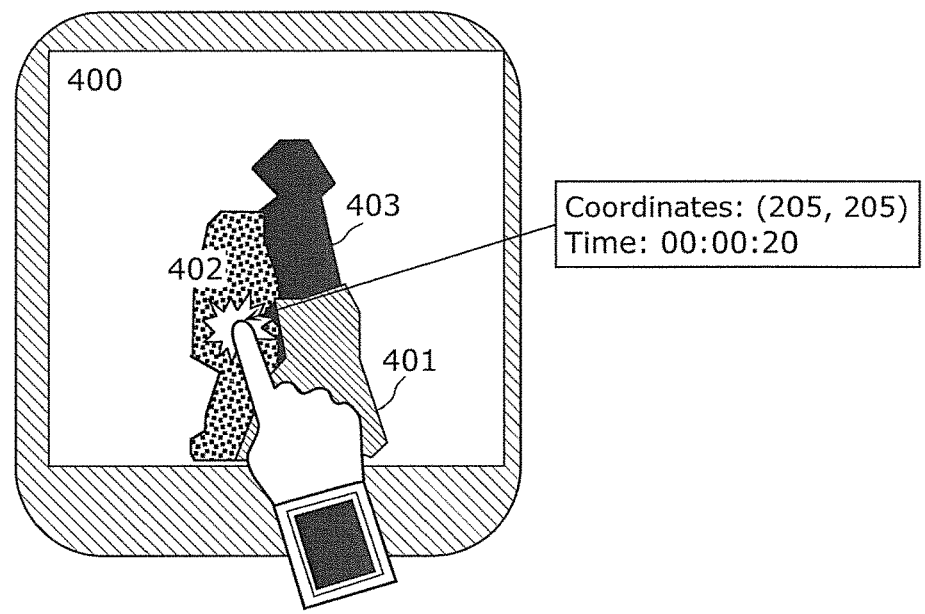
FIG. 13 is a diagram showing an example of user information that is received by a user input receiving unit by an input on a touch panel.

As an example of the input receiving unit 105, FIG. 13 shows an example in which the user information 113 is input through a touch panel. In this case, the coordinates (specified coordinates) specified by the user and the time (specified time) in the video 110 are obtained as user information 113, and are received by the input receiving unit 105. In a subsequent step, the specified coordinates and the specified time are verified with region information. In this case, information that "The subject region 402 was selected" is obtained.

With reference to FIG. 8 again, in Step S306, the display priority calculating unit 106 calculates display priority for each of the comments and subject regions in the video 110, based on the subject region information 111, the comment information 112, and the user information 113. The display priority calculating unit 106 determines, for each of the comments and the subject regions, the display priorities for generating a comment-provided video in which a user-specified region (that is calculated based on the user information 113 received by the input receiving unit 105) is not hidden by any other comment regions. Exemplary rules which can be used as rules according to which the display priority calculating unit 106 calculates the display priorities of the respective regions include "calculating, for a user-specified region, a display priority higher than display priorities of the other regions, based on the subject region information 111, the comment information 112, and the user information 113 obtained by the data obtaining unit 104, and calculates a higher display priority for a newer comment among comments".

Figure 14:
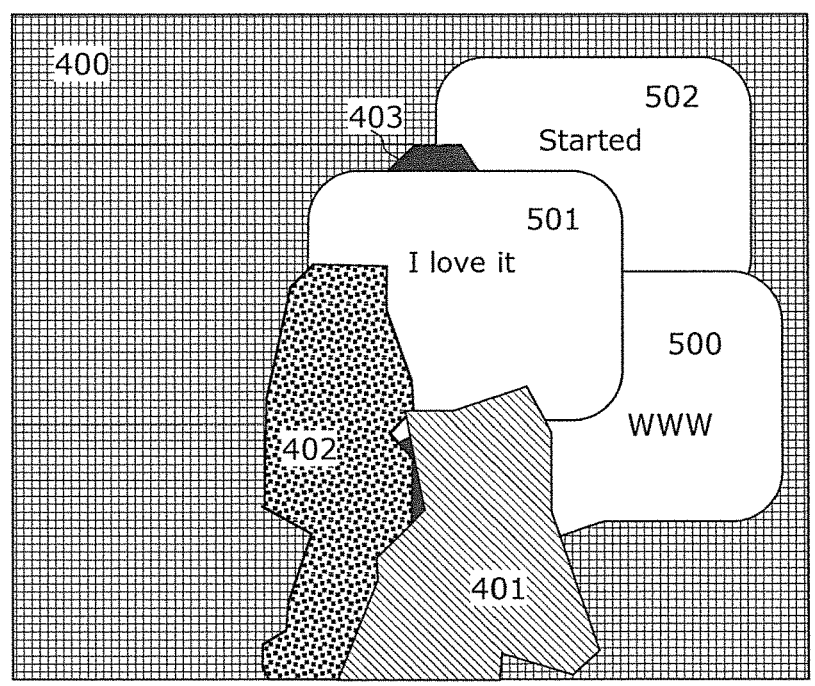
FIG. 14 is a diagram for explaining the concept of superimposition of comment regions and subject regions.

Each display priority is used by the comment superimposing method determining unit as a standard for determining a method for superimposing the comment (comment region). FIG. 14 is an illustration showing a concept of comment superimposition and display based on the display priorities. FIG. 14 shows the subject regions 400 to 403 and the comment regions 500 to 502. Here, for explanation, the relationship between a comment and a subject region to which the comment is provided is referred to as "association". The comment region 500 is associated with the subject region 401, the comment region 501 is associated with the subject region 402, and the comment region 502 is associated with the subject region 403. The association information between the comment region and the subject region is stored in the comment information 112. The subject regions 400 to 403 and the comment regions 500 to 502 are partly overlapped with each other, and only pixels superimposed on top of the other superimposed regions are displayed.

In the example shown in FIG. 14, the background region (the subject region 400) having the lowest display priority is displayed at the rearmost position, and the subject regions 400 to 403 and the comment regions 500 to 502 are superimposed and displayed in a layered structure in a given order. This display order is determined as display priorities P. A region having a lower display priority is moved backward by another region superimposed thereon and then disappears. More specifically, FIG. 14 is a diagram showing a superimposition and display example in which the display priorities P of the respective regions are shown according to $P_{401}>P_{402}>P_{501}>P_{500}>P_{403}>P_{502}>P_{400}$. Accordingly, when the order of magnitudes of the display priorities P of the respective regions is changed, the superimposition order of the regions is also changed. For example, when the subject region 401 and the subject region 402 are the regions that a user wants to see without occlusion, it is possible to realize comment display in which these regions are not occluded by providing display priorities P higher than those of the other regions as the simplest manner.

Hereinafter, the term "superimposition" in this disclosure is referred to as superimposition of regions on an image. The display priority calculating unit 106 verifies the coordinates and time in the user information 113 obtained by the input receiving unit 105 and the subject region information 111 obtained by the data obtaining unit 104, to determine the selected one or more of the regions.

As shown in FIG. 10B, the "region information" may further include a "region attribute". The region attribute is information indicating whether each subject region is a still region or a moving region. In this embodiment, a still region is assigned with 0, and a moving region is assigned with 1. For example, in a video in which people are doing a sport or a video in which people are dancing, most of subjects which may be selected by a user are moving objects. Thus, assignment of such attributes makes it easy to calculate display priorities. In other words, the display priority calculating unit 106 may determine a region (a still region) having a region attribute of 0 to be a background region, and always assign a smallest display priorities P thereto.

Furthermore, the "region information" may include information indicating an occlusion relationship between subject regions in a video. For example, information of subject regions in an occlusion relationship is stored with video time or a frame number. More specifically, in the case of a video displayed in an example in FIG. 12, it is good to store information indicating that a subject C occludes a subject A at video time "00:00:19", for all video time (the alphabets A to C assigned to the subjects are the same as those in FIG. 9).

Alternatively, information indicating a similar occlusion relationship may be calculated based on region information obtained by the data obtaining unit 104. In this case, it is possible to determine the occlusion relationship by, for example, calculating a motion vector near a boundary between regions in advance, and determining that a first region in which a larger number of motion vectors or moving trajectories disappears or stops in a focused certain time zone in video time compared to a second region is occluded by the second region in the time zone. When no such information indicating an occlusion relationship is prepared, occlusion information is calculated.

The use of occlusion information obtained as described above makes it possible to generate a video in which one or more regions important to a user are easy to see.

Figure 15A:
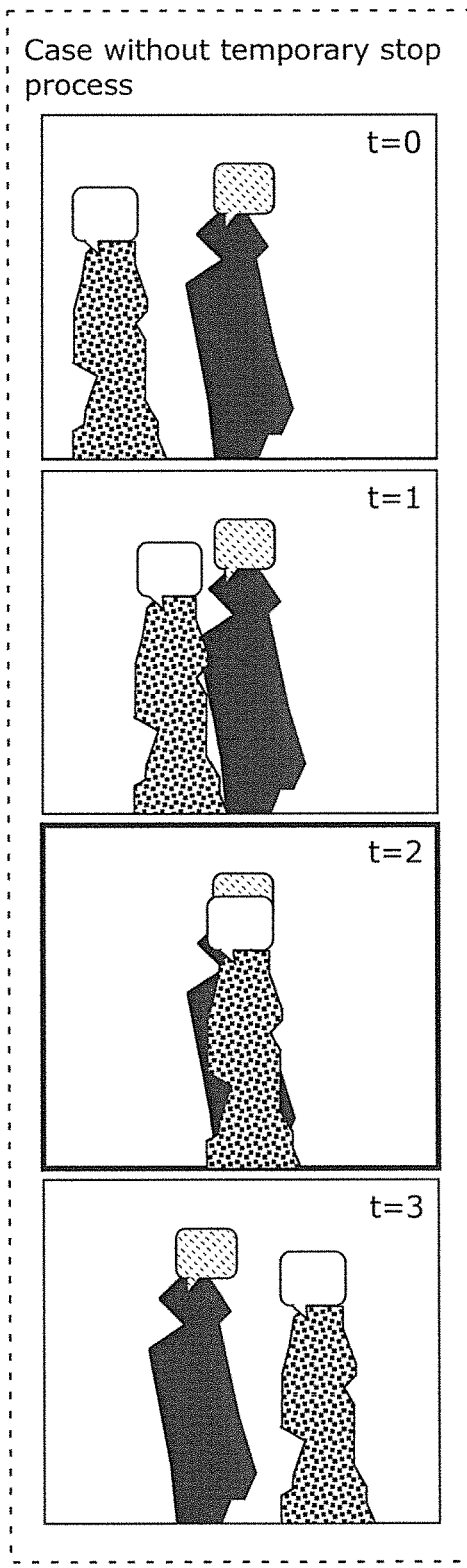
FIG. 15A is a diagram showing a display example of a video including frames in which comment regions are displayed to track subject regions.
Figure 15B:
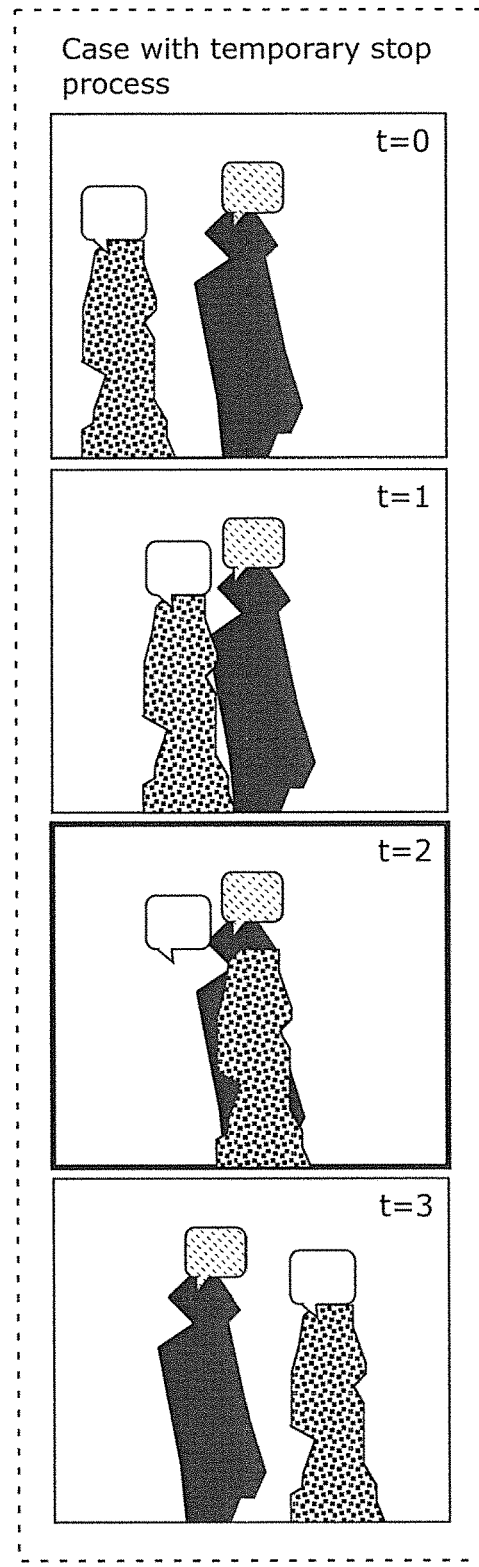
FIG. 15B is a diagram showing a display example of the video including the frames in one of which one of the comment regions is temporarily stopped without tracking a corresponding one of the subject regions.

In the case of FIG. 15A, comments provided to given subjects move closer to each other, overlap making an occlusion relationship, and then pass through each other. This display is not easy to see for the user. In view of this, the comment superimposing method determining unit 107 determines a superimposing method for displaying a video by temporarily stopping comment regions of comments corresponding to subject regions which make an occlusion relationship at positions before a start of an occlusion period in which they are in the occlusion relationship, releasing the temporary stop after the occlusion period to cause the comments to re-start tracking the subject regions. In this way, a comment-provided video as shown in FIG. 15B is displayed on a display 120. In the video, the comment regions of the comments corresponding to the subject regions which make the occlusion relationship temporarily stop at the positions before the start of the occlusion period in which the subject regions are in the occlusion relationship, and after the occlusion period, the comments re-start tracking the subject regions. In the display examples of FIGS. 15A and 15B, the occlusion starts at t=1, ends at t=2, the positions of the comment provided to the subject regions at t=1 are maintained also at t=2.

The way of display can prevent one of the comments provided to the subject regions from being occluded by another one of the comments provided to the other subject regions, especially for the user who wants to see the comments provided to both the subject regions which make the occlusion relationship. In this way, it is possible to display the comments in a simple easy-to-see manner.

Figure 16A:
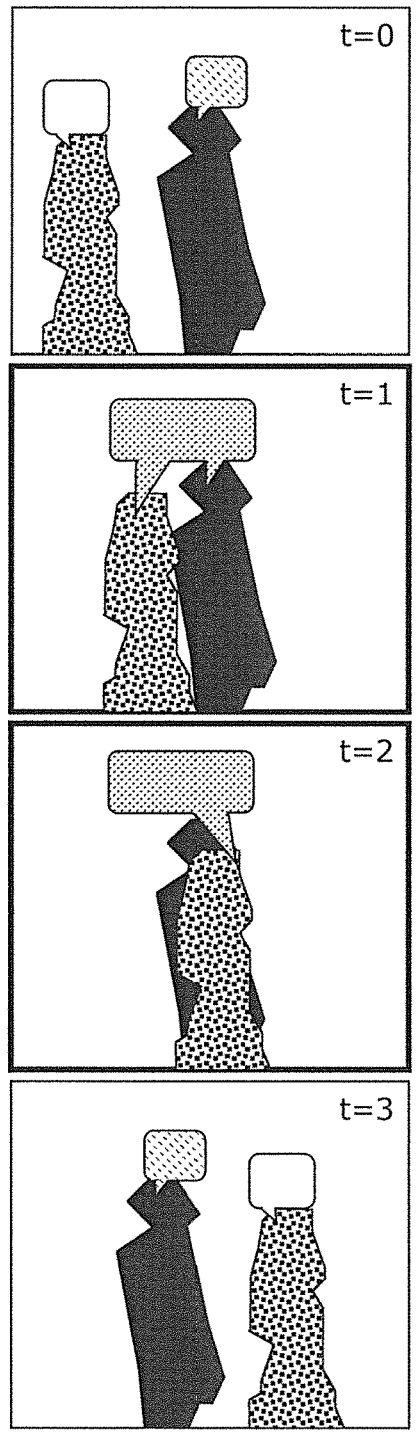
FIG. 16A is a diagram showing a display example of the video including the frames in two of which the two comment regions are integrated into one when displayed.
Figure 16B:
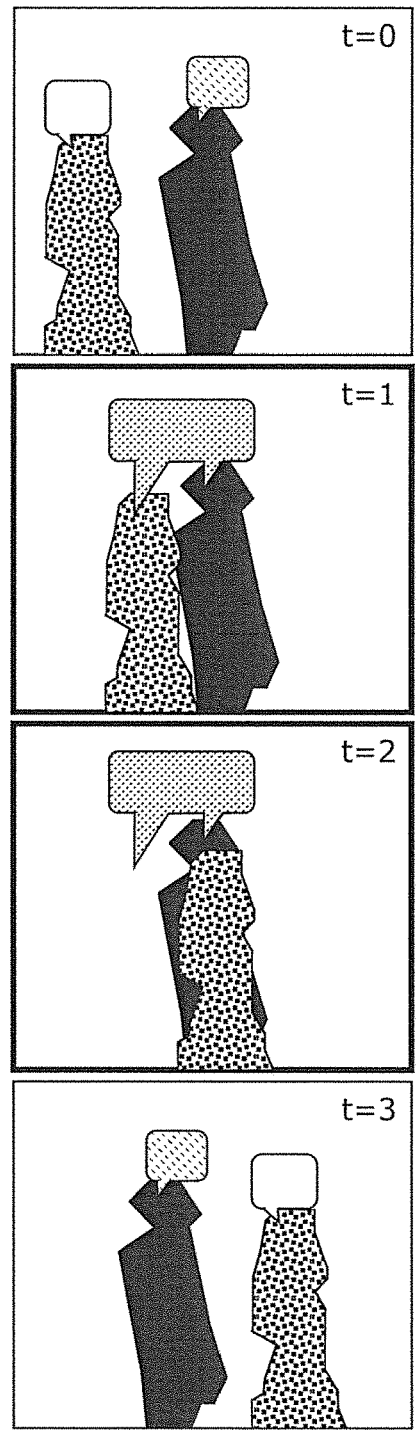
FIG. 16B is a diagram showing a display example of the video including the frames in two of which the two comment regions are integrated into one when displayed.

As another display method, the comment superimposing method determining unit 107 determines a superimposing method for displaying the comment-provided video in which balloons including comments respectively corresponding to the subject regions which make the occlusion relationship are integrated into one balloon during the occlusion period, and after the occlusion period, the integrated balloon is divided into separate balloons respectively including the comments to cause the comment regions to re-start tracking the subject regions. FIGS. 16A and 16B show examples realized in this way. In the video on the display 120 in each of the examples, the balloons including the comments corresponding to the subject regions which make the occlusion relationship are integrated into the one balloon during the occlusion period, and after the occlusion period, the one balloon is divided into separate balloons respectively including the comments to cause the comment regions to re-start tracking the subject regions. It is to be noted that the comment superimposing method determining unit 107 may display these comments in a horizontal layout or in a vertical layout in one comment region integrated as the balloon. In FIGS. 16A and 16B similarly to the examples of FIGS. 15A and 15B, the occlusion starts at t=1, and ends at t=2. In each of examples in FIGS. 16A and 16B, simply, a balloon having a size corresponding to the total size of the two balloons is displayed at the center position of these two balloons at the start of the occlusion. As shown in FIG. 16A, it is also good to determine the superimposing method for displaying the balloon having a tip which tracks the subject region. Alternatively, in order to prevent the end of the balloon to have a complex shape when these two subject regions pass through each other, it is also good to determine a superimposing method for displaying the balloon by temporarily stopping the balloon integrated at t=1 and keeping the balloon until t=2 as shown in FIG. 16B similarly to the example of FIG. 15B.

In this way, it is possible to allow a user who wants to see both the comments provided to the subject regions which make the occlusion relationship, to see the comments in a simple, easy-to-see display manner. Furthermore, it is possible to show that the subjects with the comments are temporarily in the occlusion relationship, in a more emphasized display manner.

As another display method, the comment superimposing method determining unit 107 determines a superimposing method for displaying the comment-provided video in which only one of comments which corresponds to an occluding subject region closer to a camera used to capture the video among the subject regions which make the occlusion relationship is displayed during the occlusion period, and after the occlusion period, all of the comments are displayed. In this way, as shown in FIG. 17B, only the comment corresponding to the occluding subject region closer to the camera used to capture the video among the subject regions which make the occlusion relationship may be displayed during the occlusion period, and after the occlusion period, all of the comments may be displayed.

In this way, it is possible to provide intuitive display, as shown in FIG. 17B, which is easier to see, and virtually realizing in the video a relationship between the subjects in a real scene, compared to the balloons at the time the subjects pass through each other in FIG. 17A.

Figure 18A:
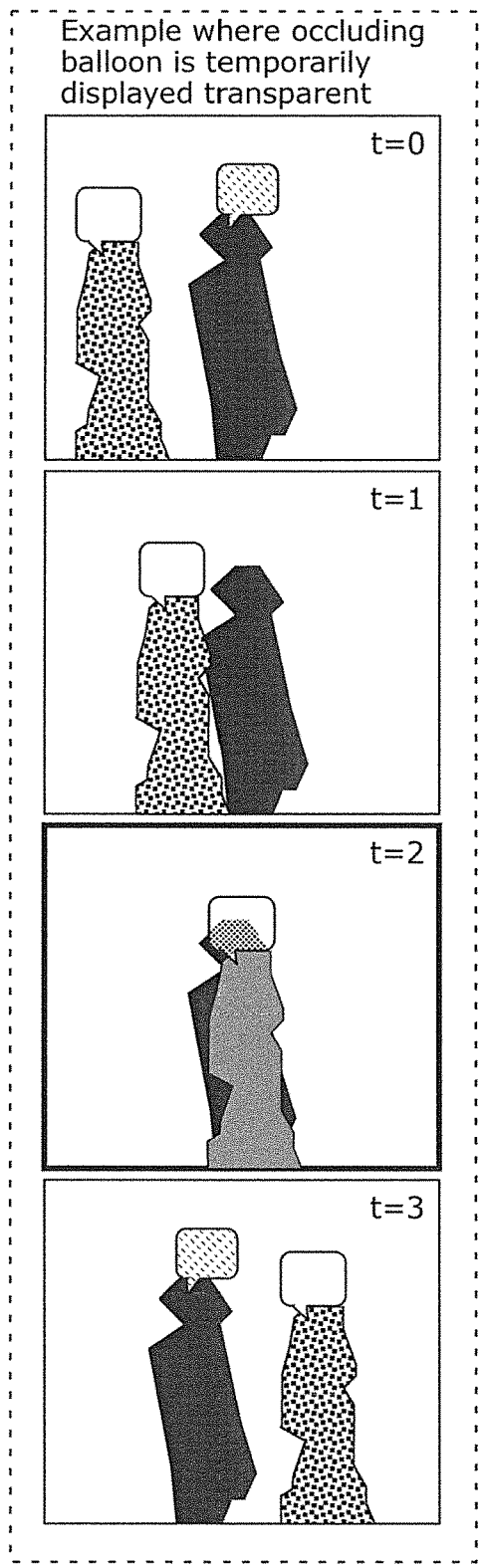
FIG. 18A is a diagram showing a display example of the video including the frames in one of which occluding one of the comment regions is displayed transparent.

Furthermore, as shown in FIG. 18A, the comment superimposing method determining unit 107 may perform a display method for displaying one of comments which corresponds to an occluding subject region in a semi-transparent display manner on the display 120 in an occlusion period, and, after the occlusion period, re-start displaying all of the comment in a non-semi-transparent display form.

In this way, it is possible to realize simple display while maintaining the visibility of the subjects as in the earlier-described method.

Alternatively, the comment superimposing method determining unit 107 may superimpose and display the comment corresponding to the occluded subject region on the occluding subject in a transparent display form, and, after the occlusion period, re-start displaying all of the comments in a non-semi-transparent display form. In this way, as shown in FIG. 18B, the comment corresponding to the occluded subject region may be superimposed and displayed on the occluding subject region in the transparent display form, and, after the occlusion period, display of all the comments may be re-started in the non-semi-transparent display form.

In this way, it is possible to provide display which emphasizes the relationship between the subjects in the real scene, and more intuitive to the user, while maintaining the visibility of the comments.

Figure 18B:
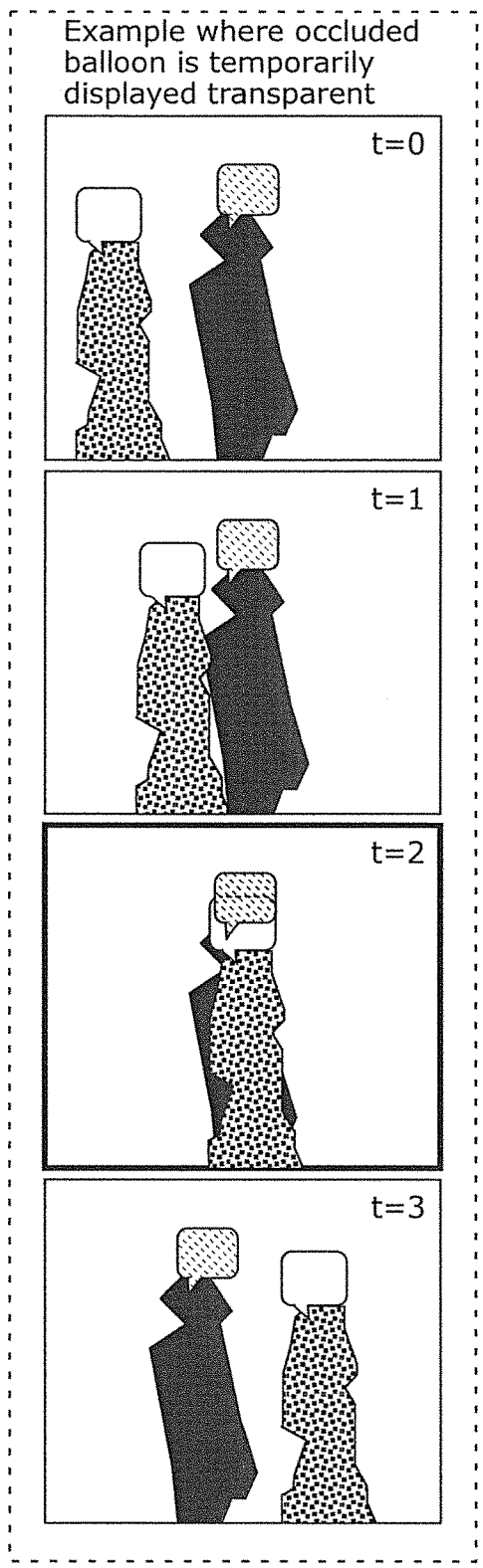
FIG. 18B is a diagram showing a display example of the video including the frames in one of which occluded one of the comment regions is displayed transparent.

In addition, it is possible to show that the subjects with the comments are temporarily in the occlusion relationship, in an emphasized display manner, irrespective of which one of the display methods in FIG. 18A and 18B is taken.

The different balloons in each frame in each of FIG. 15A to FIG. 18B have different textures for the purpose of increasing visibility and simplifying the explanation here, but the textures do not always the same as actual ones. In reality, for example, a higher visibility of characters is obtained when all of the balloons on which the characters are displayed do not have any texture.

There are some factors that affect the look of a comment-provided video or the visibility of each region. If considering communication by comments as important, a user can enjoy communication on the video more when comment regions are basically superimposed on subject regions. In reality, many comment-provided video services employ display methods in which comment regions occlude subject regions.

Furthermore, it is considered that a user can easily see comments when a comment region including a comment that is newly submitted and having a newer submission date and time is superimposed at a frontward position and when a comment region including a comment that is newer in video time is superimposed on an older comment region including an older comment which is hidden behind the newer comment.

In addition, a comment region associated with a more frontward subject region, in other words, a comment region displayed at a frontward position is considered to be intuitively easy to see.

It is the user's intention that is more important than the above-described factors. A comment-provided video that is most easy for the user to see is generated by displaying a subject region or a comment region selected according to user's intention at a foremost position free from occlusion.

The above-described conditions are organized in a table in FIG. 19. For example, when there is no user input, in other words, when neither a subject region nor a comment region is selected (in (A) in the table in FIG. 19, the display priority calculating unit 106 determines display priorities for superimposing the subject region including a background region below the comment region ((a) in (A)). In addition, the display priority calculating unit 106 determines display priorities for superimposing a comment region having an earlier video time at a backward position ((b) in (A)). The display priority calculating unit 106 may determine display priorities for displaying a comment region having a newer real submission time in addition to newer video time at a frontward position.

When a subject region is selected according to a user input and the comment region is not selected (in (B) in FIG. 19), the display priority calculating unit 106 determines display priorities for displaying the selected subject region at a foremost position ((a) in (B)). In addition, the display priority calculating unit 106 determines display priorities for the unselected subject region and comment region according to the standards shown in (A) ((b) in (B)).

When a comment region is selected according to a user input and the subject region is not selected (in (C) in FIG. 19), the display priority calculating unit 106 determines display priorities for displaying the selected comment region at a foremost position ((a) in (C)). In addition, the display priority calculating unit 106 determines display priorities for the unselected subject region and comment region according to the standards shown in (A) ((b) in (C)). However, the display priority calculating unit 106 may determine display priorities for displaying the subject region corresponding to the selected comment region at a position that is frontward next to the selected comment region ((a') in (C)).

When both of the comment region and the subject region are selected as user inputs ((D) in FIG. 19), the display priority calculating unit 106 may determine display priorities for displaying the selected comment region at a foremost position ((a) in (D)). In addition, the display priority calculating unit 106 determines display priorities for displaying the selected subject region that is frontward next to the selected comment region at a foremost position ((b) in (D)). In addition, the display priority calculating unit 106 determines display priorities for the unselected subject region and comment region according to the standards shown in (A) ((b) in (D)). However, the display priority calculating unit 106 may determine display priorities for displaying the subject region corresponding to the selected comment region at a position that is frontward next to the selected subject region ((a') in (D)). In addition, the display priority calculating unit 106 may determine display priorities for displaying the comment region corresponding to the selected subject region at a position that is frontward next to either the selected subject region or the subject region corresponding to the selected comment region ((b') in (D)).

Figure 20:
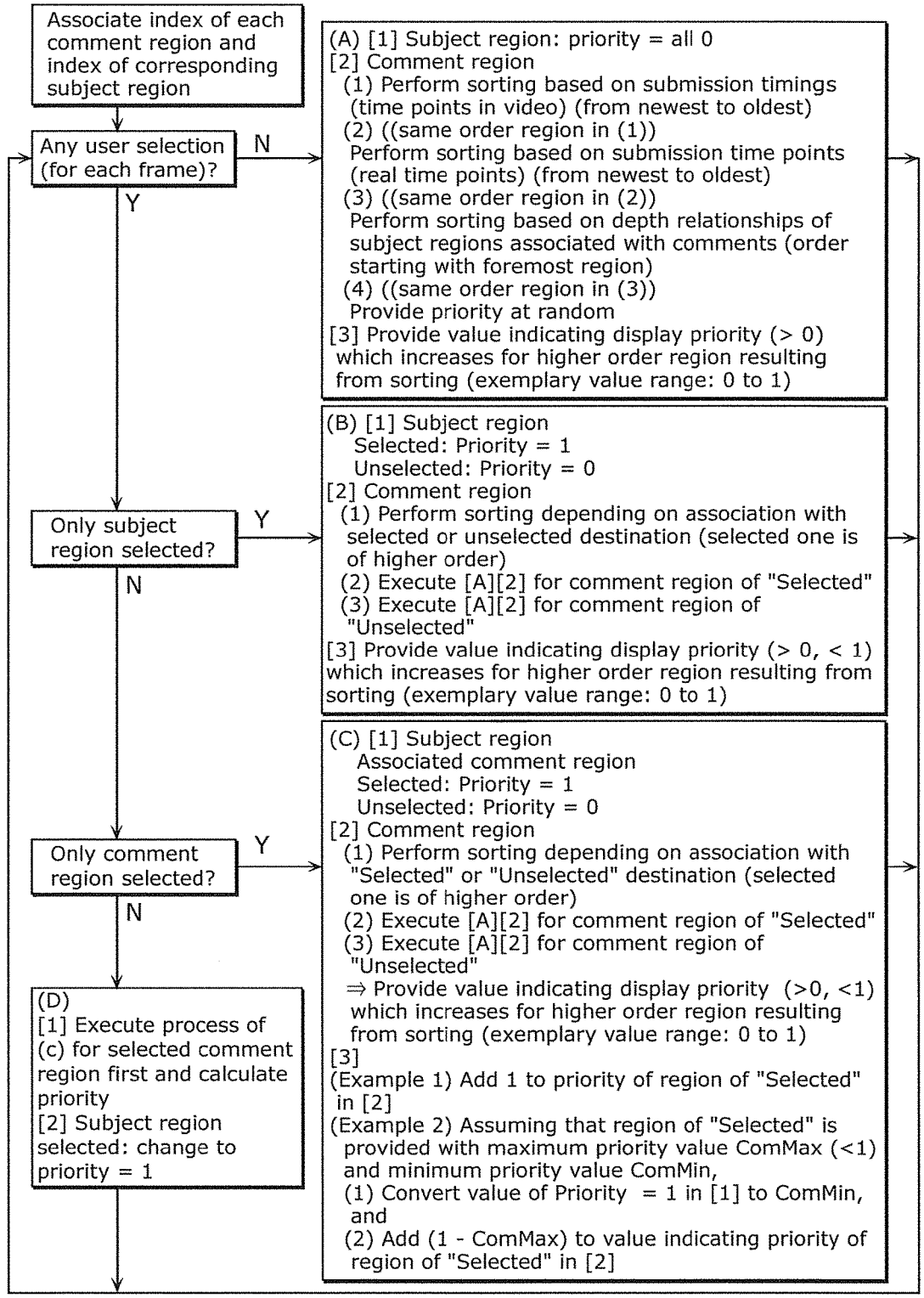
FIG. 20 is a flowchart of processes executed by a display priority calculating unit.

The display priority calculating method according to the rules based on the above-described conditions makes it possible to generate a comment-provided video reflecting users' intention. As an exemplary calculating method, it is possible to perform processes based on a display priority calculation flow as shown in FIG. 20 (each "display priority" is briefly written as a "priority" in the drawing). It is to be noted that the association between a comment region and a subject region may be stored in advance in a comment information storage server, or a subject region at coordinates corresponding to base coordinates of a comment region including a comment at a display time may be searched out from the subject region information 111, using display time and base coordinate information of the comment included in the comment information 112.

Whether there is a user input through the input receiving unit 105 is checked for each frame or a particular frame first. When there is no user input, the display priority calculating unit 106 calculates display priorities for realizing comment display in a conventional approach, according to the flow shown in processes included in (A) in FIG. 20.

When there is a user input, as described earlier, sets of processes are switched depending on whether one or both of the subject region and the comment region are selected. This is performed to determine the region that is to be preferentially displayed when the subject region and the comment region or comment regions overlap with each other at some pixels. By performing the process sets (B), (C), and (D) in FIG. 20, display priorities are calculated based on the above-described rules.

The order of processes (1) to (3) in the process set (A) may be exchanged according to a user's taste or the like.

FIG. 21A to FIG. 21F show examples of superimposition and display of comment regions and subject regions obtainable as results of calculating display priorities according to rules shown in FIG. 19 or processing flows in FIG. 20 for cases in which different regions are selected.

Figure 21A:
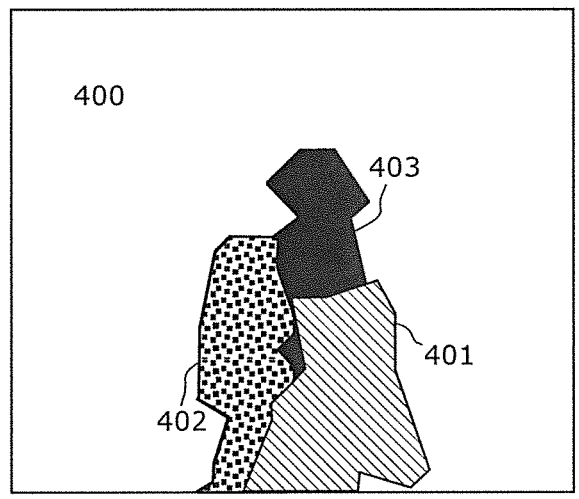
FIG. 21A is a diagram showing subject regions shown by subject region information in a general video.
Figure 21B:
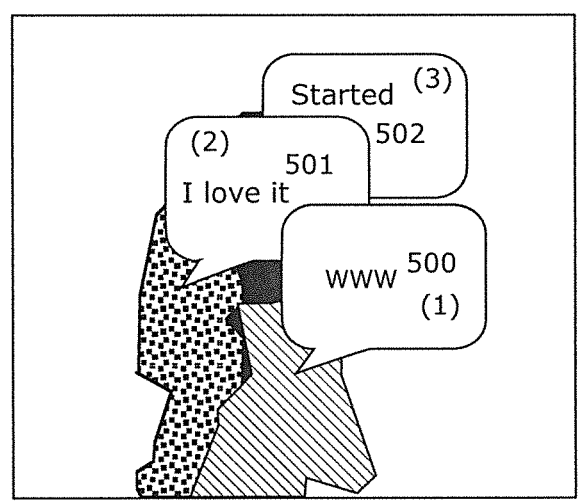
FIG. 21B is a diagram showing a display example of a general comment-provided video.

FIG. 21A shows a video 110 in which subject regions 400 to 403 including a background are shown. The subject regions 400 to 403 are shown by the same subject region information 111 as shown in FIG. 10A. Furthermore, as in the case of FIG. 11A, FIG. 21B shows a display example of a video in which the comment regions 500 to 502 are superimposed at a given time. Here, the comment information 112 used to display the comment regions 500 to 502 is the same as the comment information 112 in FIG. 11B. FIG. 21B shows a general comment display example in which the comment regions 500 to 502 are displayed frontward than the subject regions 400 to 403 including the background. For this reason, the subject regions 401 to 403 other than the background are occluded. A comment region having a newer display time is displayed at a more frontward position (the comment region 500 is the newest comment region). In this embodiment, unless any instruction is provided from a user, a higher display priority is assigned to a subject region to be displayed at a frontward position (closer to the viewer in the depth direction), and a higher display priority (for decreasing the possibility of occlusion by another comment region) is assigned to a comment region having a newer display time. In addition, unless any instruction is provided from a user, each comment region is assigned with a display priority higher than a display priority of a subject region, and, among all of the regions, a background region has a lowest display priority.

Here, as described earlier, the comment region 500, the comment region 501, and the comment region 502 correspond to the subject region 401, the subject region 402, and the subject region 403, respectively. Thus, the priorities calculated in the case of FIG. 21B are represented according to $P_{500} > P_{501} > P_{502} > P_{401} > P_{402} > P_{403} > P_{400}$. FIG. 21B is a display example corresponding to the process set (A) in FIG. 19 or the process set (A) in FIG. 20.

Figure 21C:
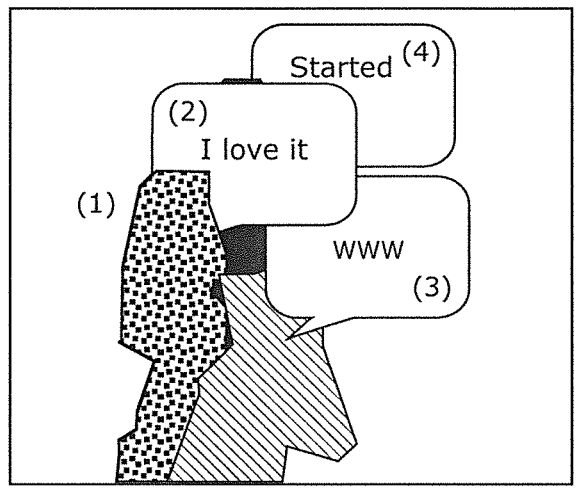
FIG. 21C is a diagram showing a display example of the video when one of the subject regions is selected.

In addition, FIG. 21C shows a display example of a video that is output by the comment-provided video generating apparatus 100 when the subject region 402 is selected by the user. FIG. 21C is a display example corresponding to the process set (B) in FIG. 19 or the process set (B) in FIG. 20. FIG. 21C shows that the subject region 402 is displayed at a foremost position, a comment region 501 corresponding to the subject region 402 is superimposed next, and the other regions are superimposed behind the comment region 501. The display priorities calculated in this case are represented according to $P_{402} > P_{501} > P_{500} > P_{502} > P_{401} > P_{403} > P_{400}$.

Figure 21D:
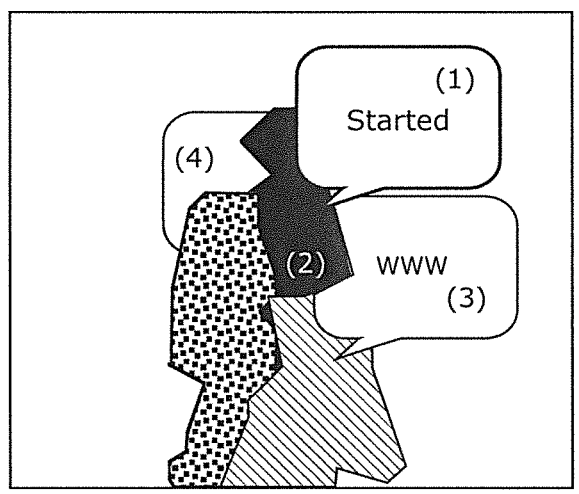
FIG. 21D is a diagram showing a display example of the video when one of the comment regions is selected.

In addition, FIG. 21D shows a display example of a video that is output by the comment-provided video generating apparatus 100 when the comment region 502 is selected by the user. FIG. 21D is a display example corresponding to the process set (C) in FIG. 19 or the process set (C) in FIG. 20. FIG. 21D shows that the comment region 502 is displayed at a foremost position, a subject region 403 corresponding to the comment region 502 is superimposed at a next frontward position, and the other regions are superimposed behind the subject region 403. The display priorities calculated in this case are represented according to $P_{502} > P_{403} > P_{500} > P_{501} > P_{401} > P_{402} > P_{400}$.

Figure 21E:
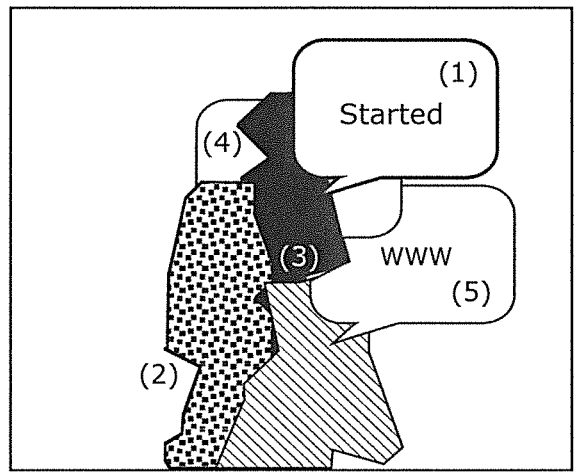
FIG. 21E is a diagram showing a display example of the video when a pair of a subject region and a comment region among the subject regions and the comment regions is selected.

In addition, FIG. 21E shows a display example of a video that is output by the comment-provided video generating apparatus 100 when the subject region 402 and the comment region 502 are selected by the user. FIG. 21E is a display example corresponding to the process set (D) in FIG. 19 or the process set (D) in FIG. 20. FIG. 21E shows that the comment region 501 corresponding to the subject region 402, the subject region 403 corresponding to the comment region 502, the subject region 402, and the comment region 502 are sequentially superimposed in the listed order (in other words, the comment region 502 is superimposed at the foremost position). FIG. 21E also shows that the other regions are superimposed behind the comment region 501. The display priorities calculated in this case are represented according to $P_{502} > P_{402} > P_{403} > P_{501} > P_{500} > P_{401} > P_{400}$.

Figure 21F:
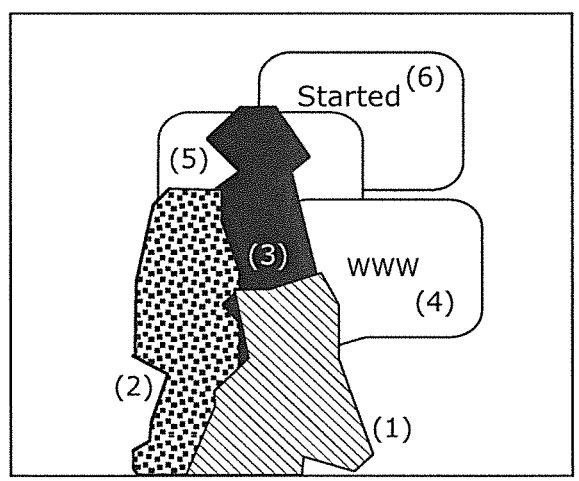
FIG. 21F is a diagram showing a display example of the video when all of the subject regions are selected without selecting the background.

Here, FIG. 21F shows a display example of a video that is output by the comment-provided video generating apparatus 100 when all of the subject regions 401 to 403 are selected by the user. FIG. 21F is a display example corresponding to the process set (B) in FIG. 19 or the process set (B) in FIG. 20. FIG. 21F shows that all of the comment regions are superimposed at a position backward than the subject regions 401 to 403 and frontward than the subject region 400 which is a background. The display priorities calculated in this case are represented according to $P_{401} > P_{402} > P_{403} > P_{500} > P_{501} > P_{502} > P_{400}$.

According to the above-described rules, the display priority calculating unit 106 calculates the display priorities for the comment regions 500 to 502 in the video 110 and the subject regions 400 to 403 including the background, based on the subject region information 111, the comment information 112, and the user information 113. The values indicating display priorities may be any ones which can represent priority relationships between the regions. For example, in the case of seven regions as described above, it is good to assign the background which should have a lowest display priority 0 as a value indicating the display priority thereof, and sequentially assign the other regions 1, 2, 3, . . . as values indicating a display priority thereof in the descending order of the display priority.

As described above, it is a user's selection that affects most the priority order indicated by the display priorities. The depth relationships between subject, comment submission time and/or display time, etc. have also been listed as factors that affect the display priorities. In addition to these factors, for example, when the comment information 112 includes users' ID who made comments, this may affect the display priority of a comment with the user ID specified in advance by the user.

In the earlier description, when a plurality of regions have the same display priority, the priority order is determined at random as shown in the process set (A)[2] (1)-(4). In stead, it is also good to display the fact that a plurality of regions have the same display priority on the display, and allow the user to select one or more of the regions which are to be displayed preferentially. In addition, when there are two comments which are to be overlapped have different numbers of characters, the comment region including the comment having a fewer number of characters may be made smaller and displayed in front of the other in order to increase the visibility of both the comments.

With reference to FIG. 8 again, in Step S307, the comment superimposing method determining unit 107 determines a region superimposing method for generating a comment-provided video 110 in which the subject regions and the comment regions are composed, based on the display priorities calculated by the display priority calculating unit 106.

More specifically, the region superimposing method calculated here is a method for calculating a region superimposing order in which the regions are sequentially superimposed in a descending order of the display priorities calculated by the display priority calculating unit 106. In relation to the descriptions with reference to FIG. 21A to FIG. 21F, control for preventing the user-specified region from being occluded by another one of the comment regions or subject regions is performed according to the region superimposing order based on the display priorities.

Alternatively, the comment superimposing method determining unit 107 may calculate display transparencies for comment regions based on the display priorities calculated by the display priority calculating unit 106, instead of calculating the region superimposing order. More specifically, in the case of calculating transparencies for pixels in comment regions which are to be overlapped, the comment superimposing method determining unit 107 sets a transparency=0 (zero transparency) to the pixel having a highest display priority among those calculated by the display priority calculating unit 106, and sets a transparency>0 to each of the pixels having a lower display priority. These transparencies can be determined based on ratios of display priorities etc. In order to increase visibility, the entire comment region may be displayed transparent, instead of the overlap pixel. In this case, to increase the visibility in the transparent display, the colors of the region and the characters are automatically converted into white and block, respectively, at the time of display irrespective of whether or not the colors of the comment region and comment characters are specified in advance.

In Step S302, the image composing unit 102 generates a composed comment-proved video by composing comments to be displayed in the video 110 according to the region superimposing method determined by the comment superimposing method determining unit 107. When the comment superimposing method determining unit 107 calculates a comment superimposing order, the image composing unit 102 generates a comment-provided video by composing in layers comments to be displayed in the video 110. Alternatively, when the comment superimposing method determining unit 107 calculates display transparencies for the comments instead of the comment superimposing order, the image composing unit 102 may determine pixel values corresponding to the regions according to the transparencies and generate a comment-provided video by composing the comments in the video 110.

In Step S303, the image output unit 103 outputs, onto the display 120 or the like, the comment-provided video composed by the image composing unit 102.

The comment-provided video generating apparatus 100 in this embodiment includes the input receiving unit 105 which receives the user information 113. However, for example, in the case where a TV or display connected through a network is used and when no user inputs (specification of time and coordinates) are expected or absence of user inputs is known in advance, the comment-provided video generating apparatus does not need to include the input receiving unit 105. More specifically, as exemplary display forms, it is also good to apply automatically other rules for increasing visibility of subjects instead of using user input information.

One of these rules is (a) to assign only the subject region in the foremost row a display priority higher than those of comment regions.

The other rule is (b) to assign all subject regions display priorities higher than those of all comment regions.

Figure 22:
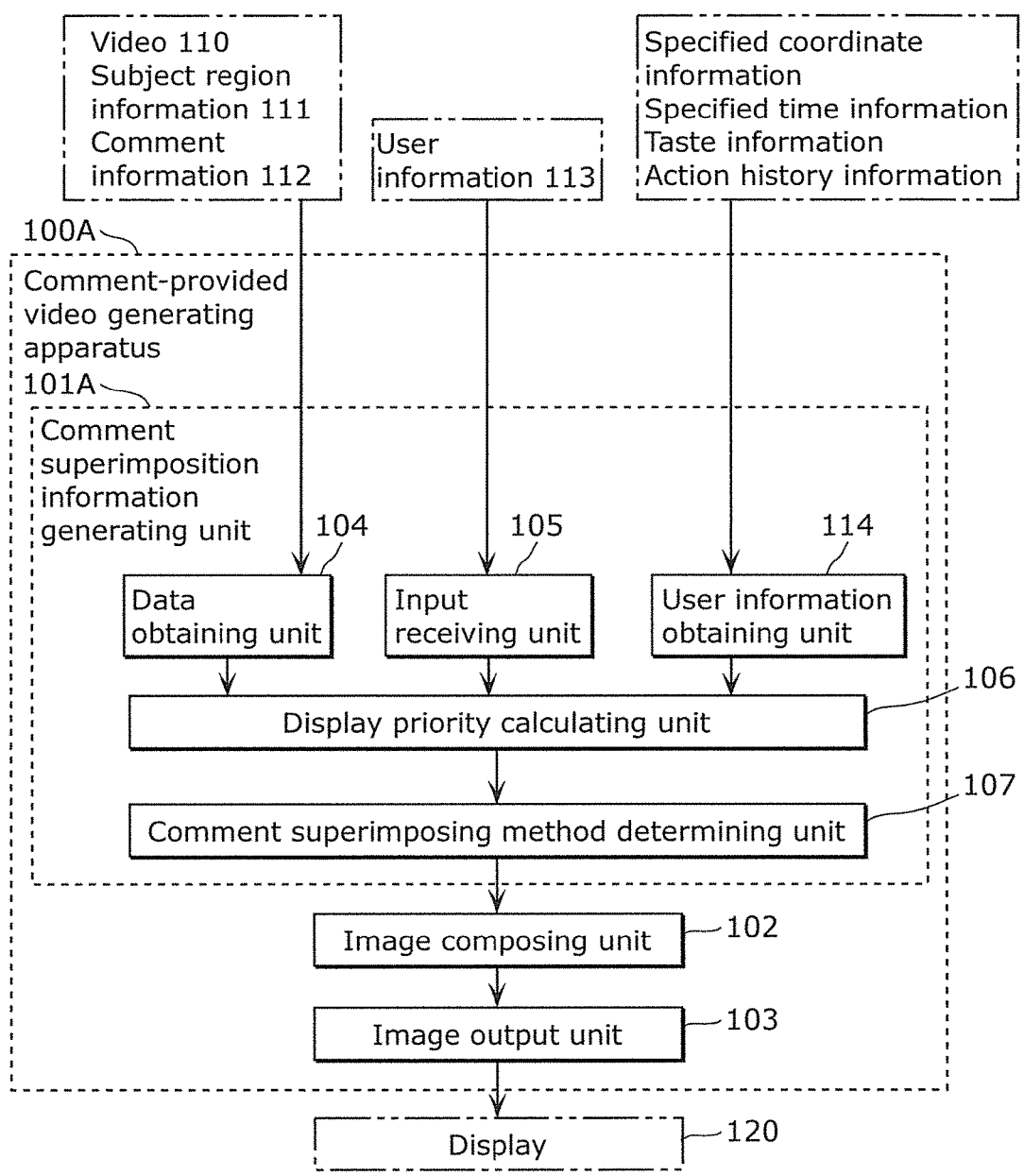
FIG. 22 is a block diagram showing a structure of a comment-provided video generating apparatus including a user information obtaining unit.

The comment-provided video generating apparatus in this embodiment may include a user information obtaining unit in stead of or in addition to the input receiving unit 105. FIG. 22 is a block diagram showing a structure of a comment-provided video generating apparatus 100A including a user information obtaining unit. The comment-provided video generating apparatus 100A basically has the same structure as that of the comment-provided video generating apparatus 100 shown in FIG. 6, and includes the user information obtaining unit 114 instead of the comment superimposition information generating unit 101. The comment superimposition information generating unit 101A includes the user information obtaining unit 114 that is not included in the comment superimposition information generating unit 101. The user information obtaining unit 114 obtains specified coordinates and specified time instead of pre-stored user information 113, from an information distribution source (a user ID information server) or the like through a wired or wireless communication path.

In addition, the user ID information server may store tastes of each of users who are browsing web pages or information such as a behavior history on the Internet of the user. The user information obtaining unit 114 may obtain information such as the user's tastes and behavior history instead of obtaining user information 113 through an interface, and estimate the user information 113 based on the obtained information. With this structure, it is possible to automatically display a comment-provided image that matches the user's tastes without receiving any intuitive inputs from the user.

More specifically, for example, the display priority calculating unit 106 determines whether or not a comment provided in a video that is currently being viewed by the user includes a character string (such as the name of a particular subject) registered in advance by the user and stored in the user ID information server or a character string corresponding to an article which is in a Social Networking Service (SNS: Facebook or the like) or on the Internet and is shared by users or selected by means of a user pressing a Like button. If the determination result is true, the display priority calculating unit 106 may determine that the comment region of the comment and the subject region corresponding to the comment are selected by the user, increase the display priorities of the respective regions, and display these regions at more frontward positions.

In particular, as shown in FIG. 23, a user who is viewing a video may perform another activity on the Internet simultaneously with the viewing or before or after the viewing. For example, a user may read an article on the Web or watch an SNS while viewing a video. At this time, when the user shares an article in an SNS or the Internet and/or presses a Like button for the article as shown in (a) of FIG. 23, the article to which the Like button pressed or the character string corresponding to the shared article may be added to the user ID information server while the video is being viewed as shown in (b) of FIG. 23. FIG. 23 shows a case where a character sting "yy" replaces a character string "xx" and is added to the information in the user ID information server. When the user ID information is updated based on a user's behavior history on the Internet, it is possible to automatically provide display reflecting the user's tastes by taking a display method for sequentially modifying the superimposition and display order as shown in (b) of FIG. 23 based on the new user ID information in the user ID information server, without requiring the user to perform any operation such as a touch in order to sequentially modify the user information in connection with the video. In other words, the comment region of the comment corresponding to the subject region corresponding to the character string "xx" is displayed at a frontward position.

The user ID information server also stores information about other comment providers, and thus user ID and terminal numbers of the comment providers may also be used in the display priority calculating process. For example, by storing inter-user friendship in the SNS or follow states in association with the user ID in the user ID information server, the display priority calculating unit 106 can perform weighting for increasing the values of the display priorities for comments provided by a provider who is one of friends of the user who is currently viewing a video or comments provided by a provider who is followed by the user who is currently viewing the video. In this case, as in the earlier-described example, by performing the display method for sequentially modifying the superimposing and display order according to the friendship in the current SNS or a change in the follow states, it is possible to automatically perform display reflecting the user's tastes.

In addition, the user ID may be directly specified instead of the user specification of the subject region or the comment region. In this case, the display priority calculating unit 106 may perform the process set (C) in FIG. 19 or the process set (C) in FIG. 20, assuming that all of the comments provided by a specific user having the specified user ID are selected by user inputs.

Furthermore, as shown in FIG. 24, the user ID information server may store a viewing history of the user, together with the user ID. The user does not always watch the same video only once. At this time, when no comment on the video is added by any other user between plural viewing times of the video by the user, the video with the same comments is displayed in such a manner that an already-read comment is superimposed at the foremost position at both of the plural viewing times.

In view of this, the user information obtaining unit 114 is configured to obtain the viewing history of the user who is viewing a comment-provided video, and determine whether or not the user has already watched the same comment-provided video before. Furthermore, the display priority calculating unit 106 decreases the display priority of the region displayed at the foremost position at the previous viewing time, and superimposes and displays the region at a backward position, thereby preventing the same comment-provided video is displayed as seen before as described earlier.

In FIG. 24, (a) shows first viewing of a video by the user. At this time, viewing time zone and information about the video are written into the user ID information server. Information about the display priorities in the video at the first viewing may be additionally written into the user ID information server.

As shown in (b) in FIG. 24, when the user views the video next, the display priority calculating unit 106 makes an inquiry to the user ID information server to determine whether or not the current video is already written in the user ID information server, thereby determining whether or not the video is an already viewed one. When the current video is an already viewed one, with reference to the information indicating the display priorities at the last-time viewing, the display priority calculating unit 106 assigns the region displayed at the foremost position last time the lowest display priority. Here, the comment-provided video generating apparatus 100 adds the viewing history to the user ID information server as shown in (C) of FIG. 24 similarly to the first-time viewing of the video.

In this way, in the plural viewing times, the superimposing order of regions to be displayed is updated for each of the viewing times. Thus, even if the same user views the video having substantially the same content plural times, the user can enjoy the video modified to superimpose the comments differently every viewing time, instead of the same video in which the same comment is fixedly displayed at the foremost position.

Figure 25A:
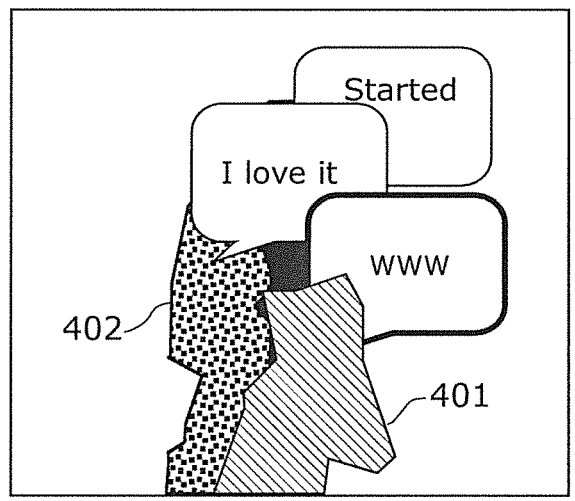
FIG. 25A is a diagram showing a concept of a comment that follows a motion generated by a comment-provided video generating apparatus according to Embodiment 1 or Embodiment 2.
Figure 25B:
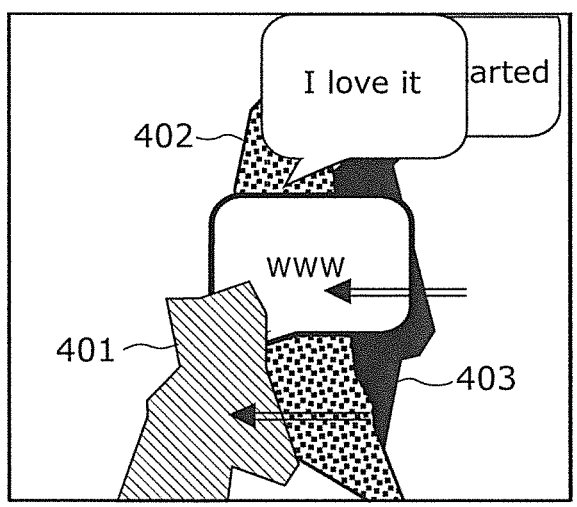
FIG. 25B is a diagram showing a concept of the comment that follows the motion generated by the comment-provided video generating apparatus according to Embodiment 1 or Embodiment 2.

Here, the comment information 112 does not always need to store the base coordinates of all the frames. For example, when region information includes motion information between pixels in regions in adjacent frames or motion information between the entire regions, it is possible to display a comment tracking a region or pixels between the regions or pixels, based on the base coordinates at a comment starting time, and the pre-calculated pixel motion or region motion (FIG. 25A, and FIG. 25B).

Even in a particular case where subject regions have variable sizes, natural tracking can be realized by calculating, for comment regions, base coordinates which maintain depth relationships with the centers of subject regions included in region information. In other words, the base coordinates of the comment regions are calculated based on the size of the subject region corresponding to the comment in a comment starting frame and the pixel positions of the base coordinates at the comment starting time on the subject region, so as not to relatively change the positions of the comment regions with respect to the subject regions. For example, it is also good to calculate base coordinates of comment regions at and after a current frame by, for example, normalizing the distances from the base coordinate positions of the comment regions to the centers of the subject regions to which comments are provided, using the sizes of the subject regions.

In addition, fast forward, preview, rewind, skip etc. may be performed on a comment-provided video, in addition to reproduction at a normal video rate. Particularly when a large number of comments are provided to a video, a user who normally understands the comments at a normal rate has difficulty in recognizing the comments when the video is reproduced at a simply increased frame rate when performing normal fast forward or rewind or a jump between frames.

Figure 26:
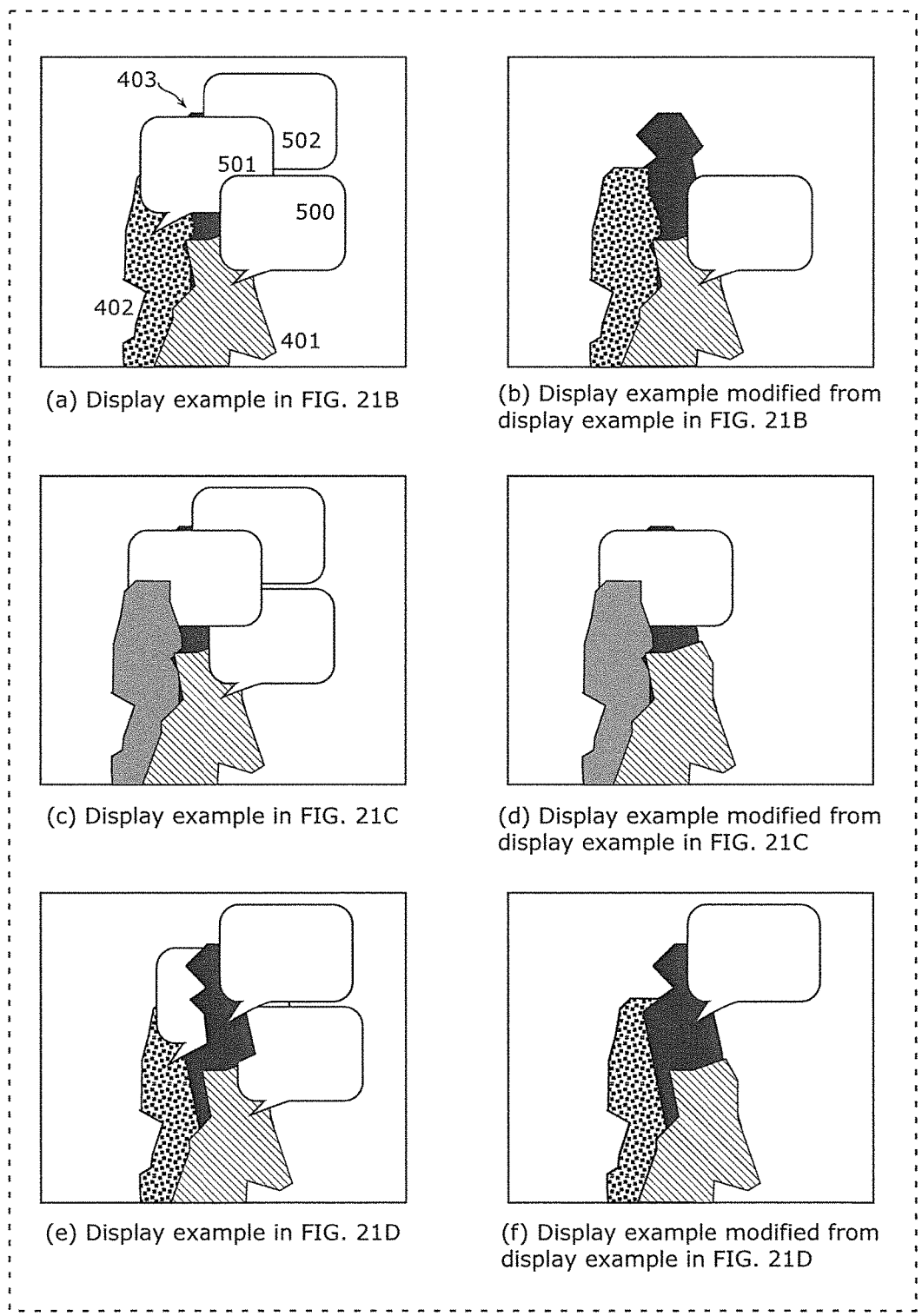
FIG. 26 shows how comment regions are displayed in the cases in each of which one viewing method that is fast forward, preview, rewind, skip or the like is performed.

In view of this, display forms are modified in the case where viewing methods such as fast forward, preview, rewind, a skip etc. are performed. FIG. 26 shows such modification examples. In display examples (b), (d), and (f) (modified from display examples (a), (c), and (e), respectively), only the foremost comment region is superimposed and displayed in each of frames. More specifically, it is assumed here that one of the display forms as in (a), (c), and (e) is provided at the time of normal reproduction. When one of viewing methods such as fast forward, preview, rewind, a skip, etc. is performed while one of the display forms (a), (c), and (e) is provided, the display form is modified to a corresponding one of the display forms as shown in (b), (d), and (f).

The user needs to understand information quickly when one of the viewing methods such as fast forward and rewind is performed. By displaying only the important comment as in each of the above cases, it is possible to provide display which reflects the user's tastes, includes a reduced amount of comment information to be understood by the user, and is easy to see even when such fast forward and rewind is performed.

As described above, according to Embodiment 1, it is possible to generate a comment-provided video in which comment regions are superimposed and displayed, based on rules for increasing display priorities for one or more comment regions and/or subject regions corresponding to time and coordinates specified in the video which are included in user information. In this way, it is possible to display the comment-provided video in such a userfriendly manner that comment and subject regions which are important to the user are not occluded by being superimposed behind another comment region although the other comment and subject regions are superimposed behind another comment region.

Embodiment 2

Figure 27:
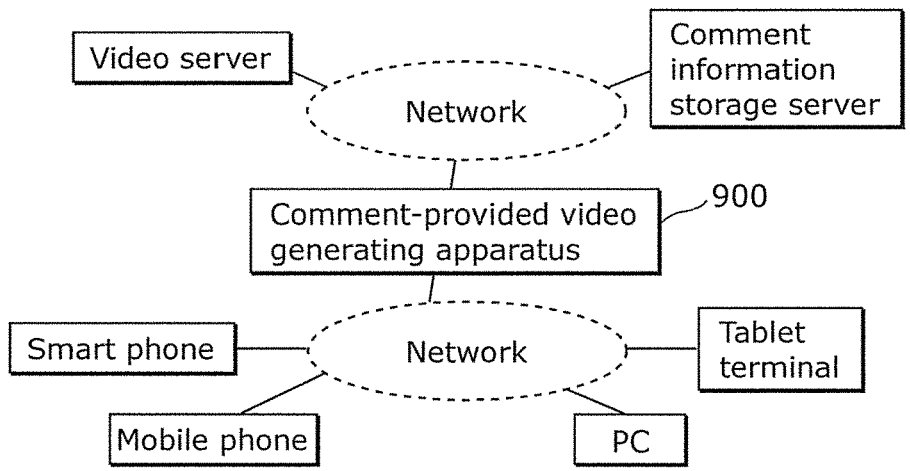
FIG. 27 is a diagram showing an example of a structure of a video distributing system in Embodiment 2.

The comment-provided video generating apparatus 100 in Embodiment 1 receives the subject region information 111 obtained in advance as inputs to the data obtaining unit 104 and processes the inputs. However, instead of the subject region information 111, other subject region information 111 may be generated in a comment-provided video generating apparatus. In view of this, the comment-provided video generating apparatus according to this embodiment includes a subject region information generating unit which generates subject region information. In this case, the video distributing system according to Embodiment 2 is, for example, as shown in a configuration example in FIG. 27. In other words, the video distributing system has an advantage of being more versatile because it does not require a region information server for storing subject region information that is included in the configuration in Embodiment 1 as shown in the example of FIG. 1, FIG. 3, or FIG.4.

Figure 28:
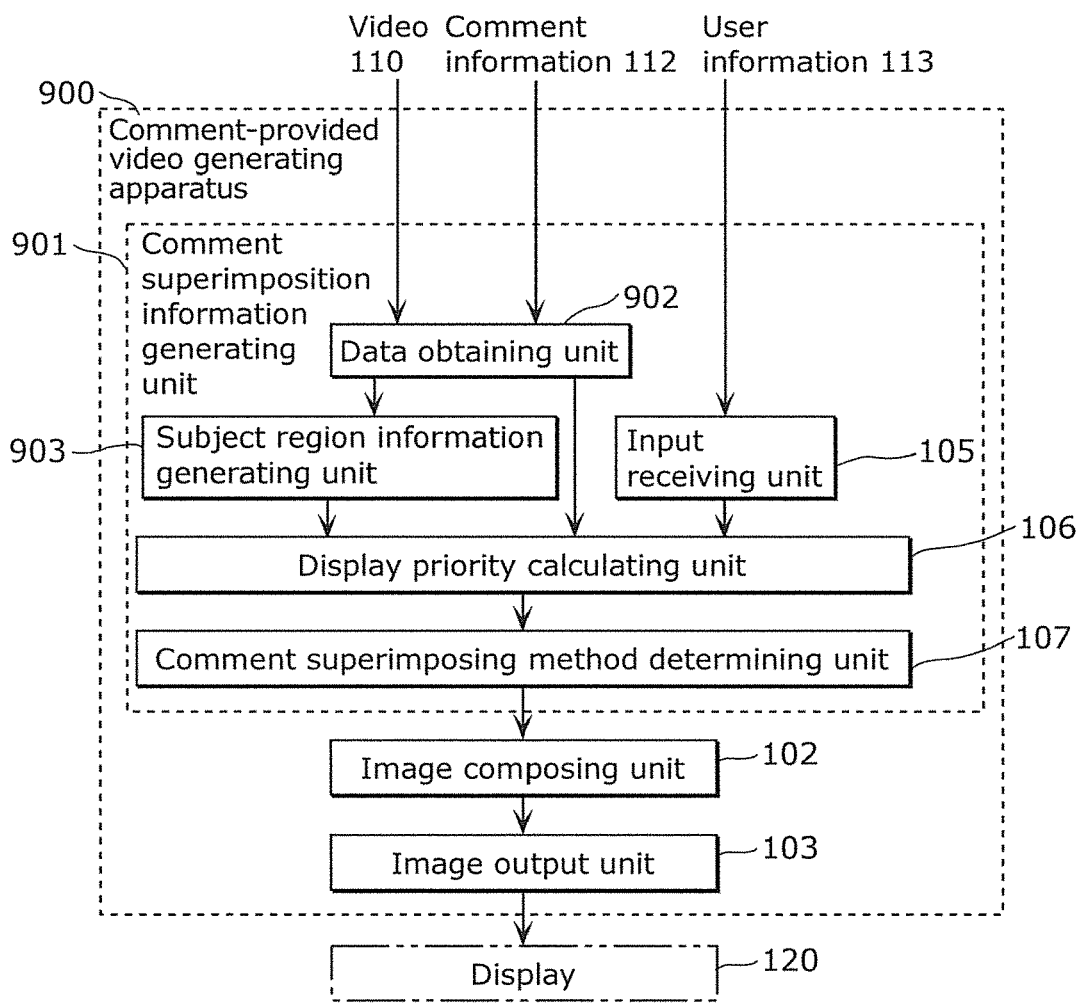
FIG. 28 is a block diagram showing a structure of the comment-provided video generating apparatus according to Embodiment 2.

FIG. 28 shows a structure of the comment-provided video generating apparatus 900 in Embodiment 2. The comment-provided video generating apparatus 900 includes a comment superimposition information generating unit 901, an image composing unit 102, and an image output unit 103. The comment-provided video generating apparatus 100 includes the comment superimposition information generating unit 901 which performs a process differently from the comment superimposition information generating unit 101 included in the comment-provided video generating apparatus 100 in Embodiment 1 shown in FIG. 6.

More specifically, the comment superimposition generating unit 901 includes a data obtaining unit 902 and a subject region information generating unit 903 instead of the data obtaining unit 104 in Embodiment 1. The data obtaining unit 902 obtains a video 110 and comment information 112. The subject region information generating unit 903 receives the video 110 as an input, and generates subject region information. The structure in this embodiment makes it possible to calculate the subject region information (a region attribute, a position attribute, division information, etc.) from the video 110, thereby generate the comment-provided video without any input of subject region information.

The data obtaining unit 902 differs from the data obtaining unit 104 in Embodiment 1 only in the point of whether or not to receive the subject region information 111, and thus no detailed descriptions are provided here.

The subject region information generating unit 903 performs a unique subject region information generating process which may involve, for example, a motion-based division method. More specifically, the subject region information generating unit 903 may apply an approach for dividing a video into regions based on pixel motions as explained in Patent Literature 6. This provides an effect of being able to correctly divide subject regions in the video into subject region sets each including a similar motion. At that time, the division is performed based on a distance between motion trajectories each showing a joint of each subject in the video. Thus, it is possible to extract subject regions including the same subject precisely even if the subject is a moving body, such as a person, whose posture changes significantly in the video. In addition, for example, between two adjacent subject regions, it is possible to determine that a first subject region is occluded by a second subject region in a time zone in video time when the number of motion vectors which disappears or stops around a boundary between the adjacent subject regions in the time zone is larger in the first subject region than in the second subject region. In this way, focusing on the disappearance of the motion trajectories, it is possible to determine information indicating the relative positions of the adjacent subject regions.

Here, the comment information 112 in this embodiment does not always need to store the base coordinates of all the frames. For example, when the base coordinates at a comment starting time, it is possible to display the comment with the subject region to which the comment is provided and cause the comment to track the subject region, based on a motion of the same subject region between frames calculated by the subject region information generating unit 903 (FIG. 25A, FIG. 25B).

Alternatively for example, in order to maintain the depth relationship between the center of the subject region and the comment base coordinates, it is good to provide an object-tracking comment coordinate generating unit which calculates base coordinates of a comment region in the frame and the following frames, from the subject region information and the comment information 112 as inputs.

It is to be noted that each of the structural elements of the subject region information generating unit 903 may be configured as software such as a program which is executed on a computer, or may be hardware such as an electric circuit or an integrated circuit.

The subject region information generating unit 903 may perform division into regions using measurement data, or the like. For example, it is possible to perform division into regions more precisely by combining the above-described division approach (Patent Literature 6) using pair-wise distances with an additional process of decreasing a pair-wise distance between regions having similar measurement data items and increasing a pair-wise distance between regions having dissimilar measurement data items. Furthermore, the use of such measurement data makes it possible to calculate depth relationship between subject regions to some extent. Therefore, the display priority calculating unit 106 may use the approach for calculating the local display priorities, or may use the approach involving ranking of display priorities of all the regions.

The video distributing system in this embodiment includes a server apparatus which is held and managed by an information distribution source, a plurality of personal computers (PCs) which can perform network communication, a plurality of mobile terminals (mobile phones, smart phones, tablet PCs, etc.) which can also perform network communication, and a wired or wireless communication line. The server apparatus, the PCs, and the mobile terminals are connected directly or through a relay base station to the communication line wired or wirelessly, and can mutually communicate information through the communication line.

In addition to the effect obtainable in Embodiment 2, Embodiment 2 makes it possible to detect subject regions through division into regions even if the subject regions included in the video are unknown as described above.

The comment-provided video generating apparatus in each of Embodiments 1 and 2 can be effectively used as an input supporting apparatus. An example is shown below.

The video distributing system described earlier in this disclosure can not only allow a user to view a comment-provided video but also allow the user to additionally input his or her comment. The input device may be a tablet, a PC, or the like, and the user may input and provide a comment sentence to the video using a method represented by already proposed approaches such as the one shown in Patent Literature 1.

Figure 29A:
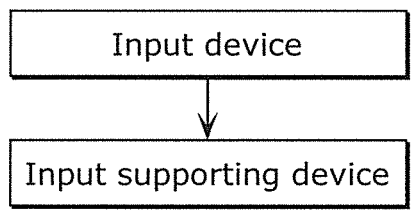
FIG. 29A is a block diagram showing a configuration of a system including an input device and an input supporting apparatus.
Figure 29B:
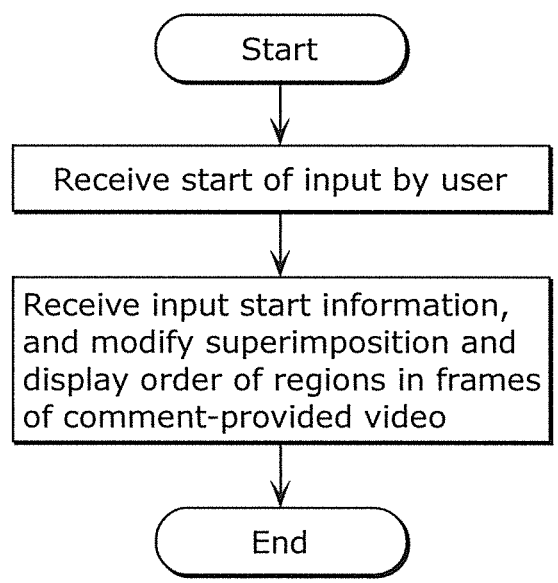
FIG. 29B is a flowchart of processes executed by the input supporting apparatus.
Figure 30A:
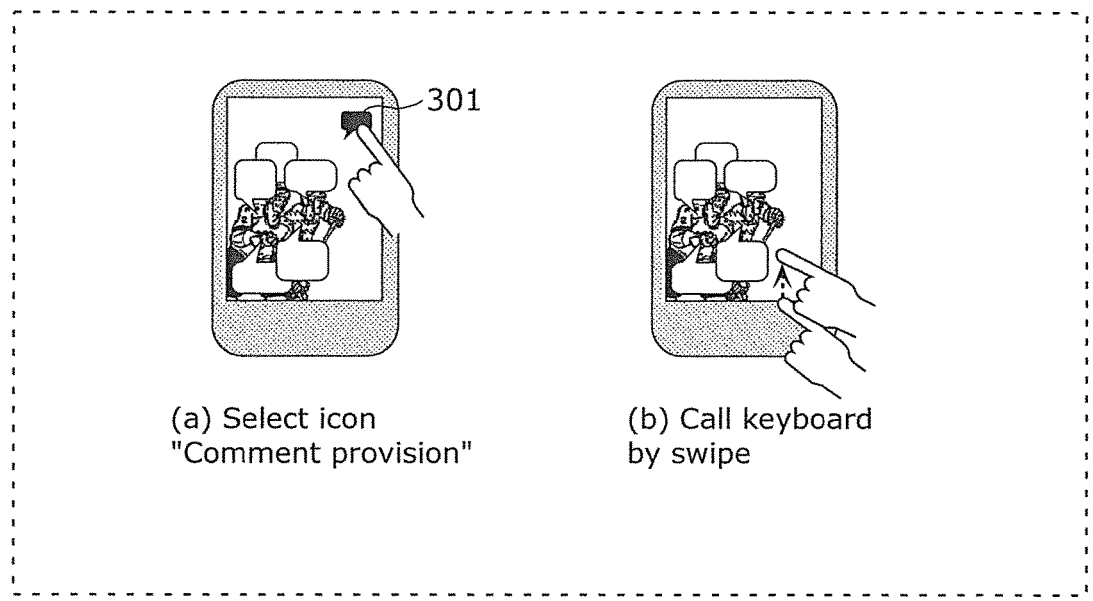
FIG. 30A is a diagram showing procedures for transitioning from a video viewing state into a comment input state.

FIG. 29A is a block diagram showing a configuration of a system including an input device and an input supporting apparatus. FIG. 29B is a flowchart of processes executed by the input supporting apparatus. Here, the input supporting apparatus described here corresponds to a display control apparatus for performing display control at the time when the comment is input, and as shown in FIG. 29A, receives input start information indicating that a comment is to be input by a user, from the input device. See (a) of FIG. 30A showing an example where a comment icon 301 which can be selected when a user provides a comment is displayed on a display screen of an input device. When the user presses the comment icon 301, the input device may transmit the input start information to the input supporting apparatus. In FIG. 30A, (b) shows another example where the input device transmits input start information to the input supporting apparatus by receiving a particular user action such as an upward swipe from a lower end of the display screen.

When the input supporting apparatus receives the input start information from the input device, the reproduction of the video 110 may be automatically and temporarily stopped, and then the comment may be submitted during the temporary stop. Alternatively, the reproduction of the video 110 may be temporarily stopped by a user operation on the display screen.

The input supporting apparatus receives the input start information as described above, and thus can know that the user intends to input the comment before the user actually inputs the comment.

Here, when the comment is added to the comment-provided video in which a large number of comments is already provided, there is a possibility that a subject region or a comment region for or in which the user intends to add his or her comment is occluded by another comment region or subject region. Such occlusion should preferably be prevented when the user adds his or her comment smoothly for or in a target region. To prevent such occlusion, the input supporting apparatus modifies a display order in advance when receiving the input start information.

Figure 30B:
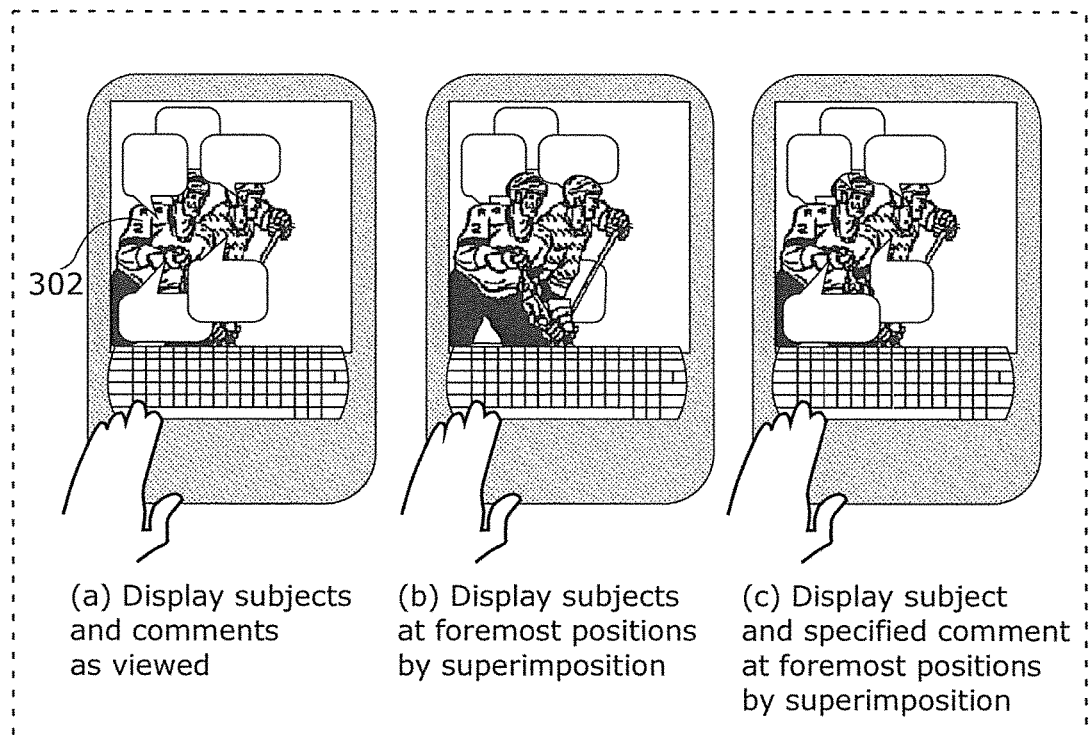
FIG. 30B is a diagram showing image screen display examples in a comment input state.

A specific example is shown in (a) of FIG. 30B. For example, when the user inputs a comment for a subject 302 located at the left side, there is a possibility that the user has difficulty in inputting his or her comment because the subject 302 is occluded by existing comments as in (a) of FIG. 30B which are displayed in the same manner as in viewing time. In this case, by displaying the subject at a foremost position as shown in (b) of FIG. 30B, it is possible to allow the user to easily input his or her comment for the particular subject.

This can be performed by estimating the subject to which the user intends to input his or her comment. In most cases, users generally input comments for particular subjects. For this reason, the simplest method is to display all subject regions at positions in front of all comment regions.

Furthermore, it is also good to register in advance information reflecting users' tastes in a user ID information server, and to display only subject regions of subjects included in the registered information at positions in front of the other subject regions and all comment regions. Alternatively, it is good to display the comments provided for the subject regions at positions in front of the other subject regions and all comment regions. By doing so, the user can easily select the subject region as the comment input target while viewing the other comments provided for the comment input target. As a matter of course, the information stored in the user ID information server may be modified in real time to reflect each user activity on the Internet.

Alternatively, with reference to the information stored in the comment information storage server, the input supporting apparatus may determine the target subject region with a large number of comments to be a region to which a user is highly likely to input a comment, for example, before the user inputs his or her comment.

In addition, the user may intend to input his or her comment to a given comment A. In this case, the visibility of the comment A is more important than that of the subject region to which the comment A is provided. Accordingly, the input supporting apparatus may display the comment region including the comment A and the subject region corresponding to the comment A at foremost positions. This allows the user to easily select the comment input target region while viewing the comment A, and to input his or her comment.

This can be performed by estimating the comment to which the user intends to input his or her comment. As described in connection with the earlier-provided example, when user ID and information such as user's human relationship (a social graph) and a follow state on an SNS are stored in an associated manner in the user ID information server, or when it is possible to access the user's social graph associated with the user ID by the input supporting apparatus, comments provided by user's friends and other users followed by the user may be determined to be the comments to which the user provides his or her comment.

Alternatively, it is good to employ comments for subjects stored in the user ID information server as matching the user's tastes. In this way, as shown in the example in (c) of FIG. 30B, it is possible to prevent occlusion of the particular subject region or the comment region to which the user tries to input his or her comment.

As for which one of the comment region and the subject region should be prioritized in the display, the user may register the one in the user ID information server in advance. When only one of the comment region and the subject region is present (or can be estimated) in a frame among subject regions and comment regions to which the user is likely to provide his or her comment, the only one may be prioritized.

Embodiment 3

The comment-provided video generating apparatuses in Embodiments 1 and 2 each receive the video from the video server, as an input to the data obtaining unit, and processes the video. However, instead of receiving the video as the input from the video server, a user who uses a comment-provided video generating apparatus may input a video captured by a user's camera to the comment-provided video generating apparatus.

Figure 31:
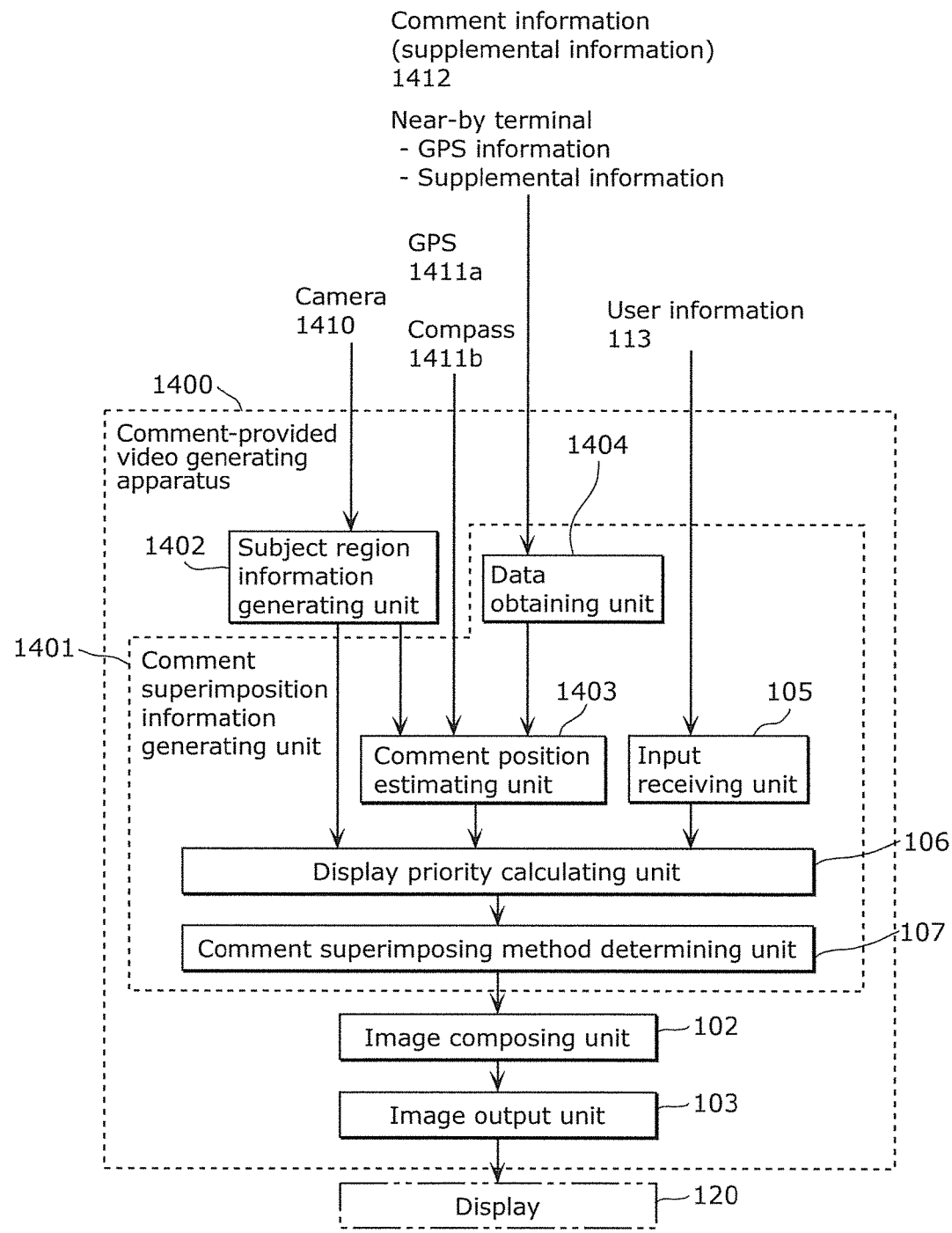
FIG. 31 is a block diagram showing a structure of a comment-provided video generating apparatus according to Embodiment 3.

FIG. 31 shows a structure of the comment-provided video generating apparatus 1400 according to Embodiment 3. The comment-provided video generating apparatus 1400 includes a subject region information generating unit 1402, a comment superimposition information generating unit 1401, an image composing unit 102, and an image output unit 103. The comment-provided video generating apparatus 1400 according to Embodiment 3 is an apparatus which generates a comment-provided video to be displayed on a mobile terminal including the comment-provided video generating apparatus 1400. The mobile terminal includes a camera 1410, a display 120, a GPS 1411$a$, and a compass 1411$b$. The camera 1410 captures a space in front of a user (an image capturing person). The display 120 is set at a position with an angle that allows the user to view the comment-provided video generated by the comment-provided video generating apparatus 1400, and displays the video. The GPS 1411$a$ measures position information of the mobile terminal. The compass 1411$b$ measures a direction of the mobile terminal. The comment-provided video generating apparatus 1400 composes the video captured by the camera 1410 and comment information obtained from an external database through a communication path such as a network so as to generate a video in which a comment region including the comment information is superimposed.

The subject region information generating unit 1402 obtains the video from the camera, and calculates subject region information. The comment superimposition information generating unit 1401 includes a data obtaining unit 1404, a comment position estimating unit 1403, an input receiving unit 105, a display priority calculating unit 106, and a comment superimposing method determining unit 107.

The data obtaining unit 1404 obtains comment information 1412 including the GPS information of other terminals located within a certain range from the user and supplemental information thereof. The comment position estimating unit 1403 calculates a position of the camera in the user's mobile terminal (hereinafter referred to as a first mobile terminal) and a direction of a camera axis based on the GPS information of the first mobile terminal and mobile terminals (hereinafter referred to as second mobile terminals) of the other persons and compass information of the first mobile terminal, and estimates, for each comment information 1412, which one of subject regions in the video corresponds to the comment information 1412 based on the result of the calculation. The display priority calculating unit 106 receives, as inputs, the subject region information calculated by the subject region information generating unit 1402, the comment information 1412, the user information 113, and the result of the estimation by the comment position estimating unit 1403, and calculates a display position for the comment, and display priority for each of the subject region and the comment. The comment superimposing method determining unit 107 determines a method for superimposing the comment onto the video, based on the display priority calculated by the display priority calculating unit 106.

The image composing unit 102 superimposes the comment region onto the video, based on the comment superimposing method determined by the comment superimposing method determining unit 107. The image output unit 103 outputs the video including the superimposed comment to the image output unit 103.

Figure 32:
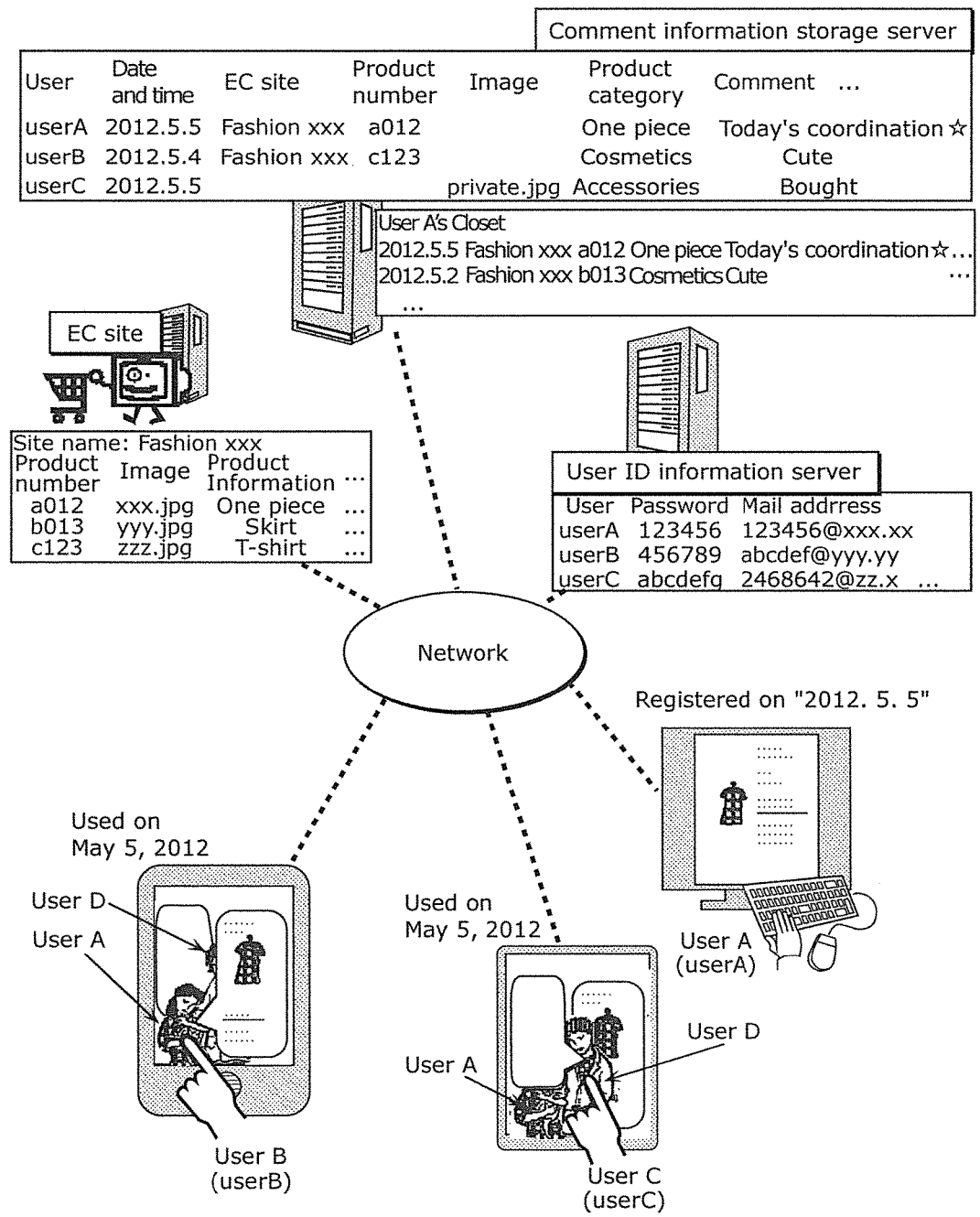
FIG. 32 is a diagram showing an example of a structure of a video distributing system in Embodiment 3.

FIG. 32 shows a simple configuration example of the video distributing system including the comment-provided video generating apparatus in this embodiment. The video distributing system includes a comment information storage server and a user ID information server. Furthermore, the comment-provided video generating apparatus 1400 may access external server such as an electric commerce (EC) site and information therein through a network. These servers may be managed in the same PC, or in separate PCs.

The user can register user information in the user ID information server in advance. For example, the user can register information items of the user in the user ID information server using a keyboard or software keyboard of the mobile terminal, a touch operation, or the like. Examples of such information items include photographs or videos of goods bought by the user, product information or comments associated with the goods, link information to the EC site, information of goods on sale in the EC site and comments associated with the goods on sale. For example, a user A can register information items such as "one piece" as a product category, "Today's coordination" as a comment, and "2012.5.5" as a date and time. More specifically, it is assumed that the user A registers goods to be candidate garments and belongings of the user on the date. Here, the date and time at which the comment is registered may be automatically registered. When the user plans to wear garments, the registered garments or goods (including garments and belongings), the user may input the dates and time of wearing the garments or bringing the belongings.

The information including these comments (comment information 1412) is additionally stored in the comment information storage server as shown in FIG. 32. Examples of the comment information items include the user ID of the user who made the comments, dates and time, photographs, categories of the goods, and information of the EC site (the name of the site, product numbers, etc).

Here, it is assumed that other users B and C direct their cameras (activated cameras) of their mobile terminals after the user A made the comments. Among the comment information items 1412 associated with the user A, comment information items corresponding to today are distributed from the comment information storage server. These comment information items of the user A are superimposed and displayed on the display screens of the mobile terminals of the users B and C as shown in FIG. 32. Alternatively, the users B and C may direct their cameras to the user A at totally different places on different time zones of the same day. Here, the information items related to the user A may be displayed as shown in FIG. 32 while the cameras are capturing the user A in the display screens. As described earlier, the user A registers the today's garments or belongs in advance. Thus, for example, information related to the one piece worn by the user A is displayed on the display screens of the mobile terminals of the users B and C. In this way, the users B and C can know the information (the manufacturer, price, availability, etc.) about the one piece. Conventionally, the garments etc. worn by "another person (the user A here)" can be known only by directly asking the user A about the garments when other users (the users B and C here) want to know the information. With this configuration, the users B and C can easily know the information of the garments etc. of the user A.

For example, as in FIG. 32, the comment information may be displayed at a predetermined position. When the comment information items of the user A are associated with information items on the EC site, provision of link function to images, comment characters etc. on the EC site allows a user to transit to product pages (for purchase) on the EC site only by touching the images, comment characters etc. as a user input. This provides an effect that the users who are interested in garments are promoted to take purchase actions.

As shown in FIG. 32, when the display screens of the mobile terminals of the users B and C display the same images of the users A and D, and the user D also registered in advance the same information as the information of the user A, one of the user A and the user D and the comment information associated with the one are occluded by each other. Here, by controlling how to superimpose and display the subject regions and the comment regions of the users A and D, the user B or C can know particular information smoothly. In view of this, Embodiment 3 performs such control, by applying the comment-provided video generating apparatus described in Embodiment 2. By doing so, for example, the user B who selected the user A can visually recognize the user A and the comment information corresponding to the user A which are not occluded. Likewise, the user C who selected the user D can visually recognize the user D and the comment information corresponding to the user D which are not occluded.

Hereinafter, a detailed description is given of the structure of the comment-provided video generating apparatus 1400 according to this embodiment.

Figure 33:
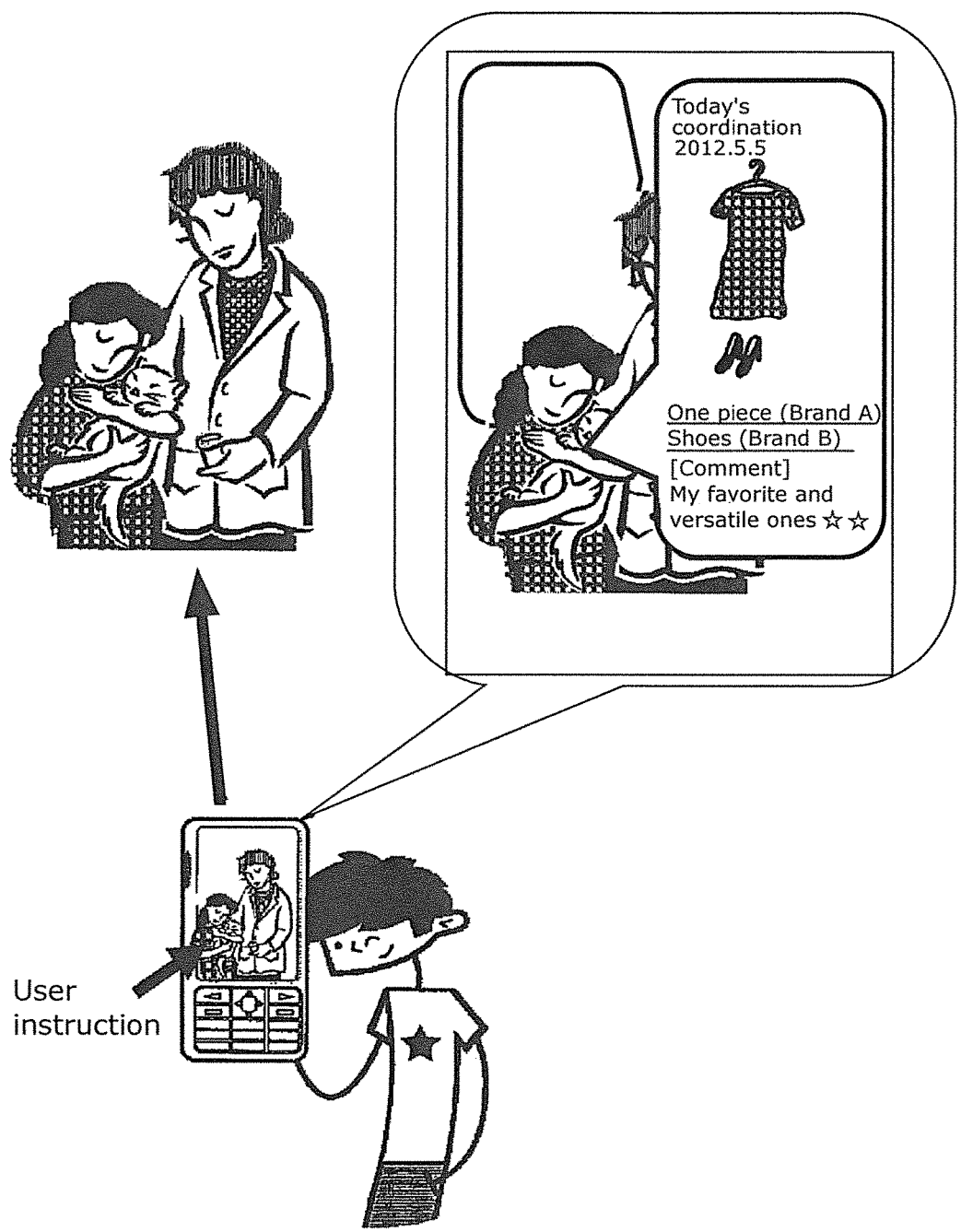
FIG. 33 is a diagram showing an example of a usage scene of the comment-provided video generating apparatus according to Embodiment 3.

As shown in FIG. 33, the comment-provided video generating apparatus 1400 according to this embodiment is especially intended to allow a given user who is directing the camera of his or her mobile terminal toward a subject such as a person to thereby visually recognize, on the display screen of the mobile terminal, information of the person or information of goods belonging to the person. The comment-provided video generating apparatus 1400 adds and displays the information as comment for a particular subject region in a video captured by the camera of the mobile terminal and on the display screen of the mobile terminal.

The particular subject region is a subject region specified by the user through a user interface (UI) such as a touch panel on the mobile terminal or a subject region determined based on information registered in an external database obtained by the data obtaining unit 1404. The comment-provided video generating apparatus 1400 superimposes the comment region at a position in the video at which the comment region does not occlude the particular subject region.

The subject region information generating unit 1402 is similar to the subject region information generating unit 903 in Embodiment 2, and thus no description is given here.

Figure 34:
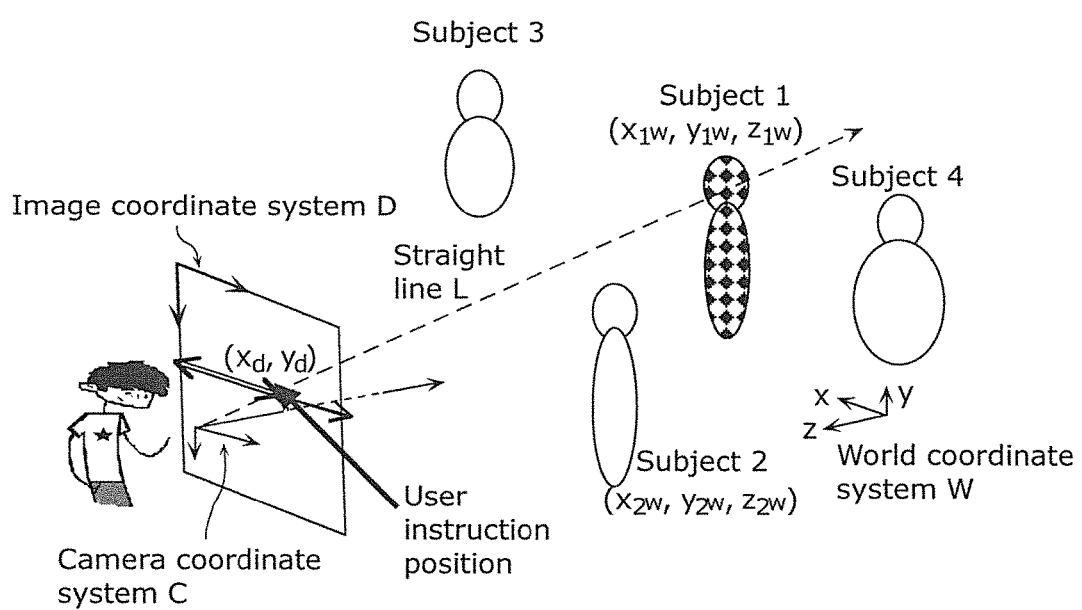
FIG. 34 is a diagram showing positional relationships between subjects and a user of the comment-provided video generating apparatus according to Embodiment 3.

FIG. 34 shows a scene in which a user specifies a subject 1. The input receiving unit 105 receives information input by the user using a touch panel or the like, and calculates a user-specified position in an image coordinate system D.

Here, a straight line L (a straight line passing through an arbitrary point (xd, yd) and the origin of the camera coordinate system C) in the world coordinate system W specified by the point (xd, yd) on an image such as the user-specified position can be calculated from parameters of the camera and a transform matrix of the camera coordinate system. The parameters and transform matrix can be calculated by calibration. This is specifically described in Non-patent Literature 1, and thus is not described here.

On the other hand, an x component and a z component of position information (xw, yw, zw) on the world coordinate W of each of subjects can be obtained, for example, using GPS information from the mobile terminal of the subject. As shown in FIG. 34, a y component is a component in the height direction of the subject. For example, when the user registers his height H, or an average height H is calculated based on generation and sex, the y component is determined within a range (yw=0 to H) for use. Likewise, xw and/or zw may be determined within a range based on a value indicating an average body width.

When the earlier-mentioned straight line L is calculated, the subject corresponding to (xw, yw, zw) closest to the user on the path of the L is determined to be the user-specified subject.

Based on the coordinates corresponding to each of the subject regions on an image coordinate system D calculated by the subject region information generating unit 1402, the comment position estimating unit 1403 estimates the mobile terminal corresponding to the subject region of the subject using in the same manner the camera parameters and transform matrix from GPS information of the mobile terminal located nearby obtained by the data obtaining unit 1404. The comment position estimating unit 1403 associates supplemental information corresponding to the mobile terminal and the subject region, and generates comment display information such as a comment position, a comment shape, and character information to be displayed in the video.

The display priority calculating unit 106 calculates display priorities from the comment display information generated by the comment position estimating unit 1403, the subject region information calculated by the subject region information generating unit 1402, and the user information 113 received by the input receiving unit 105. Operations performed by the display priority calculating unit 106 and subsequent operations are the same as in Embodiments 1 and 2, and thus are not described here.

In this way, the comment-provided video generating apparatus 1400 in this embodiment generates a comment region which does not affect the visibility of the user-specified subject region, and displays the supplemental information corresponding to the subject region on the display screen as shown in FIG. 33.

It is to be noted that the display priority calculating unit 106 does not always need to use the user information 113 received by the input receiving unit 105. For example, the comment information storage server may manage popularity and the like of a particular product or category etc. by additionally counting the number of comments submitted for the particular product or category with reference to data stored in the comment information storage server. The display priority calculating unit 106 may perform weighting on the display priorities, based on the information managed by the comment information storage server.

In addition, as described earlier with reference to FIG. 32, the comment information stored in the comment information storage server may include link information to the EC site, product numbers of goods etc. In this case, when a user touches a comment or an image with the link information on a comment region displayed on the mobile terminal of the user, a product purchase page or the like automatically appears (displayed web pages are switched). In other words, the link information may be displayed in the comment region (balloon) independently or together with the comments associated with the mobile terminal. For example, by displaying link information to a selling site providing information of garments of a subject, a user can easily buy favorite garments through the EC site.

According to Embodiment 3, it is possible to generate and display a comment-provided video in which a comment region corresponding to a user-specified subject region is not occluded by another comment region when a comment corresponding to a subject in a video captured by the user is displayed as in the case of using an Augmented Reality (AR) technique.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the comment-provided video generating apparatus according to each of the embodiments is a program described below.

The program causes a computer to execute: obtaining a video from a video server, and obtain, from a comment information storage server, comment information including (i) comments regarding the video, and (ii) display time and display positions of comment regions including the comments in the video; calculating priorities for comments corresponding to the video and subject regions which are regions of subjects included in the video, based on the comment information and the user information; determining a display order or a comment superimposing method including a transparency for superimposing and displaying the comments and the subject regions, based on the display priorities calculated in the calculating; generating a comment-provided video by composing the comments on the video, based on the comment superimposing method determined in the determining; and outputting the comment-provided video generated in the combining.

It is to be noted that the comment-provided video generating method and program described in the above embodiments can be effectively used as a comment superimposition order information generating method and program for generating, as information, an order of superimposing and displaying one or more user-selected subject regions with comments, one or more comment regions provided to the subject regions, one or more user-selected comment regions, and/or one or more subject regions to which comments are provided, above the other subject regions and the other comment regions provided to the subject regions.

In addition, the comment-provided video generating method and program described in the above embodiments can be effectively used as a comment-provided video output method and program for outputting a generated comment-provided video.

Although the comment-provided video generating apparatuses according to the aspects have been described based on the above embodiments, those skilled in the art will readily appreciate that these embodiments are non-limiting examples, and various modifications may be made in these exemplary embodiments without materially departing from the principles and spirit of the inventive concept, the scope of which is defined in the appended Claims and their equivalents.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

The comment-provided video generating apparatuses etc. according to the exemplary embodiments disclosed herein and variations thereof are applicable as comment-provided video generating apparatus etc. for use in audio visual apparatuses such as video cameras, television receivers, mobile terminals, tablet PCs etc. all connectable to networks and with which video distribution services and/or SNS on networks are available.

The invention claimed is:

1. A comment-provided video generating apparatus comprising:
a processor; and
a non-transitory memory having stored thereon executable instructions, which when executed, cause the processor to perform:
obtaining a video from a video server, and obtaining, from a comment information storage server, comment information including (i) comments regarding the video, and (ii) display time and display positions of comment regions including the comments in the video;
receiving, as a user input, user information including a specified time and a specified position in the video, the specified time and the specified position being arbitrarily specified;
calculating a display priority for each of the comment regions and subject regions to which the comments are provided, based on the user information and association information indicating associations between the comments and the subject regions, so that the display priority calculated for (i) a first comment region and a first subject region which correspond to the specified time and the specified position in the video included in the user information received in the receiving and (ii) either (a) a second subject region which is provided with a comment included in the first comment region which corresponds to the specified time and the specified position in the video and included in the user information received in the receiving or (b) a second comment region which includes a comment provided to the first subject region which corresponds to the specified time and the specified position in the video and included in the user information received in the receiving is higher than the display priority calculated for each of other comment regions and other subject regions;
determining a superimposing method for superimposing the comment regions and the subject regions according to the display priority calculated for each of the comment regions and the subject regions in the calculating such that a comment region or a subject region which has a higher display priority is positioned more frontward than a position of a comment region or a subject region which has a lower display priority;
generating a comment-provided video by composing the comment regions in the video, according to the superimposing method determined in the determining; and
outputting the comment-provided video generated in the generating,
wherein the outputting including outputting, onto an image display, the comment-provided video in which either (i) a first pair of the first subject region and the second comment region which includes the comment provided to the first subject region or (ii) a second pair of the first comment region and the second subject region which is provided with the comment included in the first comment region is superimposed and displayed on the other comment regions and the other subject regions, the first subject region and the first comment region corresponding to a user-selected region located at the specified position indicated by the user information, and
wherein the calculating includes:
when the specified time and the specified position in the video included in the user information indicate any of the comment regions, calculating a first display priority of the comment region and a second display priority of a corresponding one of the subject regions which is provided with the comment in the comment region, the first display priority and the second display priority are higher than the display priority of any one of the other comment regions and the display priority of any one of the other subject regions, respectively; and
when the specified time and the specified position in the video included in the user information indicate any of the subject regions, calculating a first display priority of the subject region and a second display priority of a corresponding one of the comment regions including the comment provided to the subject region, the first display priority and the second display priority are higher than the display priority of any one of the other subject regions and the display priority of any one of the other comment regions, respectively.

2. The comment-provided video generating apparatus according to claim 1,
wherein the display priority calculated for the first comment region and the first subject region is higher than the display priority calculated for either the second subject region and the second comment region.

3. The comment-provided video generating apparatus according to claim 1,
wherein the determining determines, based on depth relationship between the subject regions in the video, the superimposing method such that comment regions other than the first comment region and the second comment region are positioned based on a depth relationship between the subject regions in the video.

4. The comment-provided video generating apparatus according to claim 3,
wherein the calculating calculates a higher display priority for a comment region including a comment which is provided later in either the display time included in the comment information or in real submission time of the comments.

5. The comment-provided video generating apparatus according to claim 1,
wherein the executable instructions further cause the processor to perform obtaining the user information from a user ID information server, and
wherein, when user ID information in the user ID information server is updated while the user is viewing the video, the calculating includes calculating a new display priority for each of the comment regions and the subject regions, based on the updated user ID information.

6. The comment-provided video generating apparatus according to claim 1,
wherein the determining includes:
calculating, for each of pixels in an overlap area between two regions which are either (i) one of the subject regions and one of the comment regions or (ii) two of the comment regions, a transparency of the pixel to be displayed semi-transparent, based on a display priority ratio of the display priorities calculated for the two regions including the pixels; and
determining the superimposing method such that one of the two regions which is superimposed at the position more frontward than the position of the other one of the two regions is displayed more opaquely according to the calculated transparency.

7. The comment-provided video generating apparatus according to claim 1,
wherein the determining determines, based on information describing an occlusion relationship between subject regions among the subject regions, the superimposing method such that comment regions including comments corresponding to the subject regions in the occlusion relationship are displayed by temporally stopping the comment regions at positions before a start of an occlusion period in which the subject regions are in the occlusion relationship.

8. The comment-provided video generating apparatus according to claim 1,
wherein the determining determines, based on information describing an occlusion relationship between subject regions, the superimposing method such that comment regions including comments provided to the subject regions in the occlusion relationship are displayed by integrating the comment regions at positions before a start of an occlusion period in which the subject regions are in the occlusion relationship into a balloon comment region.

9. The comment-provided video generating apparatus according to claim 1,
wherein the determining determines, based on information describing an occlusion relationship between subject regions among the subject regions, the superimposing method such that only a comment region corresponding to an occluding subject region closer to a location of a camera used to capture the video among comment regions including comments provided to the subject regions in the occlusion relationship is displayed during an occlusion period in which the subject regions are in the occlusion relationship.

10. The comment-provided video generating apparatus according to claim 9,
wherein the determining determines the superimposing method and a transparency for superimposing the comment regions such that one of the comment regions which includes the comment provided to the occluding subject region is displayed semi-transparent, and all of the comment regions are displayed non-semi-transparent after the occlusion period.

11. A comment superimposing method determining method comprising:
obtaining a video from a video server, and obtain, from a comment information storage server, comment information including (i) comments regarding the video, and (ii) display time and display positions of comment regions including the comments in the video;
receiving, as a user input, user information including a specified time and a specified position in the video, the specified time and the specified position being arbitrarily specified;
calculating a display priority for each of the comment regions and subject regions to which the comments are provided, based on the user information and association information indicating associations between the comments and the subject regions, so that the display priority calculated for (i) a first comment region and a first subject region which correspond to the specified time and the specified position in the video included in the user information received in the receiving and (ii) either (a) a second subject region which is provided with a comment included in the first comment region which corresponds to the specified time and the specified position in the video and included in the user information received in the receiving or (b) a second comment region which includes a comment provided to the first subject region which corresponds to the specified time and the specified position in the video and included in the user information received in the receiving is higher than the display priority calculated for each of other comment regions and other subject regions;
determining a superimposing method for superimposing the comment regions and the subject regions according to the display priority calculated for each of the comment regions and the subject regions in the calculating such that a comment region or a subject region which has a higher display priority is positioned more frontward than a position of a comment region or a subject region which has a lower display priority,
wherein the calculating includes:
when the specified time and the specified position in the video included in the user information indicate any of the comment regions, calculating a first display priority of the comment region and a second display priority of a corresponding one of the subject regions which is provided with the comment in the comment region, the first display priority and the second display priority are higher than the display priority of any one of the other comment regions and the display priority of any one of the other subject regions, respectively; and
when the specified time and the specified position in the video included in the user information indicate any of the subject regions, calculating a first display priority of the subject region and a second display priority of a corresponding one of the comment regions including the comment provided to the subject region, the first display priority and the second display priority are higher than the display priority of any one of the other subject regions and the display priority of any one of the other comment regions, respectively.

12. A comment-provided video generating method comprising:
   The comment superimposing method determining method according to claim 11;
   generating the comment-provided video by composing the comment regions in the video according to the comment superimposing method determined in the determining; and
   outputting the comment-provided video generated in the generating,
   wherein, in the comment-provided video output in the outputting, either (i) a first pair of the first subject region and the second comment region which includes the comment provided to the first subject region or (ii) a second pair of the first comment region and the second subject region which is provided with the comment included in the first comment region is superimposed and displayed on the other comment regions and the other subject regions, the first subject region and the first comment region corresponding to a user-selected region located at the specified position indicated by the user information.

13. The comment-provided video generating method according to claim 12,
   wherein the association information further indicates subject information of subjects to which the plurality of comments are provided.

14. A comment-provided video generating apparatus comprising:
   a processor; and
   a non-transitory memory having stored thereon executable instructions, which when executed, cause the processor to perform:
      obtaining a video captured by a camera from a mobile terminal, the mobile terminal including (i) the camera which is used to capture an image of a user positioned in front of the camera, (ii) a display which is provided at a position that allows the user to visually recognize the display, (iii) a Global Positioning System (GPS), and (iv) a compass;
      generating subject region information indicating a plurality of subject regions in a frame of the obtained video based on content of the video, the subject regions being generated in the frame by dividing the frame;
      obtaining comment information including (i) GPS information of other mobile terminals located in a predetermined range from the user and (ii) a plurality of comments associated one to one to the other mobile terminals;
      receiving, as a user input, user information including an arbitrarily specified position in the video;
      calculating positions of the other mobile terminals in the video, based on the GPS information of the mobile terminal of the user, the GPS information of the other mobile terminals, and information of the compass of the mobile terminal;
      associating one to one subject regions presenting subjects who are users of the other mobile terminals and the comments included in the comment information obtained in the obtaining the comment information, based on the calculated positions of the other mobile terminals;
      calculating, based on the comment information and the user information, a display priority for each of a plurality of comment regions which are superimposed and displayed in the video and the subject regions in the video by calculating, for a first comment region including a first comment corresponding to a first subject region located at a display position in the video specified by the user information received in the receiving among the comment regions, a display priority which is higher than the display priority calculated for each of the other subject regions and the other comment regions;
      determining, as a superimposing method for displaying the comment regions in the video, one of a first method and a second method according the display priority calculated in the calculating;
         the first method being for determining a display order for displaying the comment regions and the subject regions in the video on an image display by superimposing the comment regions and the subject regions according to the display priority calculated for each of the comment regions and the subject regions in the calculating such that a comment region or a subject region which has a higher display priority is positioned more frontward than a position of a comment region or a subject region which has a lower display priority, and
         the second method being for determining a transparency for displaying the comment regions and the subject regions according to the display priority calculated for each of the comment regions and the subject regions in the calculating such that a comment region or a subject region which has a higher transparency is displayed more opaquely;
      superimposing the comment regions in the video, according to the comment superimposing method determined in the determining; and
      outputting the comment-provided video in which the comment regions are superimposed in the superimposing,
   wherein the calculating includes:
      when the specified time and the specified position in the video included in the user information indicate any of the comment regions, calculating a first display priority of the comment region and a second display priority of a corresponding one of the subject regions which is provided with the comment in the comment region, the first display priority and the second display priority are higher than the display priority of any one of the other comment regions and the display priority of any one of the other subject regions, respectively; and
      when the specified time and the specified position in the video included in the user information indicate any of the subject regions, calculating a first display priority of the subject region and a second display priority of a corresponding one of the comment regions including the comment provided to the subject region, the first display priority and the second display priority are higher than the display priority of any one of the other subject regions and the display priority of any one of the other comment regions, respectively.

15. A comment-provided video generating method comprising:
    obtaining a video from a video server;
    obtaining, from a comment information storage server, comment information including (i) comments regarding the video, and (ii) display time and display positions of comment regions including the comments in the video;
    receiving, as a user input, user information including a specified time and a specified position, the specified time and the specified position being arbitrarily specified; and
    generating a comment-provided video, based on the user information and association information indicating one-to-one associations between the comments and the subject regions, by superimposing and displaying (i) either a first comment region or a first subject region which correspond to the specified time and the specified position on the video included in the user information received in the receiving, at a foremost position in the video, and (ii) either (a) a second subject region which is provided with a comment included in the first comment region which corresponds to the specified time and the specified position on the video and included in the user information received in the receiving or (b) a second comment region which includes a comment provided to the first subject region which corresponds to the specified time and the specified position on the video and included in the user information received in the receiving, at a position next frontward to the foremost position in the video,
    wherein the generating includes:
        when the specified time and the specified position in the video included in the user information indicate any of the comment regions, positioning the comment region and a corresponding one of the subject regions which is provided with the comments in the comment region more frontward that a position of any one of the other comment regions and a position of any one of the other subject regions, respectively; and
        when the specified time and the specified position in the video included in the user information indicate any of the subject regions, positioning the subject region and a corresponding one of the comment regions including the comment provided with the subject region more frontward that a position of any one of the other subject regions and a position of any one of the other comment regions, respectively.

16. A comment-provided video generating apparatus comprising:
    a processor; and
    a non-transitory memory having stored thereon executable instructions, which when executed, cause the processor to perform:
        obtaining a video from a video server, and obtaining, from a comment information storage server, comment information including (i) comments regarding the video, and (ii) display times and display positions of comment regions including the comments in the video;
        receiving, as a user input, user information including a specified time and a specified position, the specified time and the specified position being arbitrarily specified;
        calculating a display priority for each of the comment regions and subject regions to which comments included in the comment regions are provided, based on the specified time and the specified position included the user information received in the receiving and association information indicating one-to-one associations between the comments and the subject regions; and
        outputting a comment-provided video according to the display priority calculated for each of the comment regions and the subject regions in the calculating such that a comment region or a subject region which has a higher display priority is superimposed and displayed at a position more frontward than a position of a comment region or a subject region which has a lower display priority,
    wherein the calculating includes:
        when the specified time and the specified position in the video included in the user information indicate any of the comment regions, calculating a first display priority of the comment region and a second display priority of a corresponding one of the subject regions which is provided with the comment in the comment region, the first display priority and the second display priority are higher than the display priority of any one of the other comment regions and the display priority of any one of the other subject regions, respectively; and
        when the specified time and the specified position in the video included in the user information indicate any of the subject regions, calculating a first display priority of the subject region and a second display priority of a corresponding one of the comment regions including the comment provided to the subject region, the first display priority and the second display priority are higher than the display priority of any one of the other subject regions and the display priority of any one of the other comment regions, respectively.

* * * * *